United States Patent
Kawashima et al.

(10) Patent No.: US 6,671,596 B2
(45) Date of Patent: Dec. 30, 2003

(54) CONTROL METHOD FOR SUSPENSION

(75) Inventors: Mitsunori Kawashima, Wako (JP); Shinji Suto, Wako (JP); Hirokazu Kitazawa, Wako (JP); Kazuhisa Watanabe, Haga-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/013,118

(22) Filed: Dec. 7, 2001

(65) Prior Publication Data

US 2002/0116104 A1 Aug. 22, 2002

(30) Foreign Application Priority Data

Dec. 27, 2000 (JP) .................................. P2000-397450
Dec. 27, 2000 (JP) .................................. P2000-397451
Jan. 12, 2001 (JP) .................................. P2001-005661
Jan. 12, 2001 (JP) .................................. P2001-005662

(51) Int. Cl.$^7$ ............................................. B60G 21/00
(52) U.S. Cl. ......................... 701/37; 701/38; 280/5.515
(58) Field of Search ...................... 701/37, 38; 280/5.5, 280/5.502, 5.506, 5.507, 5.512, 5.513, 5.514, 5.515

(56) References Cited

U.S. PATENT DOCUMENTS

| | | | | |
|---|---|---|---|---|
| 4,905,152 A | * | 2/1990 | Kawabata | 701/39 |
| 5,072,965 A | * | 12/1991 | Wada et al. | 280/5.515 |
| 5,163,704 A | * | 11/1992 | Wada | 280/5.503 |
| 5,410,482 A | * | 4/1995 | Kimura et al. | 701/37 |
| 5,425,436 A | * | 6/1995 | Teramura et al. | 188/280 |
| 5,526,262 A | * | 6/1996 | Kimura et al. | 701/38 |
| 5,559,701 A | * | 9/1996 | Shimizu et al. | 701/36 |
| 5,950,776 A | * | 9/1999 | Iwasaki et al. | 188/266.1 |
| 5,979,885 A | * | 11/1999 | Katsuda | 267/140.14 |
| 6,053,509 A | * | 4/2000 | Izawa et al. | 280/5.504 |
| 6,161,844 A | * | 12/2000 | Charaudeau et al. | 280/5.515 |
| 6,295,493 B1 | * | 9/2001 | Kawazoe | 701/38 |
| 6,366,841 B1 | * | 4/2002 | Ohsaku | 701/37 |

* cited by examiner

Primary Examiner—Tan Q. Nguyen
(74) Attorney, Agent, or Firm—Merchant & Gould P.C.

(57) ABSTRACT

A suspension control method for controlling a suspension which includes respective actuators for left and right wheels of a vehicle, and which can apply forces in the upwards and downwards direction to the left and right vehicle wheels via these actuators. While the vehicle is being driven in a straight line, control is performed by giving priority to ride comfort; and, while the vehicle is being driven around a curve, control is performed by giving priority to roll suppression.

15 Claims, 35 Drawing Sheets

CONTROL METHOD FOR SUSPENSION

BACKGROUND OF THE INVENTION

1. Field of the Invention

The present invention relates to a control method for a suspension which is provided to a vehicle such as an automobile or the like, and more particularly relates to a control method for a suspension which is equipped with actuators which apply forces in the upwards and downwards directions to the vehicle wheels.

2. Background Art

A suspension which is fitted to a vehicle fulfills the role of giving the vehicle a more comfortable ride by absorbing shocks from the road surface with which the vehicle wheels are in contact, and generally comprises coil springs and shock absorbers which suppress vibrations of these coil springs. There is a tendency that, the smaller is the spring rate of these coil springs with which the suspension is equipped and the softer are the springs, the better is the comfort of the ride.

On the other hand, although the greater is the stiffness of the vehicle body the greater is the controllability of the vehicle, if the spring rate is reduced in order to enhance the comfort of the ride, not only can rolling when steering the vehicle round a curve, or pitching during acceleration or deceleration, easily occur, but the controllability has a tendency to decrease; and, furthermore, since the vehicle body tilts from the point of view of the passengers, it cannot be said that the comfort of the ride is good.

Since in this manner, with a conventional vehicle suspension, it is difficult to improve both the controllability and also the comfort of the ride simultaneously, therefore it often happens that the suspension characteristics are set to give either excellent ride comfort or excellent controllability, according to the character which it is desired the vehicle should possess.

In the prior art, it is known to provide a stabilizer for enhancing the roll stiffness of the vehicle body. Such a stabilizer has no function of acting as a spring when both the left wheel and the right wheel between which it is fitted move in the same sense; but, when this left wheel and right wheel move in opposite senses, one upwards and one downwards, as during rolling of the vehicle body, the stabilizer suppresses this rolling by acting as a spring. Since the stabilizer acts as a spring when the left wheel and the right wheel move in opposite senses, it becomes possible to suppress rolling without increasing the spring rate of the coil springs of the vehicle.

Moreover, since it is easy for rolling to occur when the vehicle is being steered around a curve if the ride comfort is enhanced by reducing the spring rate of the coil springs, accordingly in this case it is necessary to increase the reaction force which is generated by the stabilizer bar, either by increasing the diameter of the stabilizer bar, or by reducing the length of the portion thereof in which twisting takes place, or the like.

However, if the reaction force which is generated by the stabilizer bar is increased, then, as a result, this is equivalent to the case in which the spring rate of the coil springs is increased in circumstances in which the road surface upon which the vehicle is being driven has irregular convexities and concavities, and therefore there is the problem that there is a tendency for the comfort of the ride to be deteriorated.

SUMMARY OF THE INVENTION

The objective of the present invention is to provide a control method for a vehicle suspension which, by implementing control of actuators which apply forces in the upwards and downwards directions to the vehicle wheels according to the operational conditions of the vehicle, can simultaneously enhance both the control stability of the vehicle and also the comfort of the ride for the passengers in the vehicle.

According to a first aspect of the present invention, there is proposed a suspension control method for controlling a suspension which includes respective actuators for left and right wheels of a vehicle, and which can apply forces in the upwards and downwards direction to the left and right vehicle wheels via these actuators, wherein, while the vehicle is being driven in a straight line, control is performed by giving priority to ride comfort (for example, by skyhook control); and, while the vehicle is being driven around a curve, control is performed by giving priority to roll suppression (for example, by rolling suppression control).

According to this aspect of the present invention as described above, it is possible to reduce vibration of the vehicle body when the vehicle is being driven in a straight line, while, when the vehicle is being driven around a curve, it is possible to reduce tilting of the vehicle body, so that it is possible to enhance the comfort of the ride from the point of view of the vehicle occupants. Furthermore, it becomes possible to enhance both the control stability and also the comfort of the ride in a compatible manner, since it becomes possible to increase the apparent spring rate only when the vehicle is being driven around a curve.

In the above described suspension control method, it is desirable, if the acceleration in the forwards and rearwards direction of the vehicle is greater than a predetermined value, to perform control by giving priority to pitching suppression, even while the vehicle is being driven in a straight line.

In this case, by performing control by giving priority to pitching suppression if the acceleration in the forwards and rearwards direction of the vehicle is greater than the predetermined value, even while the vehicle is being driven in a straight line, it becomes possible to reduce tilting of the vehicle body in the forwards and rearwards direction, and it accordingly becomes possible to enhance the comfort of the ride from the point of view of the passengers in the vehicle. Furthermore, it becomes possible to enhance both the control stability and also the comfort of the ride in a compatible manner, since it becomes possible to increase the apparent spring rate only during acceleration or deceleration.

In the above described suspension control method, it is also desirable to vary the forces generated by the actuators according to the speed of the vehicle. In this case, it becomes possible to prevent deterioration of the comfort of the ride, since the forces generated by the actuators are varied according to the speed of the vehicle, and at low vehicle speed it becomes possible to perform control more minutely due to elimination of influences from convexities and concavities of the road surface.

Moreover, according to another aspect of the present invention, there is proposed a suspension control method as first described above, in which the acceleration of the vehicle in the upwards and downwards direction is detected, and, if the value of this upwards and downwards acceleration falls outside a predetermined range of values, and moreover has continued to be outside the predetermined value range for longer than a predetermined time period, then control is performed to suppress vibration of the vehicle based upon the value of the upwards and downwards acceleration which is detected.

According to this aspect of the present invention, if the change of acceleration in the upwards and downwards direction is rapid, it is possible to prevent vibration suppression control being performed for the vehicle body based upon the detected value of acceleration in the upwards and downwards direction, and as a result the comfort of the ride at this time is enhanced.

According to another aspect of the present invention, there is proposed a suspension control method as first described above, in which the acceleration of the vehicle in the upwards and downwards direction is detected, and, if the value of this upwards and downwards acceleration falls within a predetermined range of values, and moreover has continued to be within the predetermined value range for longer than a predetermined time period, then control (for example, skyhook control) is not performed to suppress vibration of the vehicle based upon the value of the upwards and downwards acceleration which is detected.

According to this aspect of the present invention, in the case of minute change of acceleration in the upwards and downwards direction, vibration suppression control for the vehicle body is not performed, and as a result it is possible further to enhance the comfort of the ride upon road surfaces for which the stroke of the suspension is small.

Another aspect of the present invention has as its objective to suppress the generation of inconveniences such as the generation of vibration or the like during electrical current feedback control of the electromagnetic actuator, so as to enhance the efficiency of convergence of the actual electrical current value to the target electrical current value when supplying electrical current to the actuator.

In order to achieve the above described objective, this aspect of the present invention proposes a control method for an electromagnetic actuator, including: a step of, when supplying electrical current to the electromagnetic actuator to generate a desired output, calculating a first duty ratio for the electrical current to be supplied to the electromagnetic actuator corresponding to a target electrical current value for the electrical current; a step of calculating a second duty ratio for the electrical current to converge the actual electrical current value which flows through the electromagnetic actuator to the target electrical current value by proportional integral and differential control; and a step of supplying electrical current to the electromagnetic actuator according to a third duty ratio which is obtained by adding together the first duty ratio and the second duty ratio.

According to this aspect of the present invention, in the proportional integral and differential control of the electromagnetic actuator, first a first duty ratio for the electrical current to be supplied to the electromagnetic actuator from a power source device or the like is calculated corresponding to a target electrical current value. Then the actual electrical current value which flows through the electromagnetic actuator is detected, and a second duty ratio is calculated for proportional integral and differential control to converge this obtained actual electrical current value to the target electrical current value. This second duty ratio and the first duty ratio are added together to produce a third duty ratio, and electrical current is supplied to the electromagnetic actuator according to this third duty ratio.

In other words, when calculating this third duty ratio which is referred to when supplying electrical current to the electromagnetic actuator, it is possible to reduce the contribution of the second duty ratio which is calculated for PID control by calculating the first duty ratio according to the target electrical current value. Due to this, the proportional term for PID control can be made smaller, and accordingly it is possible to suppress inconveniences such as the generation of vibration or the like during feedback control, and it is possible to improve the efficiency of convergence of the actual electrical current value to the target electrical current value.

According to yet another aspect of the present invention, there is proposed a control device for an electromagnetic actuator, including: a target electrical current value calculation device which, when supplying electrical current from a power source device to the electromagnetic actuator to generate a desired output, calculates a target electrical current value for the electrical current; a first duty ratio calculation device which calculates a first duty ratio for the electrical current to be supplied from the power source device to the electromagnetic actuator corresponding to the target electrical current value; an electrical current detection device which detects the actual electrical current which flows through the electromagnetic actuator and obtains an actual electrical current value; a second duty ratio calculating device which calculates a second duty ratio for the electrical current to converge the actual electrical current value to the target electrical current value by proportional integral and differential control; and a current control device which supplies electrical current from the power source device to the electromagnetic actuator according to a third duty ratio which is obtained by adding together the first duty ratio and the second duty ratio.

According to this aspect of the present invention, during the proportional integral and differential control of the electromagnetic actuator, first, the first duty ratio for the electrical current to be supplied from the power source device to the electromagnetic actuator is calculated based upon the target electrical current value. Then the actual electrical current value which flows through the electromagnetic actuator is detected, and a second duty ratio is calculated for proportional integral and differential control to converge this obtained actual electrical current value to the target electrical current value. This second duty ratio and the first duty ratio are added together to produce a third duty ratio, and electrical current is supplied to the electromagnetic actuator according to this third duty ratio.

Due to this, it is possible to reduce the proportional term for PID control, and accordingly it is possible to suppress inconveniences such as the generation of vibration or the like during feedback control, and it is possible to improve the efficiency of convergence of the actual electrical current value to the target electrical current value. In particular, if for example a predetermined output is connected to the electromagnetic actuator, by setting the first duty ratio which has been calculated from the target electrical current value as a so called standard value, and by performing PID control for the amount of deviation from this standard value, since it is possible to set the constant of proportionality to a relatively small value, thereby it is possible easily to maintain the desired output.

A yet further aspect of the present invention takes as its objective to provide a control method which, when the vehicle is being driven in a zigzag course or the like, and abrupt changes in the rolling direction are occurring, can attain suitable roll stiffness corresponding to the roll angle.

In order to achieve the above described objective, this aspect of the present invention proposes an actuator control method in which a difference between amounts of movement of left and right wheels of the vehicle in the upwards and downwards direction is detected, and a rate of change of steering angle is detected, and actuators are controlled based upon the vehicle wheel movement amount difference and upon the rate of change of steering angle. By doing this, including the case in which the vehicle body is at its central position, torque is generated based upon the speed by which the steering wheel is being rotated, in other words upon the rate of change of the steering angle, and torque control for the actuator is performed in the opposite direction to the rolling direction based upon this torque, so that the reverse wheel rate is increased. Accordingly, by comparison to the case in which the control is based only upon the variation of stroke amount, the roll stiffness during cornering is complemented and the initial responsiveness is enhanced, and it is possible to improve the response lag due to the compliance of the vehicle, and moreover, it is possible to position the center of gravity of the vehicle body at its geometrical center from the start of cornering, and stability of the vehicle is obtained with regard to the centrifugal force which is generated during cornering.

According to a yet further aspect of the present invention, there is proposed a suspension control method as described above, in which a stabilizer is provided which mechanically links together the left and right vehicle wheels, and which generates torque according to the difference between the movement amounts of the left and right vehicle wheels in the upwards and downwards direction with respect to the vehicle body; and in which deficiency of force to suppress rolling of the vehicle body is, as required, supplemented by the actuators.

Since with this control method, while the vehicle is being driven in a straight line and the steering wheel is not being actuated, a rate of change of steering angle of "0" is obtained, and moreover a difference of "0" in the movement amounts of the vehicle wheels with respect to the vehicle body due to rolling is obtained, accordingly at this time the control circuit does not control the actuators, and since the stiffness of the suspension is not complemented, the suspension operates according to the inherent standard values of the spring rates of the stabilizer and the springs, so that the original ride comfort which has been set in advance is not lost.

The spring rate which determines the roll stiffness of the vehicle body is both the spring rates of the springs of the suspension and also a spring rate based upon the torsional stiffness of the stabilizer, but in the following, for convenience of explanation, the spring rate of the stabilizer will be described as being included in the spring rates of the springs.

According to a yet further aspect of the present invention, there is proposed an actuator control method in which sidewise acceleration of the vehicle body is detected, and the actuator is controlled according to the sidewise acceleration and upon rate of change of steering angle. In this case, including the case in which the vehicle body is at its central position, torque is generated based upon the speed by which the steering wheel is being rotated, in other words upon the rate of change of the steering angle, and torque control for the actuator is performed in the opposite direction to the rolling direction based upon this torque, so that the reverse wheel rate is increased. Accordingly, by comparison to the case in which the control is based only upon the variation of stroke amount, the roll stiffness during cornering is complemented and the initial responsiveness is enhanced, and it is possible to improve the response lag due to the compliance of the vehicle, and moreover, it is possible to position the center of gravity of the vehicle body at its geometrical center from the start of cornering, and stability of the vehicle is always obtained with regard to the centrifugal force which is generated during cornering.

Furthermore, since in this suspension control method the control of the actuators utilizes the sidewise acceleration, instead of the difference in the movement amounts of the vehicle wheels with respect to the vehicle body, and accordingly no stroke sensors are employed but instead the sidewise acceleration sensor is used, therefore, by comparison to the case in which stroke sensors are employed, it is possible to eliminate the two high cost stroke sensors which otherwise would need to be provided to the left and right vehicle wheels, and moreover, since no links or rods from the drive arms to any stroke sensors are required, accordingly it is possible to simplify the system as a whole due to simplification of the structure of the detection mechanism which detects the operational state of the vehicle body, and it becomes possible to reduce the cost of its construction.

In a suspension control method according to a yet further aspect of the present invention, when the roll direction of the vehicle and the steering speed direction are the same, control is performed based upon the vehicle wheel movement amount difference with respect to the vehicle body, and upon the rate of change of steering angle. However, when the roll direction of the vehicle and the steering speed direction are not the same, control is performed based upon the vehicle wheel movement amount difference with respect to the vehicle body. Moreover, in the central state when the amount of rolling of the vehicle body is small, without any dependence upon whether or not the roll direction of the vehicle and the steering speed direction are the same, control is performed based upon the vehicle wheel movement amount difference with respect to the vehicle body, and upon the rate of change of steering angle. In other words, by compulsorily adding the torque based upon the rate of change of steering angle which is the differential coefficient of the steering angle amount, to the torque which is obtained from the difference in the movement amounts of the left and right vehicle wheels with respect to the vehicle body, thereby the lag of control of the vehicle body in the transient cornering state is complemented by the torque which is obtained from the rate of change of the steering angle, and the response speed during turning for initial cornering is improved; and, moreover, during anti-rolling control, it becomes possible to enhance the reaction to rolling during initial cornering, without generating lag in the control of the vehicle body, based upon the lag of the control system for the actuators or the like, and upon the vehicle compliance.

In a suspension control method according to a yet further aspect of the present invention, when the roll direction of the vehicle and the steering speed direction are the same, control is performed based upon the sidewise acceleration and upon the rate of change of steering angle; and, when the roll direction of the vehicle and the steering speed direction are not the same, control is performed based upon the sidewise acceleration; while, in the central state when the amount of rolling of the vehicle body is small, without any dependence upon whether or not the roll direction of the vehicle and the steering direction are the same, control is performed based upon the sidewise acceleration of the vehicle wheels with respect to the vehicle body, and upon the rate of change of steering angle. In other words, by compulsorily adding the torque based upon the rate of change of the steering angle which is the differential coefficient of the steering angle amount, to the torque which is obtained from the sidewise acceleration, thereby the lag of control of the vehicle body in the transient cornering state is complemented by the torque which is obtained from the rate of change of steering angle, and the response speed during turning for initial cornering is improved. Accordingly, during anti-rolling control, it becomes possible to enhance the reaction to rolling during initial cornering, without generating lag in the control of the vehicle body, based upon the lag of the control system for the actuators or the like, and upon the vehicle compliance.

Moreover, in a suspension control method according to a yet further aspect of the present invention, in the above suspension control methods, when determining upon the central state, the decision is made utilizing hysteresis, so that it is possible to prevent hunting of the vehicle operational state value, as compared to the case in which the threshold value is a single point, where, when the difference in the movement amounts of the left and right vehicle wheels with respect to the vehicle body varies around the threshold value, significant hunting is generated. Due to this, since it is possible to avoid instability of the control of the actuators due to oscillation of the vehicle operational state value because the electrical current value which is supplied to the actuators is supplied stably without hunting occurring, accordingly the convergence performance to the rolling state of the torques which are generated by the actuators is improved, and the benefit is obtained that the responsiveness of control of the roll stiffness of the suspension is improved. Furthermore, since it is possible to prevent hunting due to change of the above described stroke positions around their central states, the behavior of the vehicle body is stabilized, since there is no vibration of the vehicle body due to the hypersensitive influence of minute changes during anti-rolling control of the vehicle body.

DETAILED DESCRIPTION OF THE INVENTION

Preferred embodiments of the present invention will now be described with reference to the drawings. However, it should be understood that the scope of the present invention is not to be considered as being limited to the embodiments disclosed; it would be possible, for example, to combine the various structural features of different ones of these preferred embodiments in different ways, or to combine them with other per se known prior arts.

Embodiment 1

In a first preferred embodiment of the present invention, according to the operational state of the vehicle, both control stability and also ride comfort are rendered compatible by complementing the spring rate of the springs in the suspension by torques which are generated by actuators. At this time, the torques to be generated by the actuators are calculated based upon the outputs of sensors which detect the state of the body of the vehicle.

By doing this, in this first preferred embodiment of the present invention, according to the operational state of the vehicle, the stiffness of the vehicle body is substantially increased, and the comfort of the people riding in the vehicle is enhanced by alleviating tilting of the vehicle body due to rolling or pitching, along with improving the stability of operation of the vehicle.

If, in order to increase the stiffness of the vehicle body, the spring rates of the springs are set to a high value from the beginning, then, when the vehicle is moving in a straight line, shocks due to the state of the road surface, for example due to convexities or concavities of the road surface, come to be transmitted directly to the vehicle body, and accordingly the ride comfort is undesirably deteriorated.

However since, with the present invention, the spring rates of the springs are set to values which suppress shocks due to the state of the road surface when the vehicle is moving in a straight line, and the differences between these spring rates and the spring rates which provide the required vehicle body stiffness during cornering or acceleration or deceleration are complemented by the torques which are generated by the actuators, thereby it becomes possible to enhance both the controllability of the vehicle and also the comfort of the ride.

Figure 1:
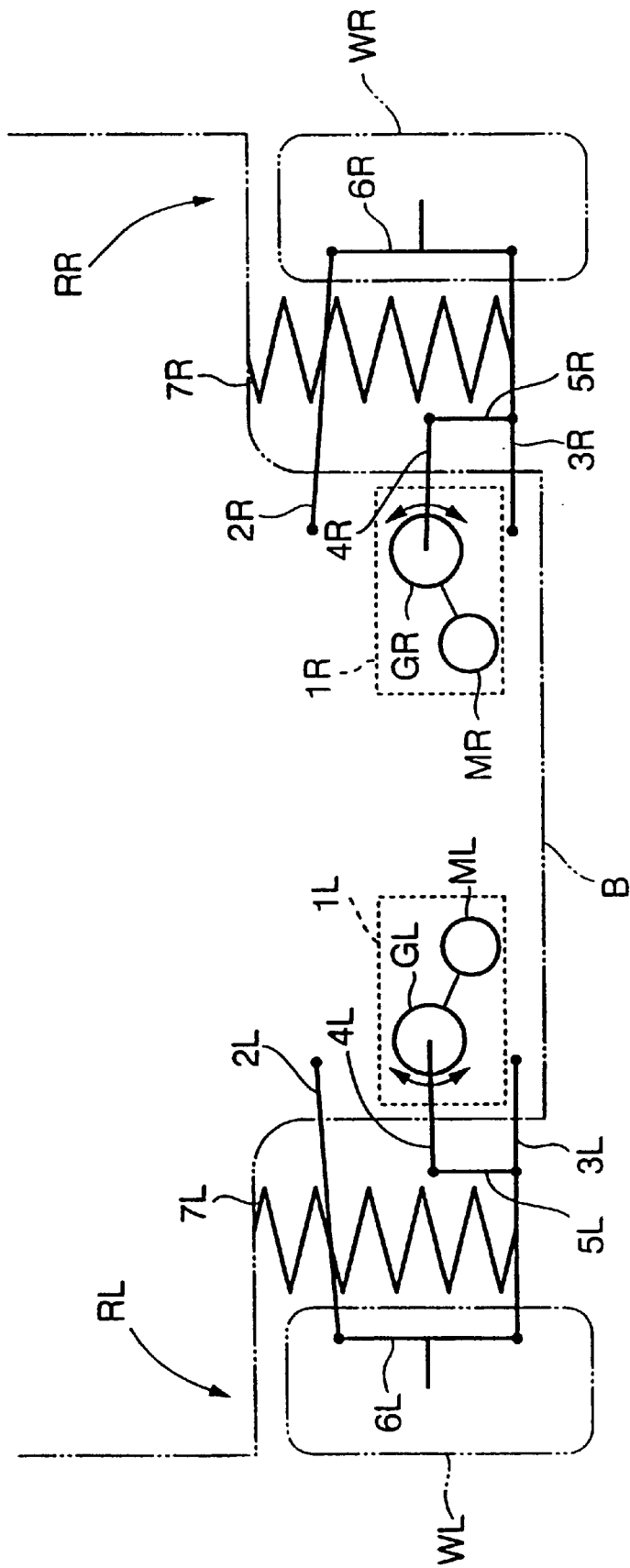
FIG. 1 is an explanatory figure showing the structure of a suspension according to a preferred embodiment of the present invention.

FIG. 1 is a schematic figure showing the structure of a suspension according to a preferred embodiment of the present invention for the rear wheels of an automobile, as seen from the rear of the vehicle.

In this figure, in the suspension for the left rear wheel WL, a knuckle 6L which supports this wheel WL in a freely rotatable manner is supported so as to be capable of moving in the upwards and downwards direction by an upper arm 2L and a lower arm 3L. The upper arm 2L is connected to the upper portion of the knuckle 6L via a joint which is provided at its tip end, while it is connected to the vehicle body B via a joint which is provided at its base end. Similarly, the lower arm 3L is connected to the lower portion of the knuckle 6L via a joint which is provided at its tip end, while it is connected to the vehicle body B via a joint which is provided at its base end. A lower end portion of a spring 7L is supported on the central portion of the lower arm 3L, while the upper end portion of this spring 7L supports the vehicle body B; and an actuator 1L is connected near the base end of the lower arm 3L via a link SL and a drive arm 4L. Furthermore, a shock absorber not shown in the figure is provided between the vehicle body B and the lower arm 3L. This actuator 1L comprises a downgearing device GL and a motor ML, and the torque which is generated by the motor ML is increased according to the gearing ratio of the downgearing device GL, and is then transmitted to the lower arm 3L.

Furthermore, in the suspension for the right rear wheel WR, the structure is identical but heterochiral to that described above, and accordingly the structural elements thereof are designated in the figure by the same reference symbols as above, but with the suffix "R" substituted for "L".

Yet further, a stabilizer bar not shown in the figure is connected between the front portions of the knuckle 6L and the knuckle 6R, and lateral links also not shown in the figure are connected between the vehicle body B and the rear portions of the knuckle 6L and the knuckle 6R.

According to the above described structure, in the suspension for the left rear wheel, when the vehicle body B undergoes rolling movement upwards and downwards with respect to the road surface due to cornering, the lower arm 3L and the upper arm 2L which are connected to the knuckle 6L move in the upwards and downwards direction taking their base ends which are connected to the vehicle body B as start points. Due to this, the spring 7L and the shock absorber which are connected to the lower arm 3L are extended and compressed corresponding to this upwards and downwards movement, and thus the upwards and downwards movement of the vehicle body B with respect to the road surface is buffered. At this time, if the actuator 1L is driven so as to rotate the drive arm 4L around its rotation shaft in the same rotational direction as the rolling, then the torque (in newton-meters) generated thereby is transmitted via the drive arm 4L and the link 5L so as to drive the lower arm 3L in the upwards and downwards directions, and thereby the spring rate of the spring 7L is supplemented.

Furthermore, in the same manner, in the suspension for the right rear wheel WR, the structure is identical but heterochiral to that described above, and accordingly the structural elements thereof are designated in the figure by the same reference symbols as above, but with the suffix "R" substituted for "L". With this structure, it is possible to supplement the spring rates of the springs 7L and 7R by controlling the actuator 1L for the left wheel WL and the actuator 1R for the right wheel 1R in a complementary manner, and it is possible to actively control tilting of the vehicle body B due to rolling and pitching.

In other words, when the spring 7L which is connected to the lower arm 3L in the suspension for the left rear wheer WL shown in FIG. 1 is extended and compressed for upwards and downwards movement of the vehicle body B due to cornering or the like, torque is actively applied to the vehicle body B according to the amount of this extension and compression, and this operates to correct the tilting of the vehicle body B.

In the following, for the purposes of explanation, the torques which are applied to the lower arms 3L and 3R by the drive arms being rotated by the actuators 1L and 1R, respectively, will be termed TTL and TTR.

Figure 15:
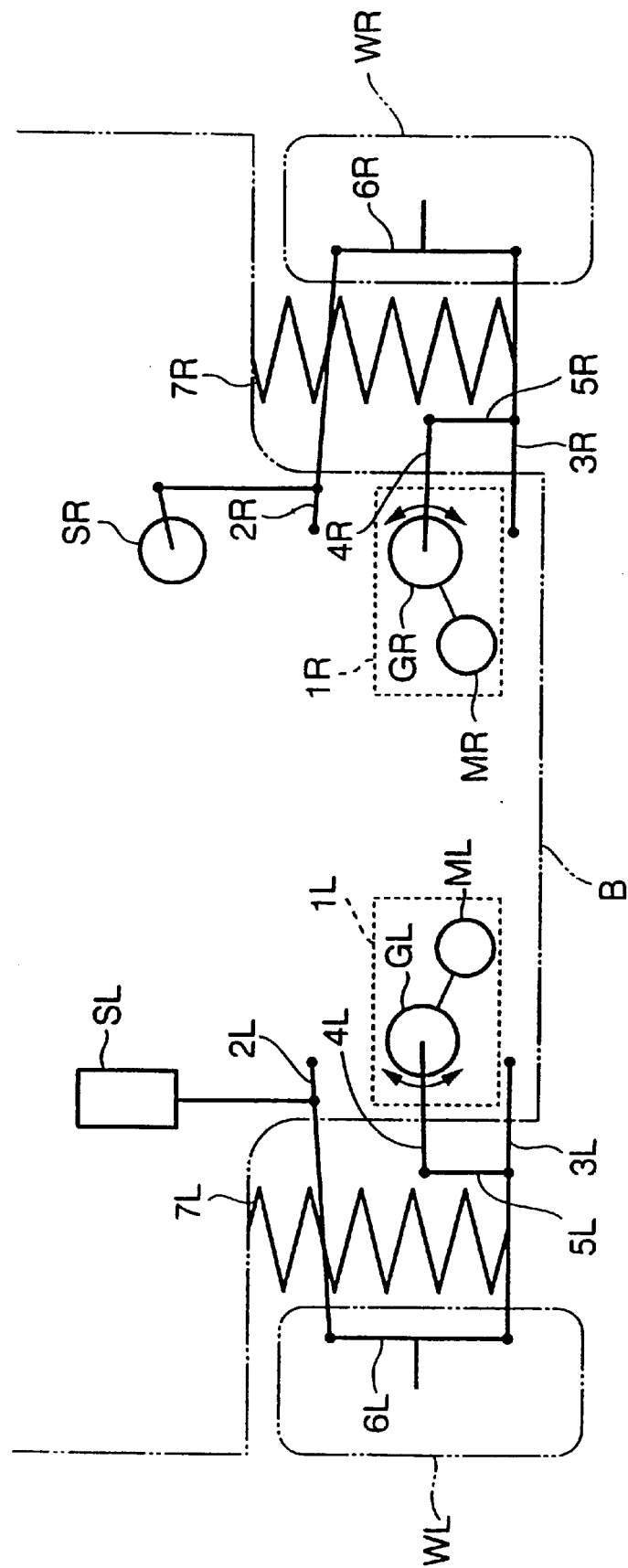
FIG. 15 is an explanatory figure showing the arrangement of sensors which detect the state of the vehicle body.

Sensors which detect the state of the vehicle body B will now be explained with reference to FIGS. 15 and 16. FIG. 15 is an explanatory figure showing the arrangement of stroke sensors which are fitted to the vehicle body B for detecting the amount of stroke of the suspension shown in FIG. 1. Referring to this figure, the reference symbols SL and SR denote stroke sensors which detect the amounts of movement (the stroke amounts) in the relative positions of the vehicle body and the lower arms 3L and 3R respectively, and which output signals representative thereof. The example shown in FIG. 15 exemplifies a case in which a stroke type potentiometer is fitted as the stroke type sensor SL for the suspension for the left rear wheel WL. In this example, the sensor SL is fitted to the vehicle body B, and an actuator member thereof is connected by a link to the upper arm 2L, so as to sense the amount of linear movement thereof with respect to the vehicle body B. Furthermore, in this example, a rotational type potentiometer is fitted as the stroke type sensor SR for the suspension for the right rear wheel WR, and this sensor SR is fitted to the vehicle body B, with an actuator member thereof being connected by a link to the upper arm 2R, so as to sense the amount of angular rotation thereof with respect to the vehicle body B. These stroke sensors SL and SR are not to be considered as being limited to being stroke type potentiometers or rotational type potentiometers; any type of sensor capable of detecting the stroke amount of the suspension may be used.

In other words, since by "stroke amount" here is meant values which correspond to the amounts of displacement of the springs 7L and 7R, therefore any type of sensor which is able to detect the respective amounts of displacement of the springs 7L and 7R can be employed. For example, it would also be possible to obtain and store in advance a map of the left and right suspension stroke amounts in correspondence to the acceleration acting upon the vehicle body B in the sidewise direction, and to obtain the current stroke amounts by detecting the current vehicle body sidewise acceleration by an acceleration sensor, and by looking this value up in said stroke amount—acceleration map obtained in advance.

Figure 16:
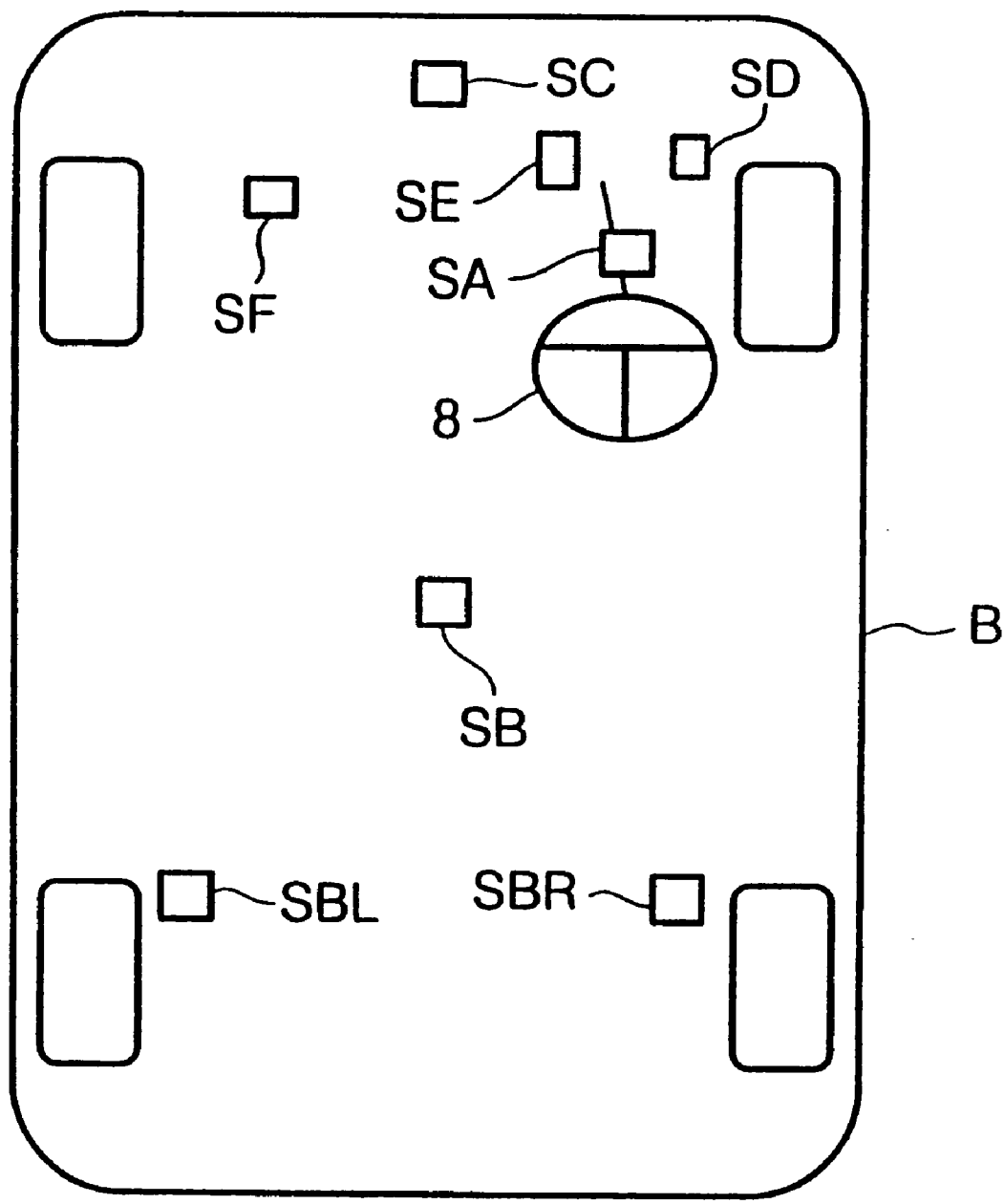
FIG. 16 is another explanatory figure showing the arrangement of sensors which detect the state of the vehicle body.

FIG. 16 is a schematic plan view showing the vehicle body as seen from above. Referring to this figure, the reference symbol SA denotes a steering angle sensor which detects the steering angle and the steering direction of a steering wheel 8 of the vehicle, and which representative thereof. The output from this steering angle sensor SA represents a signed numerical value, and, for example, when the vehicle is being steered to the left, the output for such a steering angle may be a positive numerical value; while, when the vehicle is being steered to the right, the output for such a steering angle may be a negative numerical value. And the reference symbol SB denotes an acceleration sensor which is fitted at the center of gravity of the vehicle body B and which detects the acceleration of the vehicle body B in the upwards and downwards directions thereof (the direction perpendicular to the road surface), and which outputs a signal representative thereof. Moreover, the reference symbol SC denotes an acceleration sensor which is fitted at the front of the vehicle body, and which detects the acceleration of the vehicle body B in the fore and aft direction thereof, and which outputs a signal representative thereof. Furthermore, the reference symbol SD is an accelerator pedal actuation amount sensor which detects the amount of actuation of an accelerator pedal of the vehicle (not shown in the figure), and which outputs a signal representative thereof. Yet further, the reference symbol SE denotes a brake pedal stepping force sensor which detects the force with which a brake pedal of the vehicle (also not shown in the figure) is being stepped upon, and which outputs a signal representative thereof. Finally, the reference symbol SF denotes a vehicle speed sensor which detects the speed of the vehicle and which outputs a signal representative thereof.

The acceleration sensor SB which detects the acceleration of the vehicle body B in the upwards and downwards directions may also comprise a pair of sensors, denoted by the reference symbols SBL and SBR, which are respectively mounted to the left and right rear damper mount portions of the vehicle body B. When in this manner acceleration sensors are fitted in positions upon the left and the right suspensions for detecting accelerations in the upwards and downwards directions, it becomes possible to detect the operational state of the vehicle body B in greater detail.

Furthermore, the control of the above described actuators 1L and 1R, and the detection of the outputs of the above described stroke sensors SL and SR, the steering angle sensor SA, the acceleration sensor SB, and the acceleration sensor SC is performed in a control section not shown in the figures. This control section comprises a CPU and a storage section like a memory or the like, and the CPU controls the actuators 1R and 1L according to a program which is stored in the storage section in advance.

Figure 2:
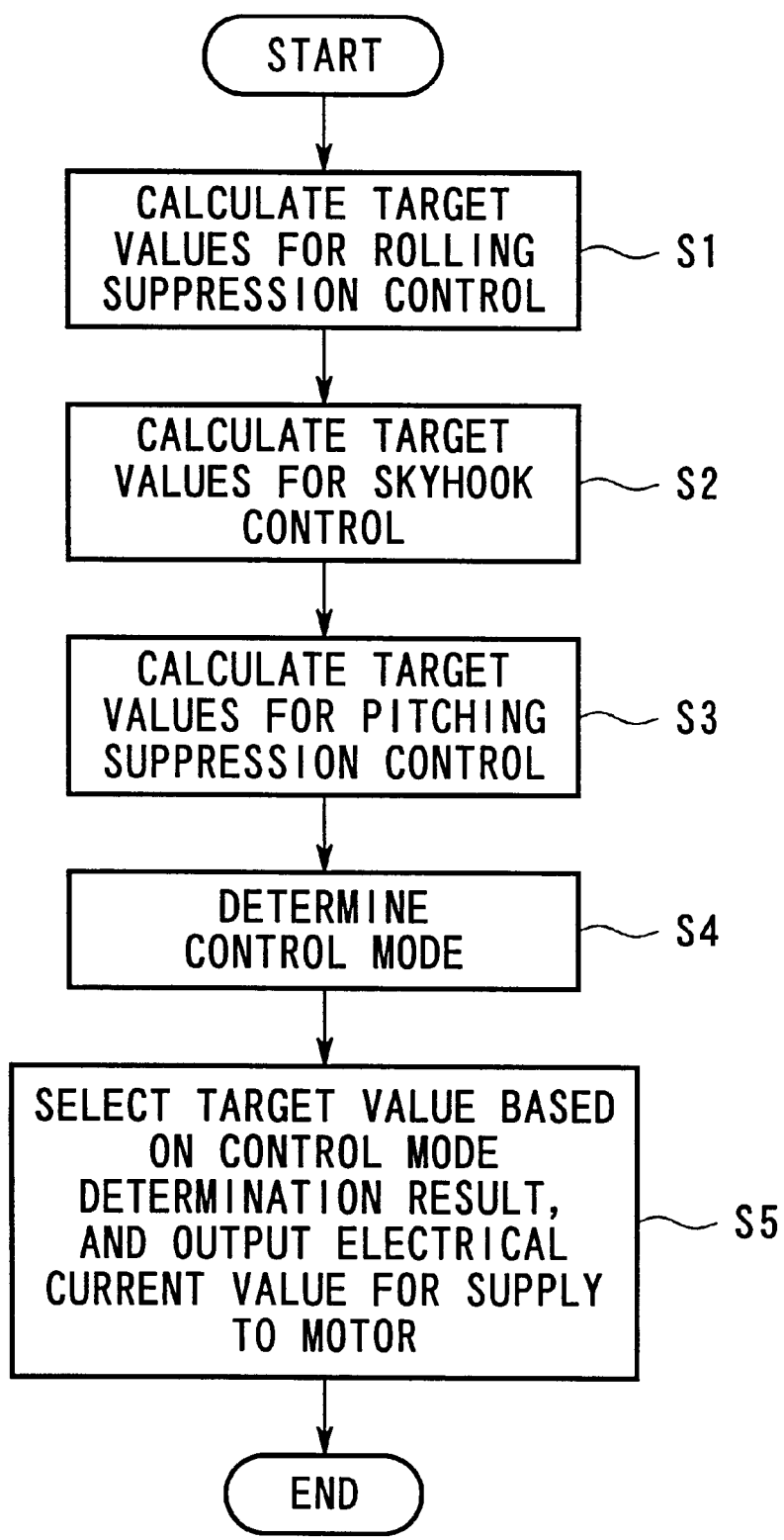
FIG. 2 is a flow chart showing the control flow of a main routine for controlling the suspension of FIG. 1.

Next, the operation by which the control section performs control of the suspension shown in FIG. 1 will be explained with reference to the flow charts shown in FIGS. 2 through 8. FIG. 2 is a flow chart showing the control flow of a main routine for suspension control. First, in a step S1, the control section detects the operational state of the vehicle body B at the present time point, and calculates target values which are necessary when performing control for suppressing rolling of the vehicle body. The term "target value" used in the following explanation means target torques TTL and TTR to be generated by the actuators 1L and 1R, and the rotational directions in which these torques are to be generated.

The procedure shown as the step S1 in FIG. 2 will be explained in detail hereinafter with reference to FIGS. 3 through 5.

Next, in a step S2, the control section detects the operational state of the vehicle body, and calculates the target values which are required when performing skyhook control for optimizing the comfort of the ride, when the vehicle is proceeding in a straight line. By skyhook control is meant control for suppression of vibration of the vehicle body B upon the springs by the actuators, based upon skyhook theory.

Figure 6:
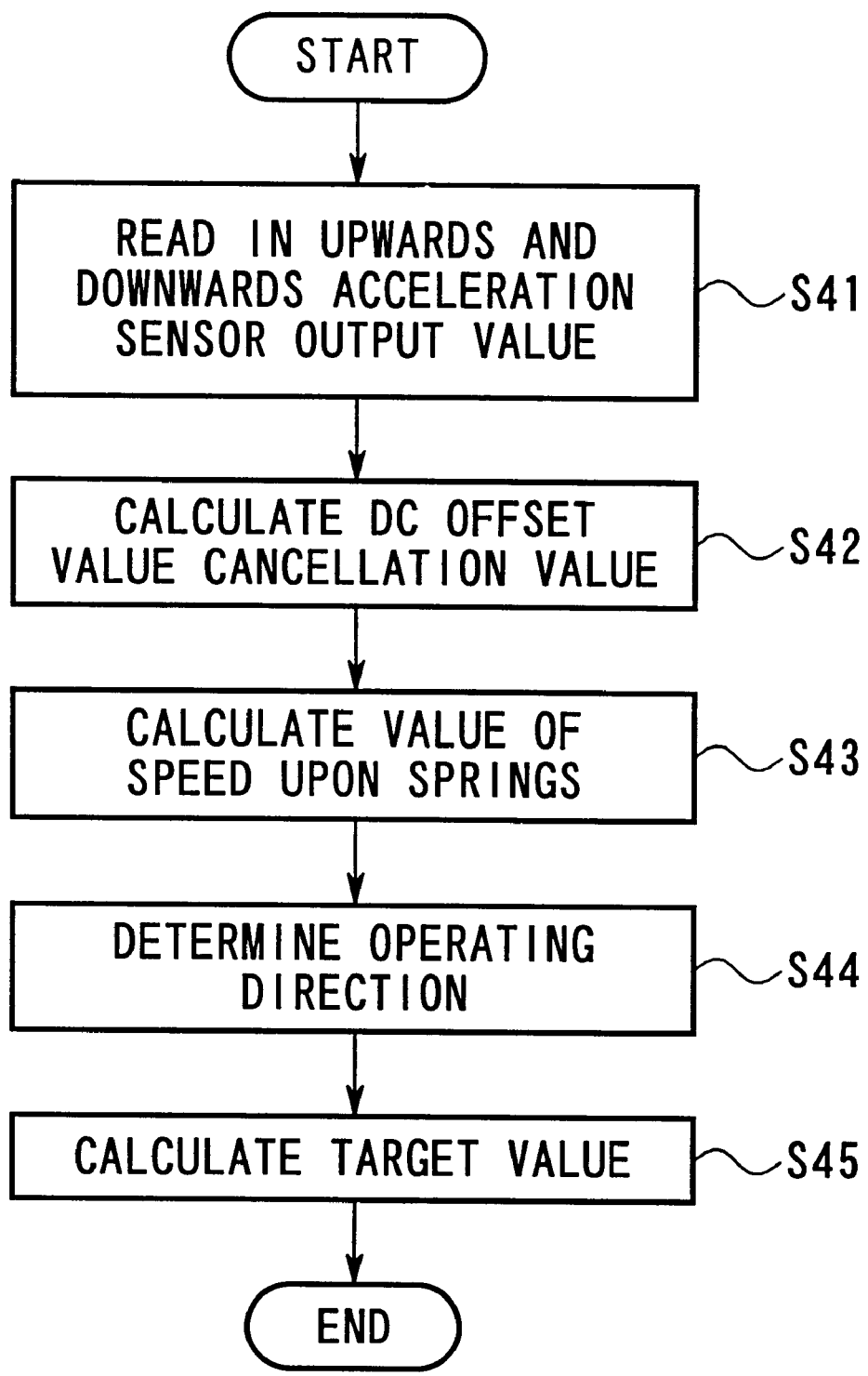
FIG. 6 is a flow chart showing the details of a step S2 in the FIG. 2 flow chart.

The procedure shown simply as the step S2 in FIG. 2 will be explained in detail hereinafter with reference to FIG. 6.

Next, in a step S3, the control section detects the operational state of the vehicle body B at the present time point, and calculates the target values which are required when performing control for suppressing pitching of the vehicle body B.

Figure 7:
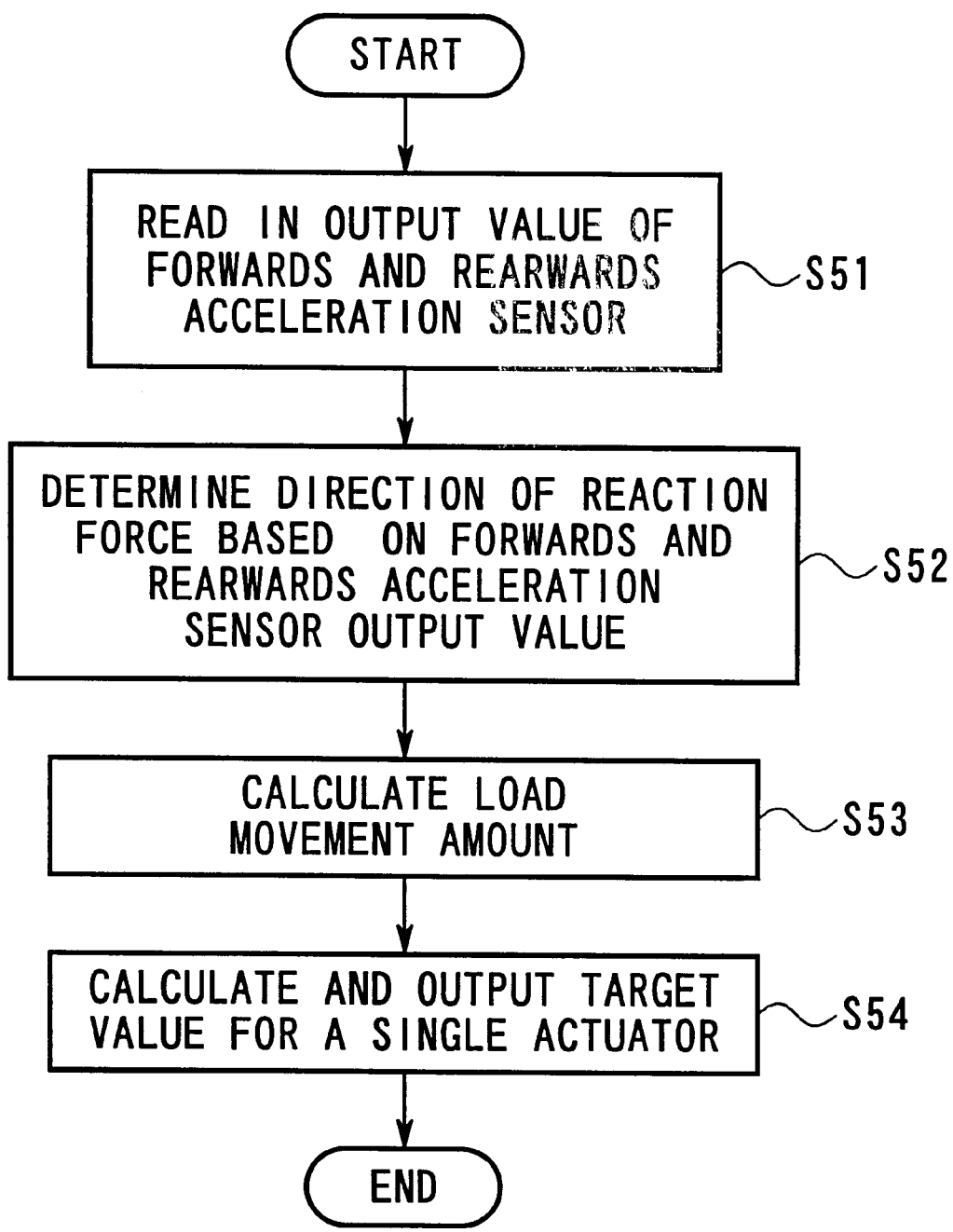
FIG. 7 is a flow chart showing the details of a step S3 in the FIG. 2 flow chart.

The procedure shown simply as the step S3 in FIG. 2 will be explained in detail hereinafter with reference to FIG. 7.

Next, in a step S4, the control section decides upon the control mode to be employed, based upon the state of the vehicle body at the present time point. This decision as to which control mode is to be employed for controlling the suspension at the present time point, according to the operational state of the vehicle body B, is a selection of that one of the above described three types of control (rolling suppression control, skyhook control, and pitching suppression control) which is most suitable for being performed.

The reason for always calculating target values for performing all of the three types of control, is in order to be able to respond quickly to changes of the operational state of the vehicle.

Next, in a step S5, the control section selects between the target values which have been calculated in the above steps S1, S2, and S3, based upon the results of the control mode decision in the above step S4, determines electrical current values which correspond to these target values, and outputs them to the respective motors ML and MR for the left and right actuators.

For example, if the torques provided by the motors ML and MR are controlled by PWM (pulse width modulation), the control section may obtain the duty ratios of H level and L level width at a constant period by calculation based upon the target values for the torques, and may adjust the amounts of electrical current to be supplied to the motors ML and MR based thereupon.

At this time, when it is desired to make the electrical current greater in order to increase the torque, then the control section will calculate the duty ratio so as to increase the H level width and reduce the L level width, while, contrariwise, when it is desired to make the electrical current smaller in order to decrease the torque, then the control section will calculate the duty ratio so as to increase the L level width and reduce the H level width. Furthermore, the direction in which torque is generated is controlled by changing the direction of the electrical current to be supplied to the motors ML and MR, as appropriate.

In the following, for the convenience of explanation, the electrical current direction which causes the actuator 1L to generate a torque TL in the direction to extend the spring 7L will be defined as being the positive (+) current direction, while the electrical current direction which causes the actuator 1L to generate torque TL in the direction to compress the spring 7L will be defined as being the negative (−) current direction.

Similarly, the electrical current direction which causes the actuator 1R to generate a torque TR in the direction to extend the spring 7R will be defined as being the positive (+) current direction, while the electrical current direction which causes the actuator 1R to generate torque TR in the direction to compress the spring 7R will be defined as being the negative (−) current direction.

Although in FIG. 2 the procedures of the steps S1 through S3 are shown as being performed in sequential order, these three target value calculations could also be performed simultaneously in parallel. It is possible to shorten the time period required for executing the control procedure shown in FIG. 2 by doing this.

Since it is arranged for the control of the suspension to be implemented by selecting the appropriate one of rolling suppression control, skyhook control, and pitching suppression control, according to the operational state of the vehicle body B, thereby it becomes possible to enhance both the control stability and also the comfort of the ride from the point of view of the persons riding in the vehicle.

Next the procedure for calculating the target values in the case of rolling suppression control, summarized in the step S1 of FIG. 2, will be explained in detail with reference to FIGS. 3 through 5. FIGS. 3 through 5 are flow charts showing the procedure for calculation by the control section of the target values for performing control of the actuators 1L and 1R.

Before starting vehicle operation, the driver gets into the vehicle and turns the ignition switch to the ON state, and when this is done the above described control section stores the measured output values MDL and MDR (units mm) at this time point from the stroke sensors SL and SR in the storage section as respective standard values DL and DR (units mm) therefor.

Figure 3:
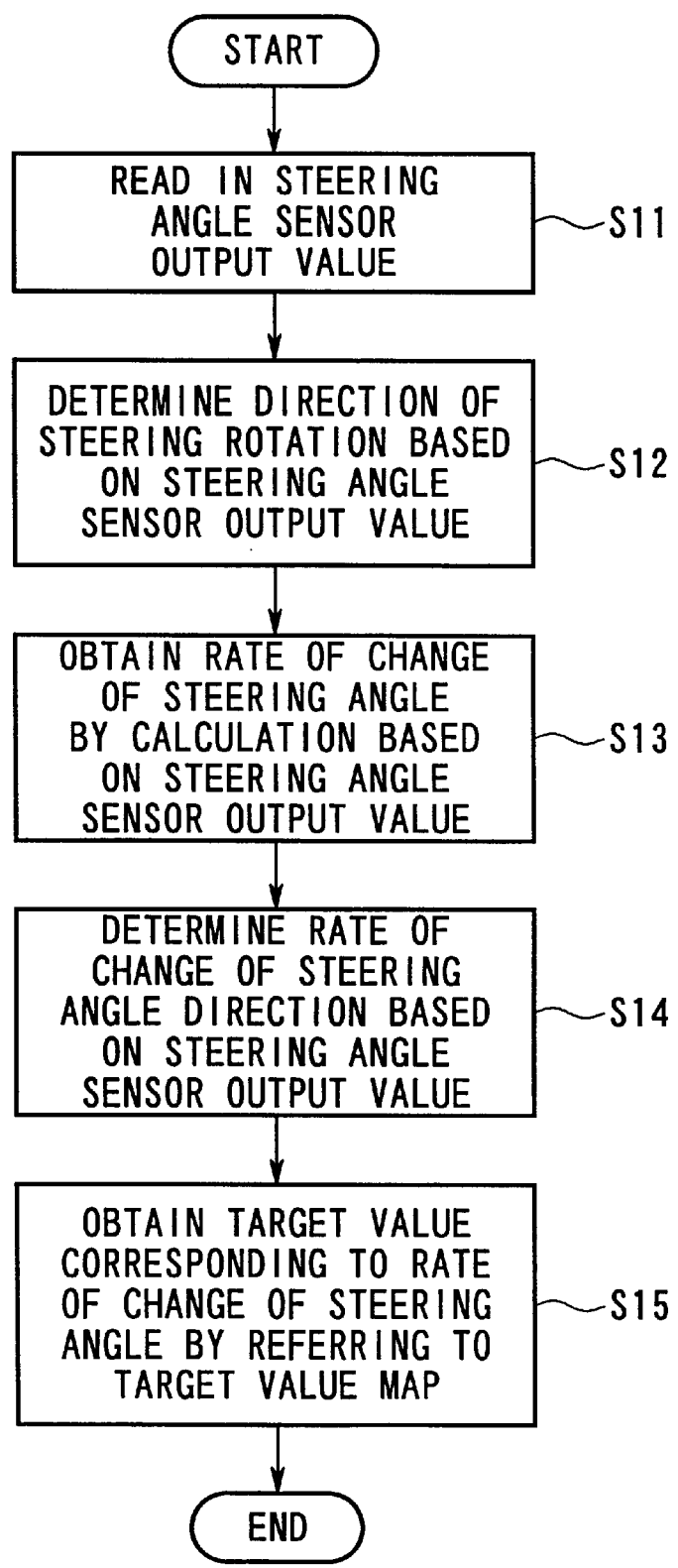
FIG. 3 is a flow chart showing the details of a step S1 in the FIG. 2 flow chart.
Figure 4:
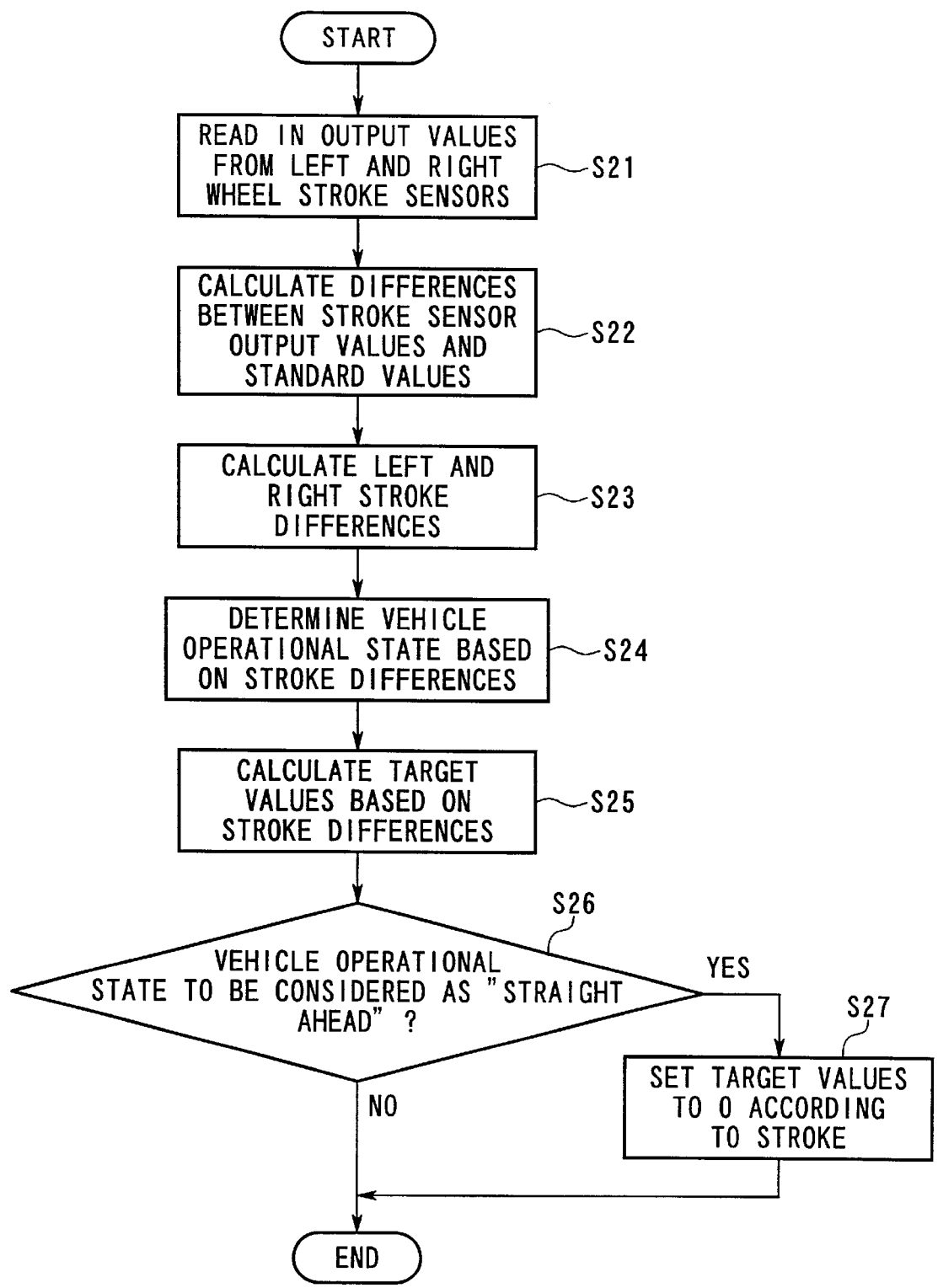
FIG. 4 is a further flow chart showing more details of the step S1 in the FIG. 2 flow chart.
Figure 5:
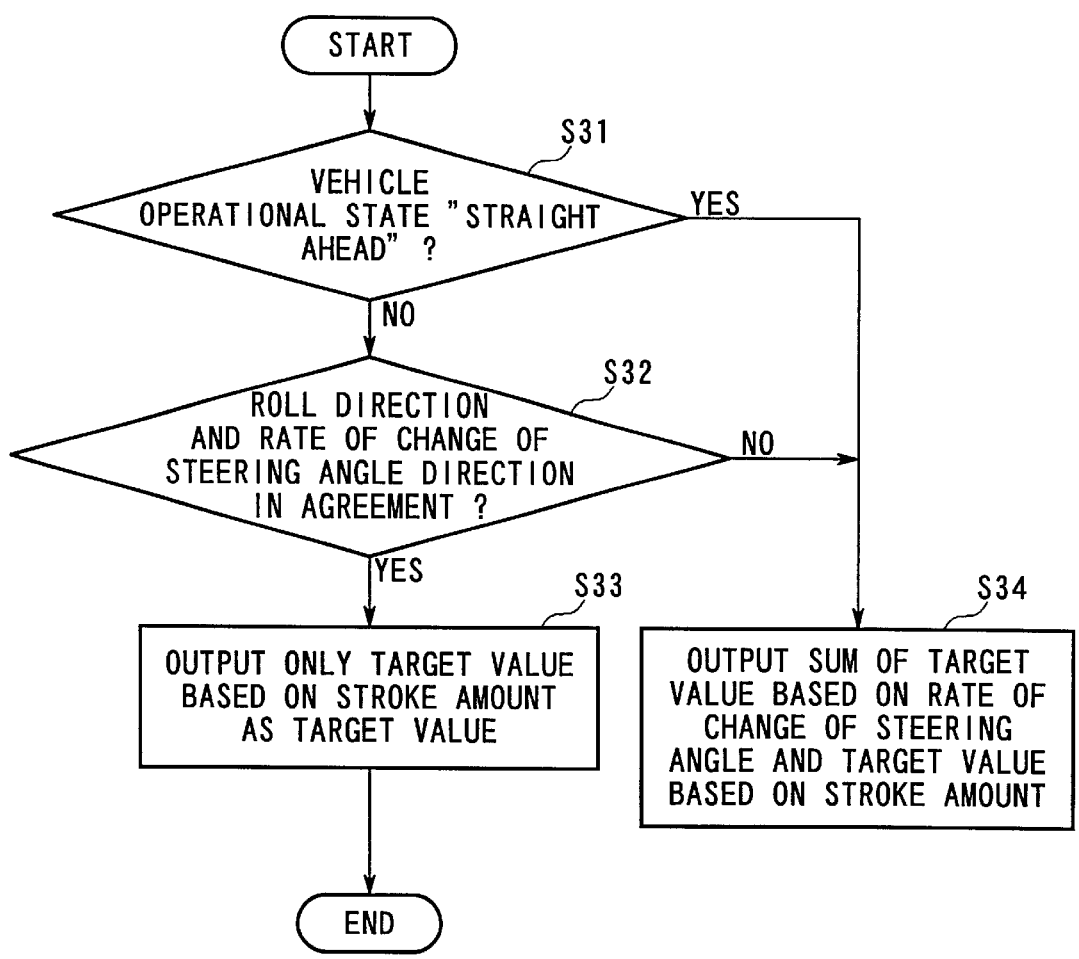
FIG. 5 is a yet further flow chart showing yet more details of the step S1 in the FIG. 2 flow chart.

The control section starts executing the flow charts shown in FIGS. 3 through 5 according to a program which is stored in the storage section in advance.

The procedures in these flow charts are repeated as a single set of procedures at a constant time period (for example, every 10 msec), and control for the generation of the torques TTL and TTR which the actuators 1L and 1R generate is repeatedly performed at this constant time period, according to the results obtained.

Referring initially to the FIG. 3 flow chart, the procedure for calculating target torque values TL and TR based upon the speed of steering will be explained. According to this procedure, the torques TL and TR to be generated by the actuators 1L and 1R are obtained based upon the speed of steering.

First, in a step S11, the control section reads in the steering angle amount which has been outputted by the steering angle sensor SA. Next, in a step S12, the control section decides upon the direction of steering rotation from the output value from the steering angle sensor SA. Here, by the "direction of steering rotation" is meant whether the steering wheel 8 is being turned in the leftward or rightward rotational direction from its straight ahead position, or neither, and this parameter can assume any one of the three values "right", "central", or "left".

Next, in a step S13, the control section calculates the rate of change of steering angle for the above described constant time period, in other words the rate of change of steering angle (units radians/sec) as the differential coefficient of the steering amount. Next, in a step S14, the control section determines the rate of change of steering angle direction, which gives the direction of the rate of change of steering angle, based upon the output value from the steering angle sensor. This is in order to determine the details of the steering state from this direction of the rate of change of steering angle. This direction of the rate of change of steering angle becomes necessary since, for example, it is not possible to distinguish the process when the steering wheel 8 is returned from a state in which it has been turned to the left back to its straight ahead position, only by the direction of steering rotation.

Figure 11:
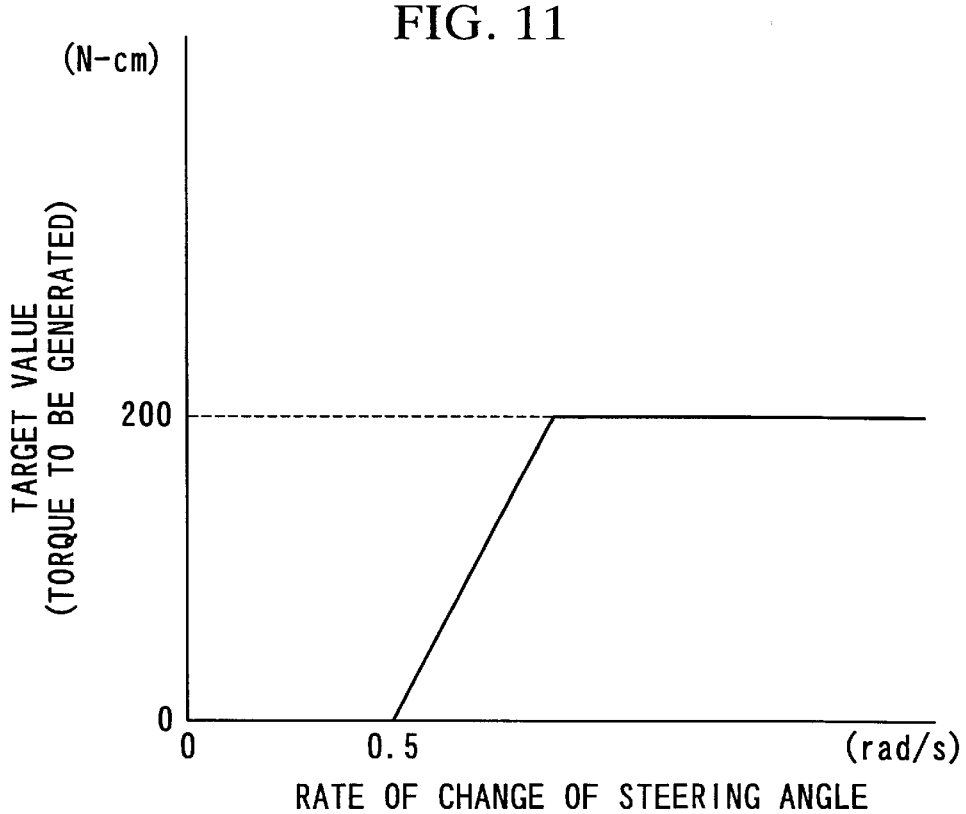
FIG. 11 is an explanatory figure showing an example of a target value map.

Next, the control section obtains a target value according to the rate of change of steering angle which was obtained in the step S13, by referring to a target value which is stored in the storage section. FIG. 11 is an explanatory figure showing an example of a target value map which defines the relationship between the rate of change of steering angle and the torques which are to be generated by the actuators 1L and 1R. The control section refers to this target value map, selects the torque values TL and TR which correspond to the current rate of change of steering angle, and outputs them as the results of calculation. These outputs are transferred to a procedure which will be explained hereinafter (the procedure whose flow chart is shown in FIG. 5).

Next the procedure for calculating target values (YL and YR) based upon the stroke amount will be explained in detail with reference to FIG. 4. First, in a step S21, the control section reads in the respective measured values MDL and MDR from the stroke sensors SL and SR. Then, in a step S22, the control section calculates the difference between these actually measured values and the standard values, in other words the stroke amounts.

In other words, the control section calculates the stroke amount ΔDL for the left rear wheel using the expression "MDL-DL", and, in the same manner, calculates the using the expression "MDR-DR", and then stores both of these in the storage section. The amount of stroke variation from the state in which the vehicle ignition switch was turned ON is determined by this calculation.

Next, in a step S23, the control section calculates a stroke difference ΔLR between the stroke amount ΔDL for the left rear wheel and the stroke amount ΔDR for the right rear wheel, both of which were obtained in the step S22, by using the expression "ΔDL-ΔDR". Next, in a step S24, the control section determines the vehicle operational state, based upon this stroke difference ΔLR. In detail: when the stroke difference ΔLR is substantially equal to zero, the control section determines that the vehicle body is "level" with respect to the surface of the road; when the stroke difference ΔLR is >0, the control section determines that the vehicle body is "right down" with respect to the surface of the road; and, when the stroke difference ΔLR is <0, the control section determines that the vehicle body is "left down" with respect to the surface of the road. The result of this decision is stored as the vehicle operational state value in the storage section, together with the stroke difference ΔL.

Next, in a step S25, the control section calculates a target value based upon this stroke difference ΔLR.

In other words, the value obtained by multiplying the spring rate difference ΔJ between the target spring rate JT (units newtons/mm) which has been set in correspondence to the type of vehicle and the basic spring rate JS (units newtons/mm) of the springs 7L, 7R which are actually provided in the suspension, by the stroke difference ΔLR (units mm), is taken as the roll stiffness reaction force deficiency force FW.

Accordingly, the control section performs a calculation based upon the expression "(JT−JS)×ΔLR" in order to obtain the roll stiffness reaction force deficiency force FW.

Furthermore, the torques TL and TR which are respectively generated by the actuators 1L and 1R are the torques which are required in order to complement the spring rate difference ΔJ which is the deficiency of the basic spring rate JS with respect to the target spring rate JT, and are obtained by multiplying the roll stiffness reaction force deficiency force FW which is determined first, by the lever ratio DD (substantially, the length of the drive arm 4L or 4R; units mm).

In order to do this, the control section performs a calculation based upon the expresson "(FW×DD)/2" in order to obtain the respective torques YL and YR. The reason for dividing "FW−DD" by 2 is that the torque which is required for complementing the roll stiffness (the apparent spring rate increase amount) is provided by performing control for the actuators 1L and 1R so as to cause them to each generate ½ of the torque in the opposite direction, complementarily.

Next, the control section appends polarity to the previously obtained value (FW×DD/2), according to which of "right down" or "left down" the value of the vehicle operational state is, and calculates the torques YL and YR. The torques YL and YR which have been obtained by this calculation are taken as target values, based upon the stroke amounts.

For example, if the driver is steering to the right and the vehicle body B is rolling in the leftwards direction, the control section calculates a torque TL(+FW×DD) for the actuator 1L to provide reaction force in the direction to extend the spring 7L; while, on the other hand, said control section also calculates a torque YR(−FW×DD) for the actuator 1R to provide reaction force in the direction to compress the spring 7R. In the following, for the convenience of explanation, torques in the directions to extend the springs will be designated as (+), while torques in the directions to compress the springs will be designated as (−).

Next, in a step S26, the control section makes a decision as to whether or not the vehicle operating state should be taken as being "straight ahead", based upon the vehicle operational state value and the stroke difference ΔLR. This decision is a decision as to whether the stroke difference ΔLR is 0, or is a value which can be taken as almost 0; and, if the stroke difference ΔLR is within a range which is determined in advance, then this stroke difference is processed as though it were zero. Due to this, it is possible to take the vehicle operational state as being "straight ahead", even if a minute stroke difference is present.

If the result of this decision is that the vehicle operational state cannot be taken as "straight ahead", then the torque values YL and YR which were obtained by the control section in the step S25 are stored in the control section, and then the flow of control of this routine terminates.

On the other hand, if the result of this decision is that the vehicle operational state can indeed be taken as "straight ahead", then in a step S27 the control section, along with taking the value of the vehicle operational state as "straight ahead", also sets the torque values YL and YR, which are the target values based upon the strokes which were obtained previously, to 0, and stores them in the storage section; and then the flow of control of this routine terminates.

Next the procedure for obtaining the target values TTL and TTR for the torques to be actually generated by the actuators 1L and 1R, using the target values (TL and TR) based upon the rate of change of steering angle and the target values (YL and YR) based upon the stroke amount will be explained in detail with reference to FIG. 5.

First, in a step S31, the control section makes a decision as to whether or not the value of the vehicle operational state is "straight ahead", and if the result of this decision is that indeed the value of the vehicle operational state is "straight ahead", then the flow of control is transferred to a step S34, while otherwise, if the value of the vehicle operational state is not "straight ahead", then the flow of control proceeds to the next step S32.

Next, in this step S32, the control section makes a decision, based upon the value of the vehicle operational state and upon the rate of change of steering angle direction, as to whether or not the roll direction of the vehicle body B (either the "left down" direction RL or the "right down" direction RR as shown in FIG. 1) and the rate of change steering angle direction agree with one another. Normally, due to the centrifugal force which is generated when the vehicle is going around a curve, the vehicle body B rolls in the opposite direction to the steering angle. However, when high speed adjustments of the steering angle are performed, it can happen that the direction of the rate of change of the steering angle and the roll direction agree with one another, since the rolling is generated at a timing which is somewhat delayed from steering angle start.

If the result of this decision is that the roll direction and the rate of change steering angle direction agree with one another, then only the target values based upon the stroke amounts are outputted.

In other words, the control section outputs the torques YL and YR which were obtained from the stroke difference ΔLR as the target values for torque TTL and TTR.

On the other hand, if the result of this decision is that the roll direction and the rate of change steering angle direction do not agree with one another, then in the step S34 the target values based upon the rate of change of steering angle and the target values based upon stroke amounts are added together and are outputted.

In other words, the control section calculates the torque TTL to be generated by the actuator 1L based upon the expression "YL+TL", and calculates the torque TTR to be generated by the actuator 1L based upon the expression "YR+TR", and outputs these torque values TTL and TTR which have been obtained by this calculation as the target values for torque.

Next the procedure for calculating the target values in the case of skyhook control, summarized in the step S2 of FIG. 2, will be explained in detail with reference to FIG. 6.

First, in a step S41, the control section reads in the acceleration GB in the upwards and downwards directions of the vehicle body, which is the output from the acceleration sensor SB which detects said upwards and downwards acceleration of the vehicle body. Next, in a step S42, the control section calculates a cancellation value for cancelling the DC offset value which is included in this acceleration GB in the upwards and downwards directions of the vehicle body. This cancellation value DC(k) is calculated according to the equation DC(k)=(0.75/(0.75+T))·(DC(k−1)+GB(k)−GB(k−1). In this equation, T is the sampling time and GB is the acceleration in the upwards and downwards directions, while (k) means the newest value, and (k−1) means the value in the previous episode of this calculation.

Next, in a step S43, the control section calculates the speed y(k) of the vehicle body B upon the springs. This speed y(k) is calculated according to the equation y(k)=(1/(1.3+T))·(1.3y(k−1)+T·DC(k)). In this equation, T is the sampling time, and DC is the cancellation value which was calculated in the step S42. Furthermore, (k) means the newest value, and (k−1) means the value in the previous episode of this calculation.

Next, in a step S44, the control section determines the directions for operation of the actuators 1L and 1R, based upon the speed y(k) which was calculated in the step S43. The result of this determination of the direction for operation is the direction to compress the actuators 1L and 1R if the speed y(k) upon the springs is a positive value, while it is the direction to extend them if said speed y(k) is a negative value.

Next, in a step S45, the control section calculates the target values of the torques TTL and TTR, based upon the speed upon the springs y(k).

These target values TTL and TTR are calculated according to the equations TTL, TTR=|y(k)|·C·K. Here, C is a damping constant, while K is a torque constant.

Next the procedure for calculating the target values in the case of pitching suppression control, summarized in the step S3 of FIG. 2, will be explained in detail with reference to FIG. 7.

First, in a step S51, the control section reads in the forwards and rearwards acceleration GC, which is the output value of the acceleration sensor SC which detects the acceleration in the forwards and rearwards direction of the vehicle body B. Then in a step S52 the control section determines the directions of the reaction forces to be generated by the actuators 1L and 1R, based upon the forwards and rearwards acceleration GC which has thus been read in.

The directions of these reaction forces based upon the value of the forwards and rearwards acceleration GC are determined according to whether it is decided that the vehicle is accelerating or is decelerating. If the vehicle is accelerating, since the load is moving to the rear, the springs 7L and 7R for the rear wheels are compressed. On the other hand, if the vehicle is decelerating, since the load is moving forwards, the springs 7L and 7R for the rear wheels are extended. Accordingly, if it is decided that the vehicle is accelerating, then the directions in which the reaction forces are generated are set to be the directions which extend the springs 7L and 7R, while, on the other hand, if it is decided that the vehicle is decelerating, then the directions in which the reaction forces are generated are set to be the directions which compress the springs 7L and 7R.

Next, in a step S53, the control section calculates a movement amount by which the load has moved, according to the acceleration or deceleration. This load movement amount ΔW is calculated according to the equation ΔW (½)·(hg/L)·W·Xg. In this equation, hg is the height of the center of gravity of the vehicle, L is the wheelbase of the vehicle, W is the weight of the vehicle, and Xg is the absolute value of the forwards and rearwards acceleration GC. Next, in a step S54, the control section calculates and outputs a target value TTL for a single actuator. Since it is acceptable for the reaction force for the load movement amount ΔW to be generated simultaneously in the same direction by both of the two actuators 1L and 1R, therefore the target value torques TTL and TTR are both calculated according to the equation TTL, TTR=ΔW/2.

Figure 8:
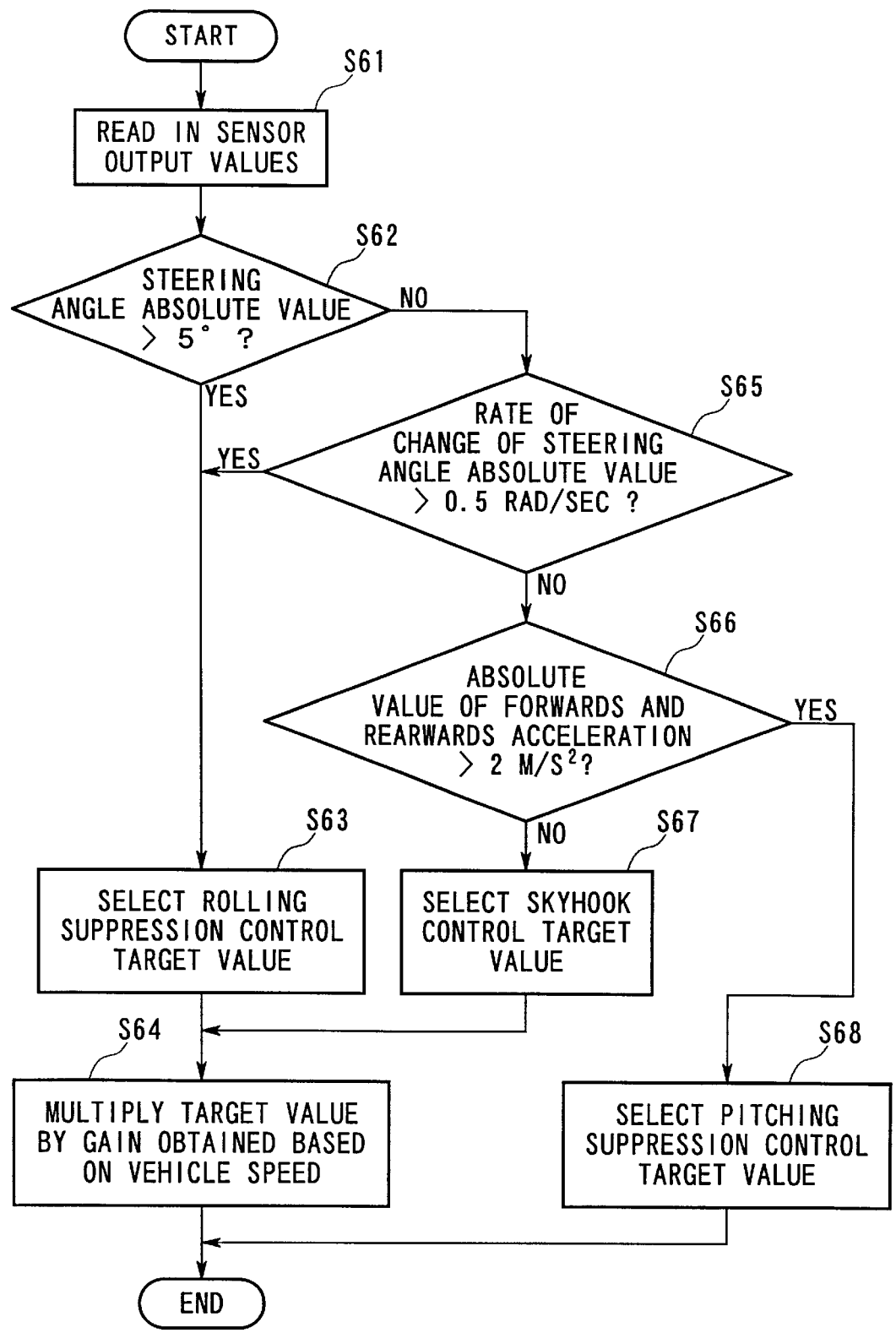
FIG. 8 is a flow chart showing the details of a step S4 in the FIG. 2 flow chart.

Next the procedure for determining the control mode to be applied, summarized in the step S4 of FIG. 2, will be explained in detail with reference to FIG. 8.

First, in a step S61, the control section reads in the output values from the sensors. This reading in of the sensor output values at this time means reading in those output values which were obtained at the time of executing the procedure described above which obtains the target values, and were stored in the storage section. Next, in a step S62, the control section determines whether or not the absolute value of the steering angle is greater than the value 5 (units degrees). If the result of this determination is that the absolute value of the steering angle is greater than 5, then it is considered that the vehicle is being steered around a curve, and in a step S63 the target values for rolling suppression control are selected.

Figure 12:
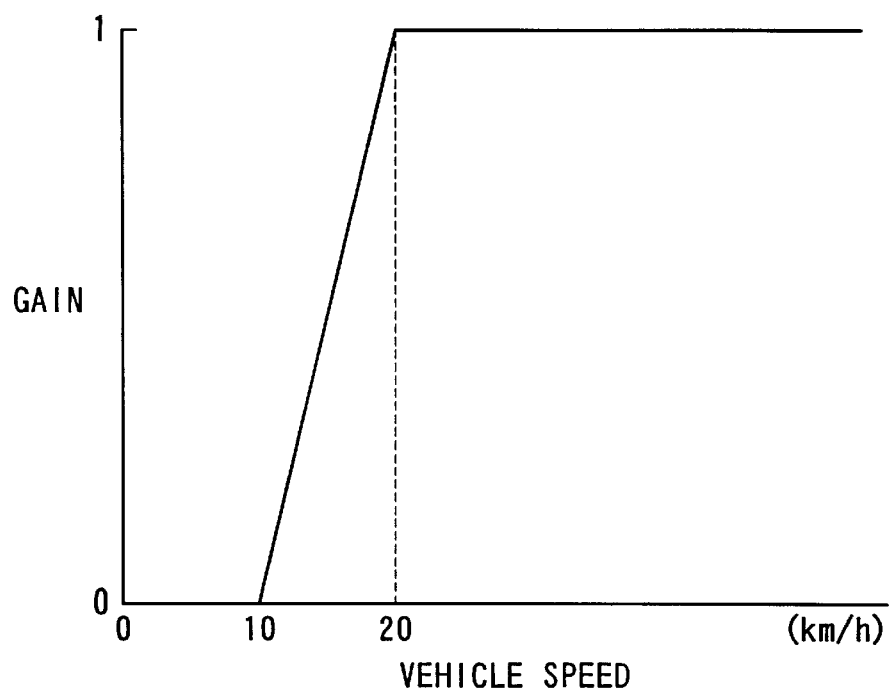
FIG. 12 is an explanatory figure showing an example of a gain map from which is obtained a gain by which the target value is multiplied.

Next, in a step S64, the control section multiplies the target values which have been selected by a gain which is obtained based upon the vehicle speed at the present time point. This gain to be multiplied into the target values is obtained by referring to a gain map shown in FIG. 12 which defines the relationship between the vehicle speed and the gain. As shown in FIG. 12, this gain map shows the vehicle speed along the X axis and the gain along the Y axis, and the gain is a value between 0 and 1. In the shown example, if the vehicle speed is between 0 and 10 (units km/h) inclusive the gain is 0, and if the vehicle speed is greater than or equal to 20 km/h the gain is 1, while if the vehicle speed is between 10 km/h and 20 km/h the gain is obtained by linear interpolation between the above values.

Accordingly this means that, for vehicle speeds between 0 km/h and 10 km/h, no control by the actuators 1L and 1R is performed; while, above a vehicle speed of 20 km/h, control is performed according to the target values which were set in the step S63 above.

Since by multiplying the target values by the gain in this manner it becomes possible to vary the target values according to the vehicle speed, therefore at relatively low vehicle speeds of less than or equal to 10 km/h minute control operation according to the influence of convexities and concavities upon the road surface is performed, and it is possible to prevent deterioration of the ride comfort.

Next, if the result of the determination in the step S62 is that the absolute value of the steering angle is less than 5 (units degrees), then in a step S65 the control section determines whether or not the absolute value of the rate of change of steering angle is greater than 0.5 (units radians/sec). If the result of this determination is that indeed the absolute value of the rate of change of steering angle is greater than 0.5, then it is determined that the possibility that rolling is being generated is high, since the rate of change of steering angle is fast although the steering angle is small, and the flow of control is transferred to the step S63, and the procedure described above is performed. On the other hand, if the result of this determination in the step S65 is that the absolute value of the rate of change of steering angle is less than 0.5 radians/sec, then in a step S66 the control section makes a decision as to whether or not the absolute value of the acceleration in the forwards and rearwards direction is greater than 2 m/s$^2$. If the result of this decision is that the absolute value of the acceleration in the forwards and rearwards direction is less than 2 m/s$^2$, then in a step S67 the control section selects the target values for skyhook control, and the flow of control is transferred to the above step S64, in which these target values which have been obtained are multiplied by the gain which is based upon the vehicle speed. Furthermore, if the result of the decision in the step S66 is that the absolute value of the acceleration in the forwards and rearwards direction is greater than 2 m/s$^2$, then in a step S68 the control section selects the target values for pitching suppression control. When these target values for pitching suppression control have been selected, the control section does not perform any multiplication thereof by any gain which is based upon the vehicle speed, as in the step S64. This is because it is not necessary to multiply by any gain based upon the vehicle speed, since it has been detected whether or not the acceleration in the forwards and rearwards direction is greater than a predetermined value which can easily generate pitching, and, based upon the absolute value of this acceleration in the forwards and rearwards direction, pitching suppression control has been decided upon.

In this manner, the operational state of the vehicle body B is determined according to whether or not various predetermined conditions are fulfilled, based upon the output values from sensors which are fitted to the vehicle, and if the result of this determination is that the vehicle is in the operational state of being driven around a curve then it is arranged for control of the suspension to be performed so that rolling is suppressed; so that it becomes possible to obtain the same beneficial results as if, so to speak, the spring rates of the suspension were to be made greater only when the vehicle was being driven around a curve.

Furthermore, if the result of this decision is that the vehicle is in the state of being driven directly ahead, then it is arranged for control of the suspension to be performed so that, primarily, bouncing is suppressed; and thereby, since in this case it is arranged for the comfort of the ride to be enhanced, it becomes possible to obtain the same beneficial results as if, so to speak, the spring rates of the suspension were to be reduced only when the vehicle was being driven in a straight line.

Yet further, if the result of this decision is that the vehicle is in the state of being driven directly ahead and also of being accelerated or decelerated, then it is arranged for control of the suspension to be performed so that, primarily, pitching is suppressed; and thereby it becomes possible to obtain the same beneficial results as if, so to speak, the spring rates of the suspension were to be increased only during acceleration or deceleration of the vehicle.

Embodiment 2

In the following, a second preferred embodiment of the present invention will be described with reference to FIGS. 9 and 10.

Figure 9:
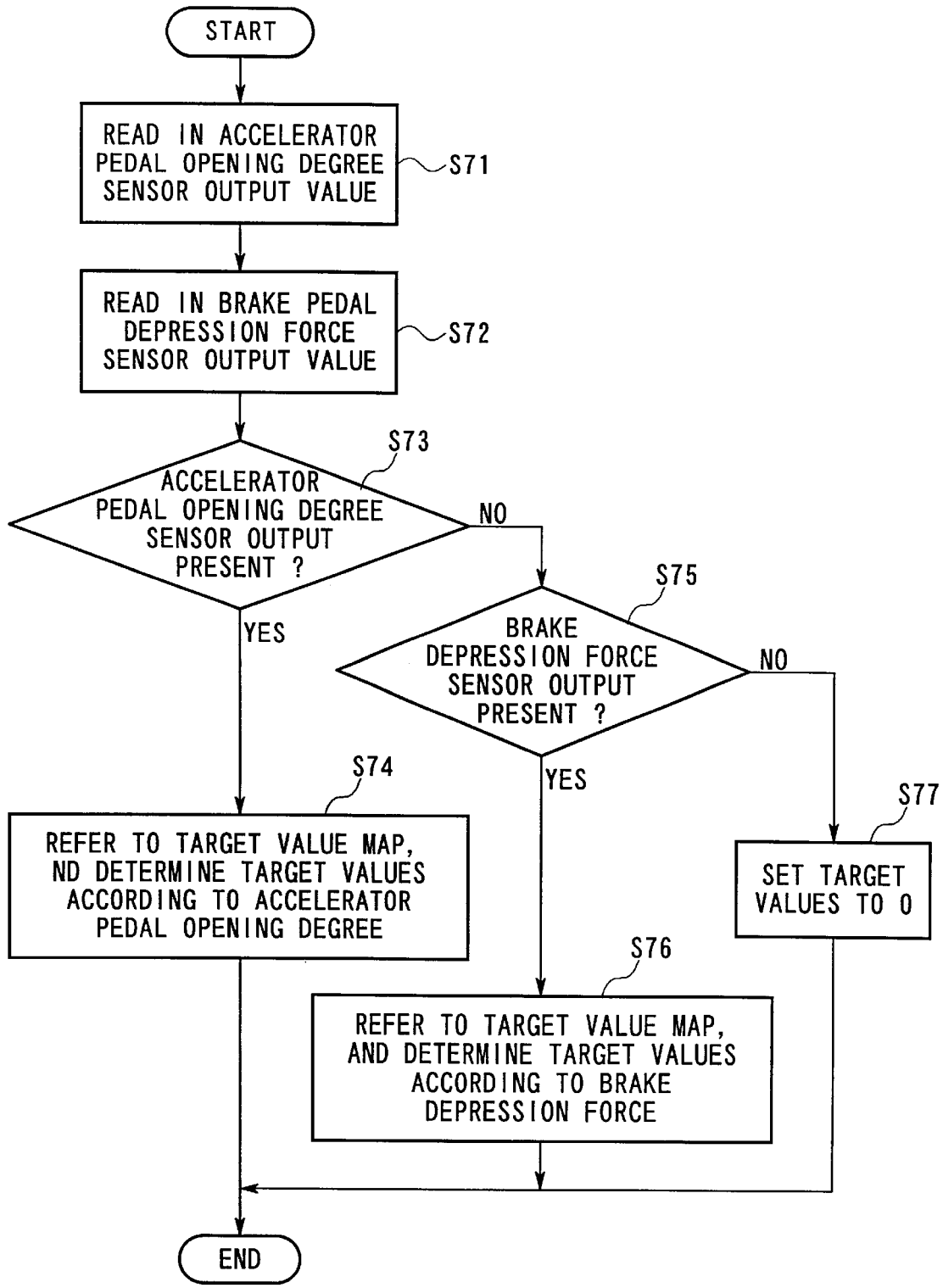
FIG. 9 is another flow chart showing details of the step S3 in the FIG. 2 flow chart.

FIG. 9 is a flow chart showing the detailed flow of the procedure which calculates the target values without using the output from the forwards and rearwards acceleration sensor, in the procedure for calculation of the target values used in pitching suppression control shown in FIG. 2. And FIG. 10 is a flow chart showing, for this case of obtaining the target values by the procedure shown in FIG. 9, only the portions of the control mode decision procedure which differ from those shown in FIG. 8.

Figure 13:
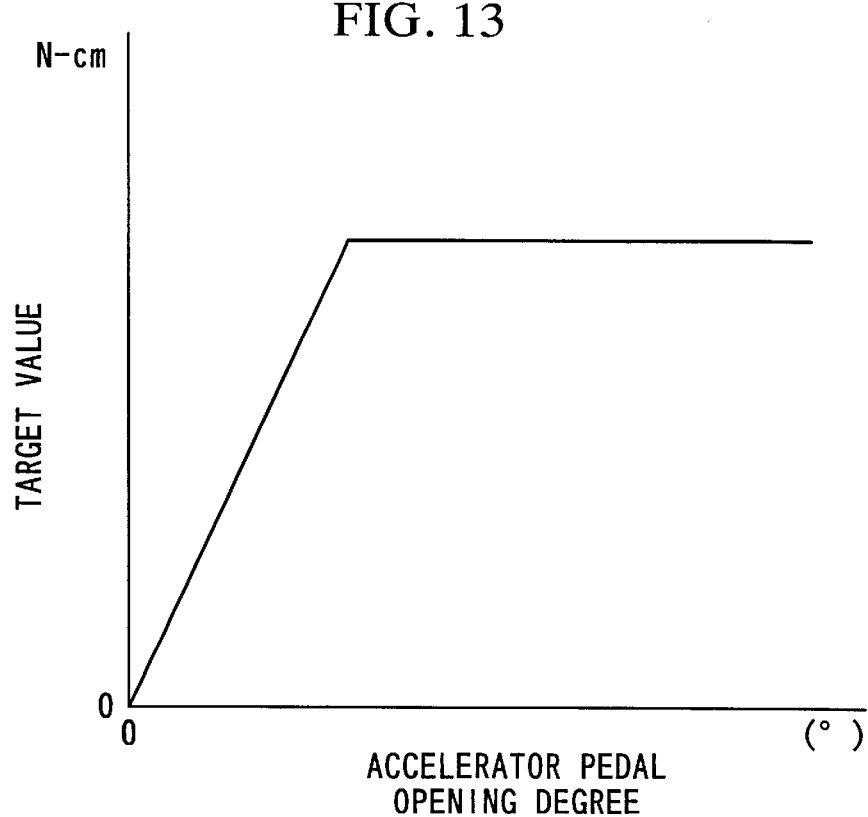
FIG. 13 is an explanatory figure showing an example of a map of target value against accelerator pedal depression amount.

First, in a step S71, the control section reads in the output value from the accelerator pedal depression amount sensor SD. Next, in a step S72, the control section reads in the output value from the brake pedal stepping on force sensor SE. Next, in a step S73, the control section decides whether or not the accelerator pedal depression amount sensor SD is actually providing output. If the result of this decision is that indeed the accelerator pedal depression amount sensor SD is providing output, then in a step S74 the control section refers to a target value map and obtains the target values based upon the depression amount of the accelerator pedal. An example of such a target value map for obtaining these target values according to the accelerator pedal depression is shown in FIG. 13.

Figure 14:
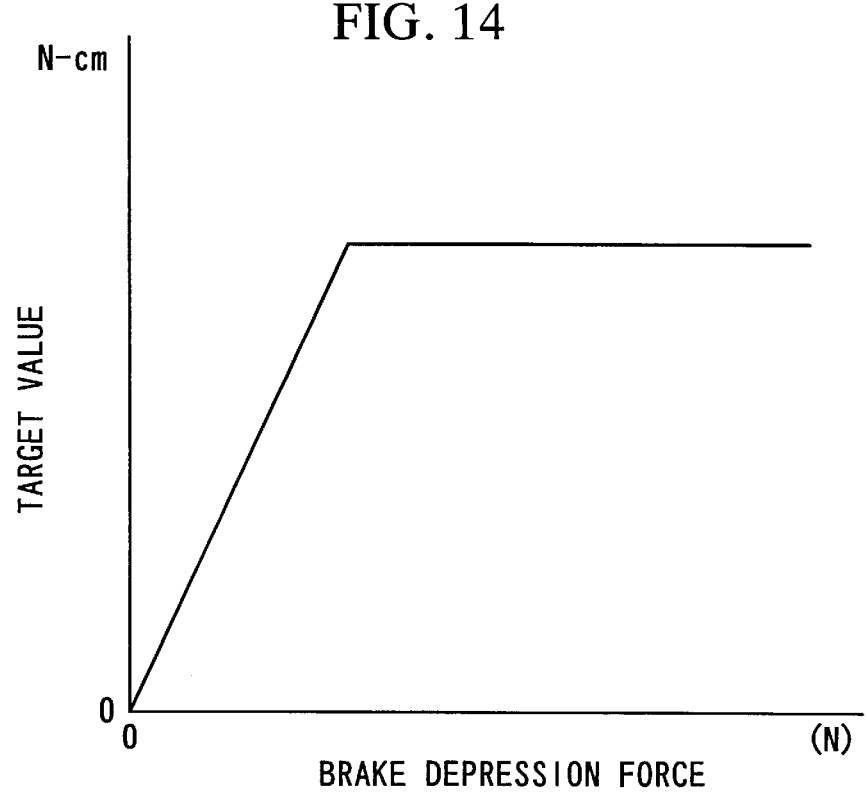
FIG. 14 is an explanatory figure showing an example of a map of target value against brake pedal stepping on force.

If the result of the decision in the step S73 is that the accelerator pedal depression amount sensor SD is not providing any output, then in a step S75 the control section makes a decision as to whether or not any output is being provided by the brake pedal stepping on force sensor SE. If the result of this decision is that the brake pedal stepping on force sensor SE is indeed providing output, then in a step S76 the control section refers to a target value map and obtains the target values based upon the amount of stepping on force which is being applied to the brake pedal. An example of such a target value map for obtaining these target values according to the brake pedal stepping on force is shown in FIG. 14.

On the other hand, if the result of the decision in the step S75 is that the brake pedal stepping on force sensor SE is not providing any output, then in a step S75 the control section sets the target values to 0.

Next, the procedure for control mode determination in this second preferred embodiment of the present invention will be explained with reference to FIG. 10. FIG. 10 is a partial flow chart showing only the portions of the procedure which correspond to the steps S65 through S68 in FIG. 8. In this figure, the action of the steps S65, S67, and S68 is the same as in the FIG. 8 procedure. Thus, the point in which the procedure shown in FIG. 10 differs from the procedure shown in FIG. 8 is that, instead of the step S66 of FIG. 8, steps S66A and S66B are provided in the FIG. 10 procedure. If in the step S65 it has been determined that the rate of change of steering angle absolute value is less than 0.5 (units radians/sec), then in the step S66A the control section determines whether or not the amount of depression of the accelerator pedal is greater than 10°. If the result of this decision is that the amount of depression of the accelerator pedal is greater than 10°, then the flow of control is transferred to the step S68; while on the other hand, if the result of this decision is that the amount of depression of the accelerator pedal is less than 10°, then the flow of control is transferred to the step S66B, in which the control section determines whether or not the force by which the brake pedal is being stepped upon is less than 20 (units N, i.e. newtons). If the result of this decision is that the brake pedal stepping upon force is greater than 20 N, then the flow of control is transferred to the step S68; while on the other hand, if the result of this decision is that the brake pedal stepping upon force is less than 20 N, then the flow of control proceeds to the step S67.

Thus, since the decision as to whether or not the vehicle is being accelerated or decelerated is arrived at in this manner according to the amount of depression of the accelerator pedal and the force by which the brake pedal is being stepped upon, without using any forwards and rearwards acceleration sensor, therefore it is possible to eliminate disturbances due to vibration from the road surface and slope of the road surface. As a result this makes it possible to simplify the procedure of state determination, and enables fine grained control to be performed.

The above explanation was made, by way of example, in terms of the actuators 1L and 1R being fitted to the rear wheels of the automobile, but it is equally possible for the above type of control to be performed for actuators which are fitted to the suspension of the front wheels, in the same manner. Furthermore, it is possible for actuators to be fitted to the entire suspension, i.e. both to the suspension for the rear wheels and also to the suspension for the front wheels, and in this case the above described type of control can be performed for all four wheels of the vehicle.

As described above, it is determined, according to the operational state of the vehicle, whether the vehicle is in the operational state of being driven around a curve or is in the operational state of being driven straight ahead, and, if the vehicle is being driven around a curve, control is performed for the left wheel and for the right wheel in opposite senses, so as principally to suppress rolling, while on the other hand, if the vehicle is being driven straight ahead, then control is performed for the left wheel and for the right wheel in the same sense, so as principally to suppress bouncing; and thereby it becomes possible to enhance control stability, and also to improve the comfort of the ride from the point of view of the persons riding in the vehicle.

Furthermore, since principally pitching of the vehicle body is suppressed by controlling the suspension for the left wheel and the suspension for the right wheel in the same sense when the vehicle is being driven in a straight line even during vehicle acceleration or deceleration, thereby, during vehicle acceleration, since the force which tends to lift the rear of the vehicle body is transmitted as reaction force to the road surface, accordingly the effective weight contacting the road surface is increased, and it becomes possible to increase the gripping force of the tires of the vehicle, so that more efficient acceleration can be performed. Furthermore, since, it is possible to reduce depression of the rear of the vehicle body during vehicle deceleration, accordingly it becomes possible to reduce erratic behavior of the vehicle at this time.

Embodiment 3

Figure 17:
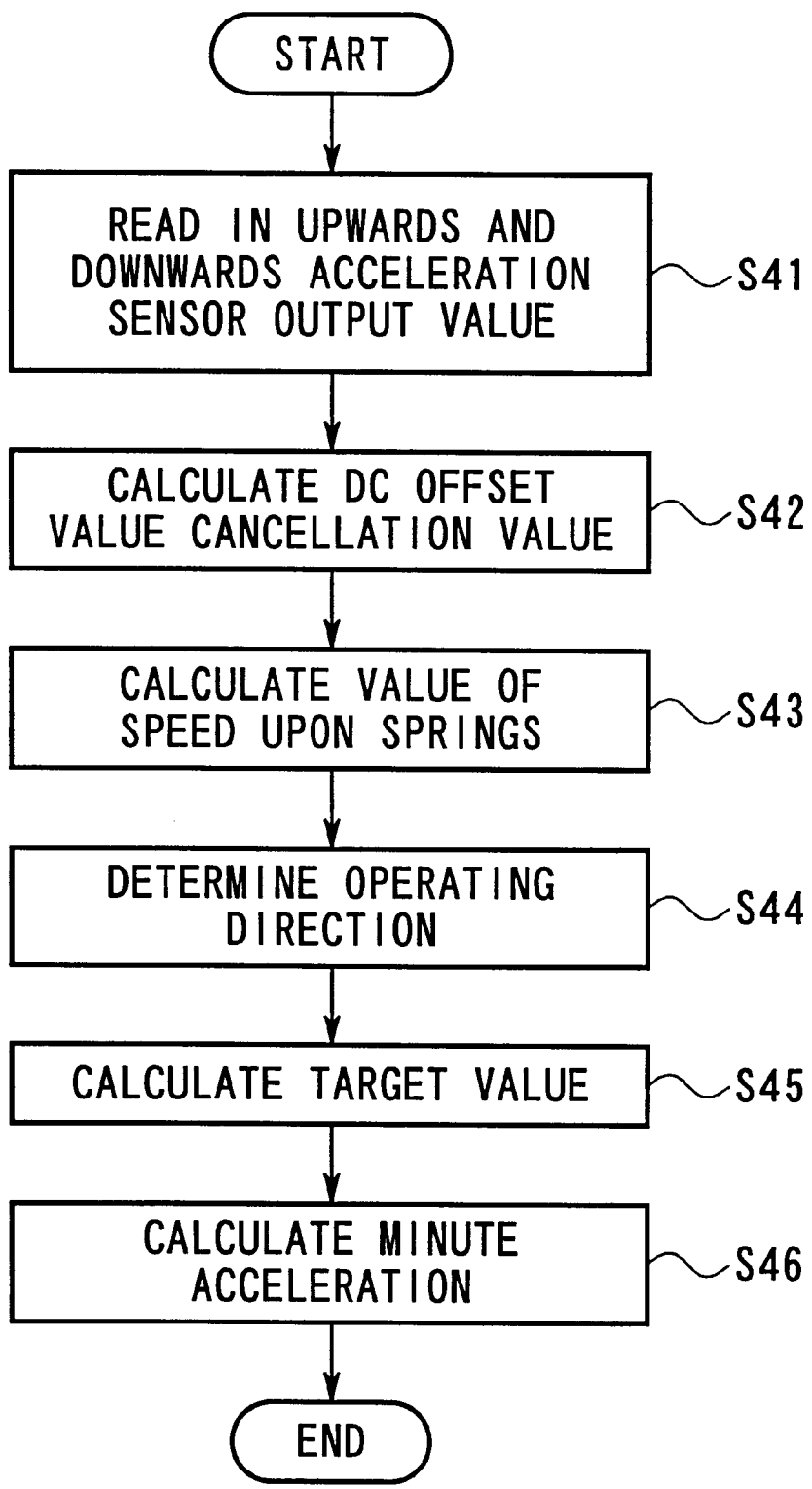
FIG. 17 is a flow chart showing the details of a variant example of the step S2 in the FIG. 2 flow chart.

In the third preferred embodiment of the present invention, the procedure for skyhook control (the step S2) of the first preferred embodiment shown in FIG. 2 is characterized by being modified as shown in FIG. 17. The other processes are the same as in the first preferred embodiment described above, and accordingly description thereof will be curtailed.

Figure 18:
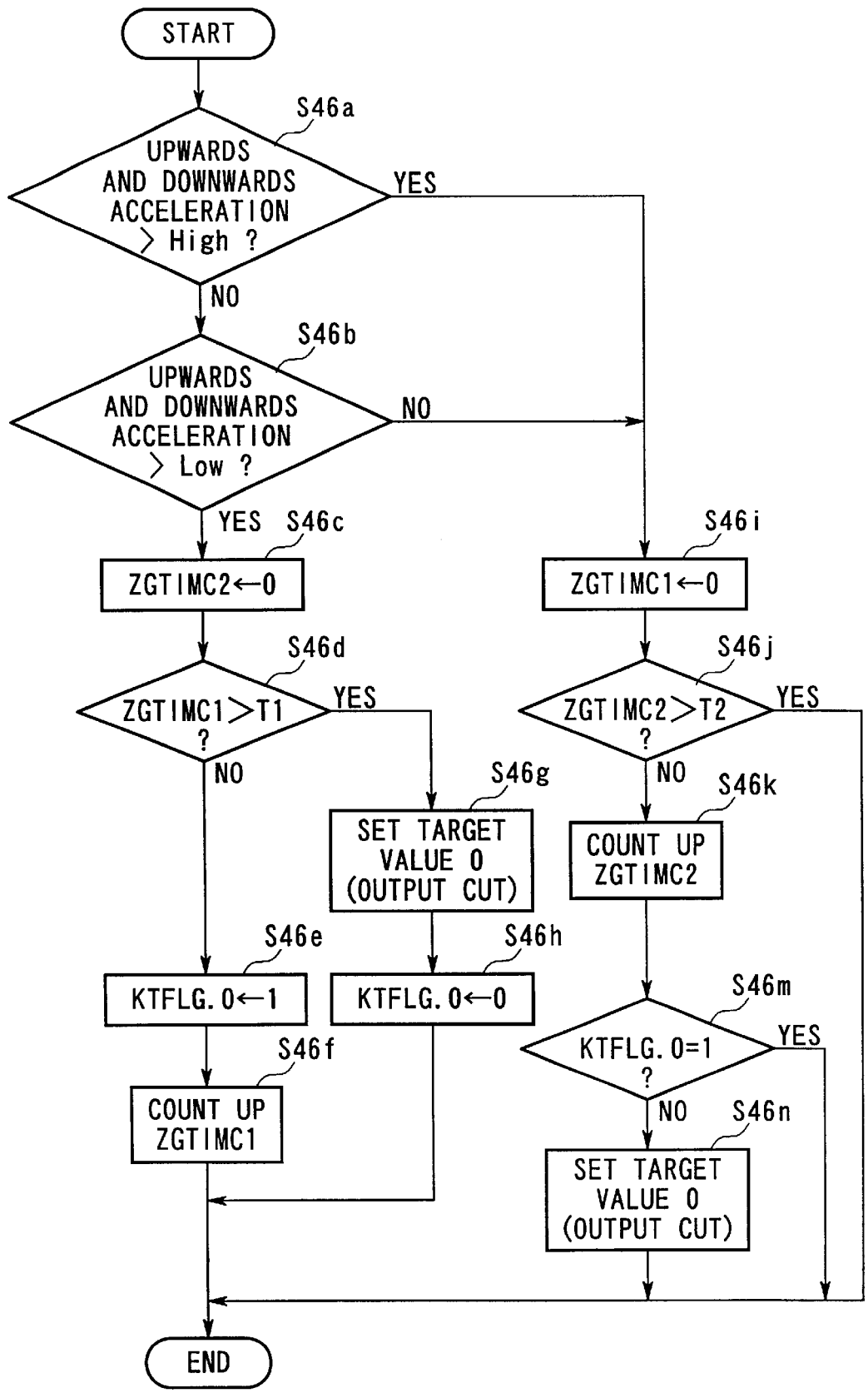
FIG. 18 is a flow chart showing further details of this variant example of the step S2 in the FIG. 2 flow chart.

In this third preferred embodiment, after having performed the same processes up to the step S45 shown in FIG. 17 as in the case of the first preferred embodiment, in a step S46 the control section calculates the micro acceleration, and performs changeover of the target values based upon the result of this calculation. The details of this micro acceleration determination process will now be explained with reference to FIG. 18. FIG. 18 is a flow chart for explanation of the step S46 shown in FIG. 17.

First, in a step S46a, the control section determines whether or not the acceleration GB in the upwards and downwards direction which was obtained in the step S41 is greater than a previously determined upper threshold value High. If the result of this determination is that indeed the acceleration GB in the upwards and downwards direction is greater than this upper threshold value High, then the flow of control is transferred to a step S46i. On the other hand, if the result of this determination is that the acceleration GB in the upwards and downwards direction is less than the upper threshold value High, then in a step S46b the control section determines whether or not the acceleration GB in the upwards and downwards direction is greater than a previously determined lower threshold value Low. If the result of this determination is that the acceleration GB in the upwards and downwards direction is not greater than this lower threshold value Low, then the flow of control is transferred to the step S46i.

The determination process in the steps S46a and S46b is a procedure for determining whether or not the acceleration GB in the upwards and downwards direction is within the range from above the lower threshold value Low to below the upper threshold value High, and if the acceleration GB is outside this range then the flow of control is transferred to the step S46i, while on the other hand if the acceleration GB is within this range then the flow of control continues to the step S46c. The threshold values High and Low bracket the acceleration of gravity (9.8 m/sec$^2$), and are values separated therefrom by substantially the same width above and below.

Next, in the step S46c when it has been determined that the acceleration GB in the upwards and downwards direction is within this range, the control section substitutes 0 for a counter ZGTIMC1, thus resetting it. Next in a step S46d the control section decides whether or not the current value of this counter ZGTIMC1 is greater than an elapsed time threshold value T1. If the result of this decision is that the value of the counter ZGTIMC1 is less than this elapsed time threshold value T1 (which may for example be about 0.5 seconds), then in a step S46e the control section sets a flag KTFLG to "1". Next in a step S46f the control section counts up the counter ZGTIMC1, and then the control flow of this procedure terminates.

On the other hand, if the result of the decision in the step S46d is that the value of the counter ZGTIMC1 is greater than this elapsed time threshold value T1 (which may for example be about 0.5 seconds), then in a step S46g the control section sets the target values to "0" in order to cut the outputs of the actuators 1L and 1R. Next in a step S46h the control section sets the flag KTFLG to "0", and then the control flow of this procedure terminates.

Next, the procedure in the case that the acceleration GB in the upwards and downwards direction is outside the range defined by these threshold values will be explained. First, in the step S46i, the counter ZGTIMC1 is reset to "0". Next, in a step S46j, the control section makes a decision as to whether or not the current value of this counter ZGTIMC2 is greater than an elapsed time threshold value T2 (which may for example be about 1 second). If the result of this decision is that the value of the counter ZGTIMC2 is greater than this elapsed time threshold value T2, then the control flow of this procedure terminates.

On the other hand, if the result of the decision is that the value of the counter ZGTIMC2 is less than this elapsed time threshold value T2, then in a step S46k the control section counts up the counter ZGTIMC2. Next, in a step S46m, the control section makes a decision as to whether or not the value of the flag KTFLG is "1". If the result of this decision is that indeed the value of the flag KTFLG is "1", then the control flow of this procedure terminates. On the other hand, if the result of the decision is that the value of the flag KTFLG is not "1", then in a step S46n the control section sets the target values to "0" in order to cut the outputs of the actuators 1L and 1R, and then the control flow of this procedure terminates. In this manner, this micro acceleration determination procedure is a procedure for replacing the target values which have been calculated based upon this acceleration GB in the upwards and downwards direction by "0", if the change of the acceleration GB in the upwards and downwards direction in comparison with the stationary state is minute, in order to ensure that no reaction forces should be generated by the actuators 1L and 1R.

The procedure of comparison of the counters ZGTIMC1 and ZGTIMC2 with the elapsed time threshold values T1 and T2 is implemented, after obtaining the elapsed time, by performing a comparison procedure by multiplying the predetermined time period Te over which the execution of the procedure shown in FIG. 18 is repeated, by the values in the counters.

The procedure shown in FIG. 18 will now be explained with reference to FIGS. 19A and 19B.

Figure 19A:
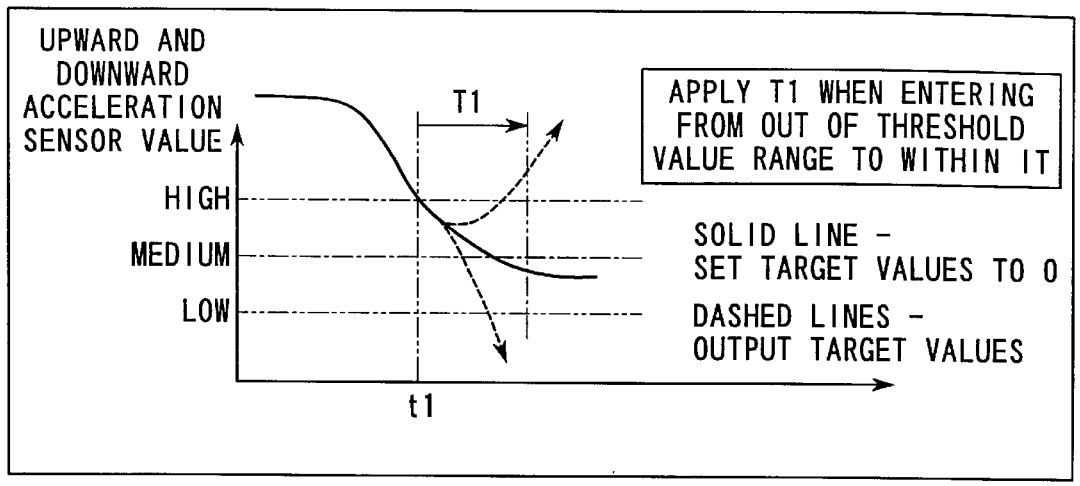
FIGS. 19A and 19B are explanatory figures for explanation of the operation shown in the FIG. 18 flow chart.

FIG. 19A is a figure for explanation of the procedure when the value from the upwards and downwards acceleration sensor changes from being outside the range defined by the threshold values (the range from Low to High) to being within this range. In FIG. 19A, the output value from the upwards and downwards acceleration sensor is shown along the Y axis, while time is shown along the X axis. As shown in this figure, in the period up to the time point t1, since the output value from the acceleration sensor is greater than the threshold value High, accordingly the target values are calculated based upon the output value from this upwards and downwards acceleration sensor, and thus reaction forces are generated by the actuators 1L and 1R.

Next, elapsed time starts to be counted from this time point t1, when at this time point t1 the output value from the upwards and downwards acceleration sensor changes from being outside the threshold value range to being inside said range. The target values remain set to "0" while the sensor output value remains within the threshold value range, even when the elapsed time becomes greater than the threshold value T1 (as shown by the solid line in FIG. 19A). On the other hand, if the sensor output value changes so as again to fall outside the threshold value range (as shown in FIG. 19A by the dotted lines), even if the elapsed time threshold value T1 has not been exceeded, then the target values which have been calculated are again used, so that reaction forces are generated by the actuators 1L and 1R.

Figure 19B:
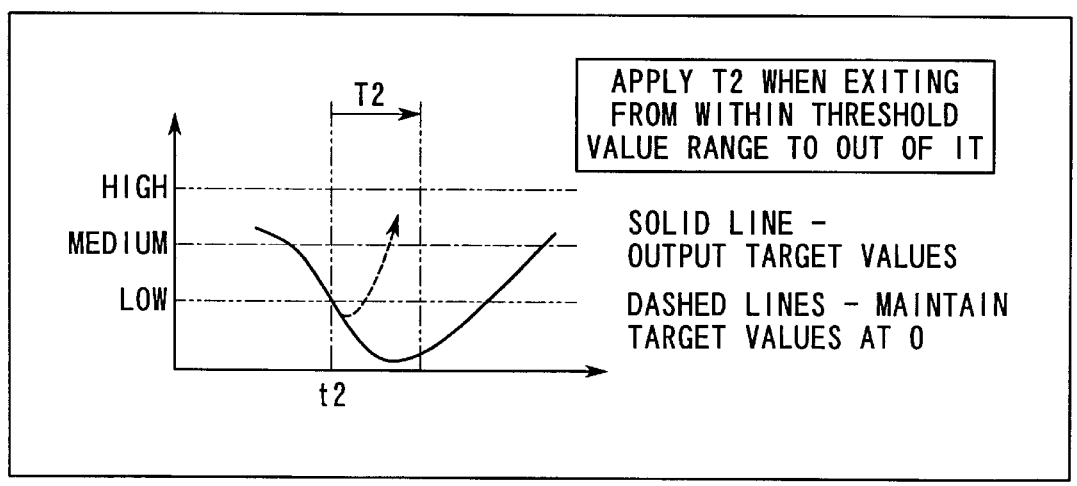

Furthermore, FIG. 19B is a figure for explanation of the procedure when the output value from the upwards and downwards acceleration sensor changes from being within the range defined by the threshold values to being outside this range. In FIG. 19B, the output value from the upwards and downwards acceleration sensor is shown along the Y axis, while time is shown along the X axis. As shown in this figure, in the period up to the time point t2, since the output value from the acceleration sensor is within the range defined by the threshold values, accordingly the target values are set to "0", and thus no reaction forces are generated by the actuators 1L and 1R.

Next, elapsed time starts to be counted from this time point t2, when at this time point t2 the output value from the upwards and downwards acceleration sensor changes from being inside the threshold value range to being outside said range. The target values which have been calculated continue to be used while the sensor output value remains outside the threshold value range, even when the elapsed time becomes greater than the threshold value T2 (as shown by the solid line in FIG. 19B), so that reaction forces continue to be generated by the actuators 1L and 1R. On the other hand, if the sensor output value changes so as again to fall within the threshold value range (as shown in FIG. 19B by the dotted line), even if the elapsed time threshold value T2 has not been exceeded, then the target values remain set to "0".

According to this type of operation, if the sensor output value varies only within the range defined by the threshold values (within the range from Low to High), and moreover the elapsed time has exceeded its elapsed time threshold value T1, then it becomes possible to ignore this micro acceleration in the upwards and downwards direction, and the actuators 1L and 1R can be controlled so as not to generate any reaction forces. Furthermore if, while the elapsed time is shorter than its elapsed time threshold value T2, the sensor output value varies from within the threshold value range to outside said range and then back to within said range again, then again it becomes possible to ignore the high frequency component of the acceleration in the upwards and downwards direction, and the actuators 1L and 1R can be controlled so as not to generate any reaction forces.

Figure 10:
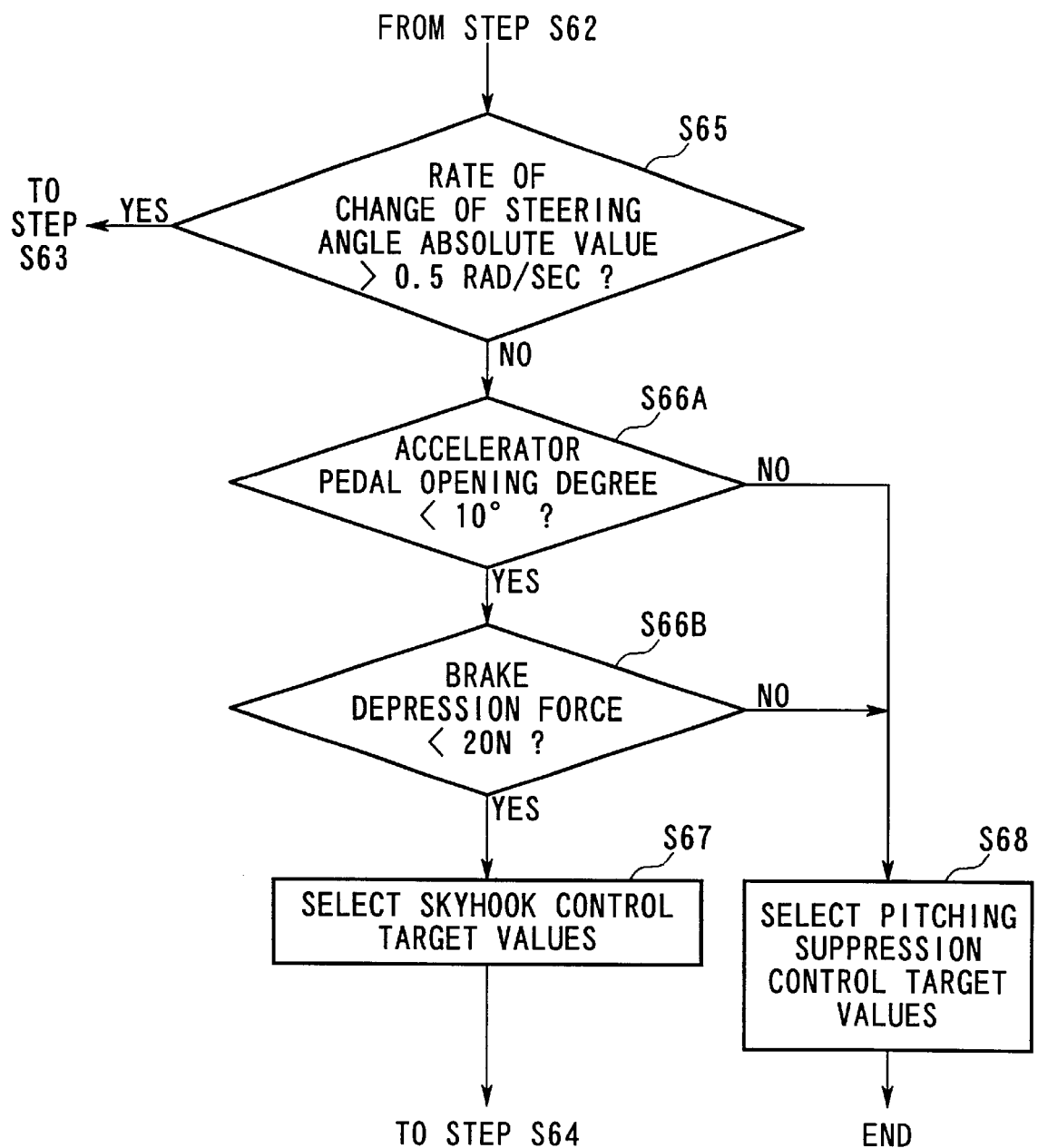
FIG. 10 is another flow chart showing details of the step S4 in the FIG. 2 flow chart.

In this case as well, it is possible to combine the concept of this preferred embodiment with the procedures shown in the flow charts of FIGS. 9 and 10.

Embodiment 4

There is a per se known type of roll stiffness variation system, such as for example the electric motor type suspension disclosed in Japanese Patent Laying Open Publication Heisei 7-149130, in which the output shaft of a motor actuator is connected to a suspension arm, which rotatably suspends a vehicle wheel, so as to be able to transmit torque thereto and to drive it, and in which the reaction force of a stabilizer is supplemented by torque due to the motor. In this type of suspension device, when a torque command is inputted to the motor actuator in order to cause it to generate a torque value which is required, then a target electrical current command is calculated, based upon this torque command and the rotational speed of the motor, as an electrical current command for designating the electrical current to be supplied to the motor. The actual current value of the electrical current which is actually supplied to the motor is detected, and feedback control is performed so as to converge this actual electrical current value to the target electrical current value, in other words, so as to bring the difference between this actual electrical current value and the target electrical current value to zero. Various known types of control may be utilized for this feedback control, such as for example proportional operation (P operation), integrating operation (I operation), PID control (proportional integral and differential operation) which is a combination of these with differentiating operation (D operation), and the like.

However, with PID control, it sometimes happens that it becomes necessary to increase the proportional coefficient when improving the convergence performance of the actual electrical current value to the target electrical current value, and in accompaniment with increase of this correction coefficient inconvenience such as generation of vibrations or the like of the control system can easily occur, so that there is a danger that the operability or the driving stability of the vehicle may be deteriorated.

The fourth preferred embodiment of the present invention has as its objective to solve the abovementioned problem.

Figure 20:
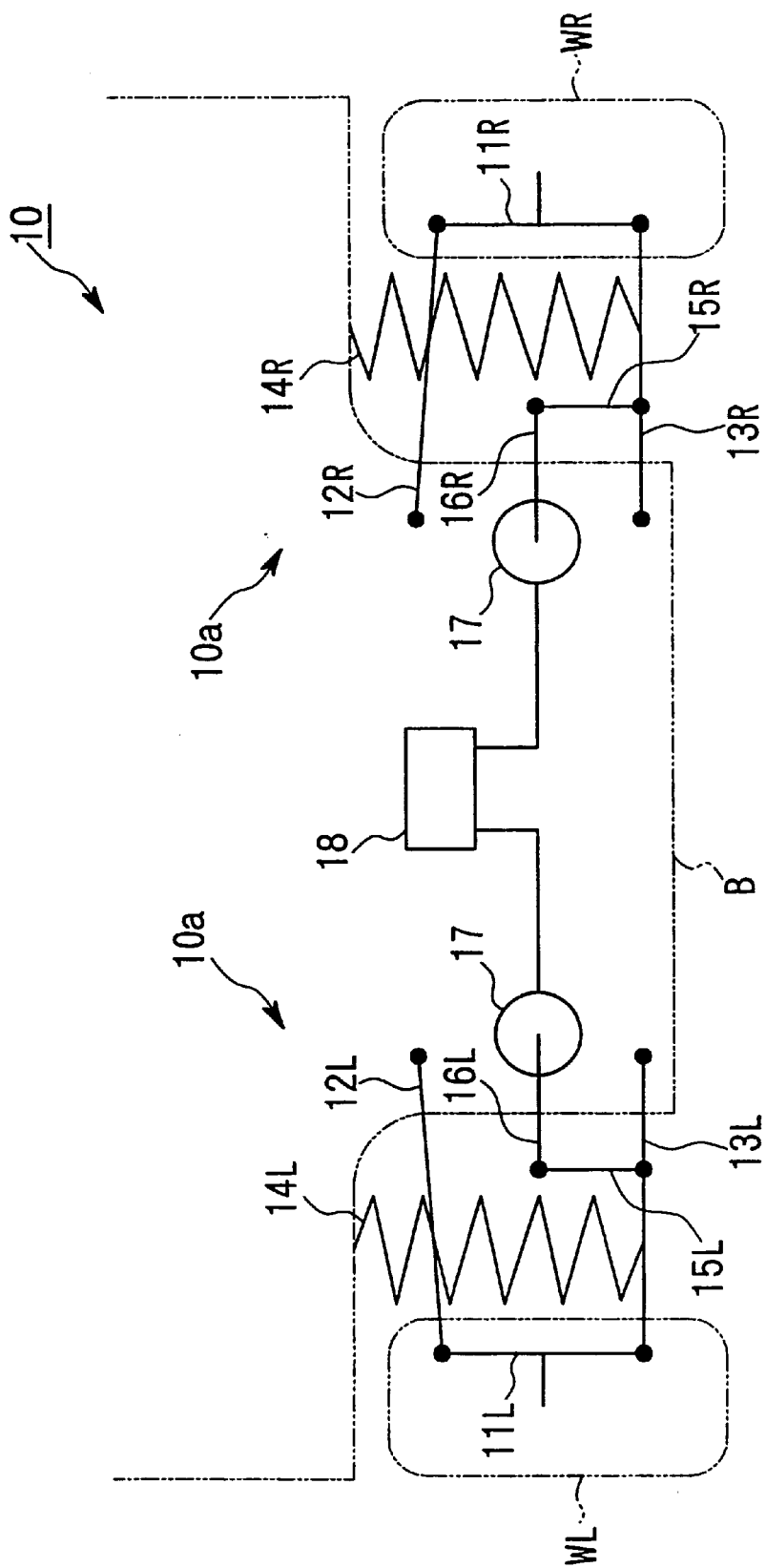
FIG. 20 is a schematic elevation view showing a suspension control device according to another preferred embodiment of the present invention as seen from the rear of the vehicle.
Figure 21:
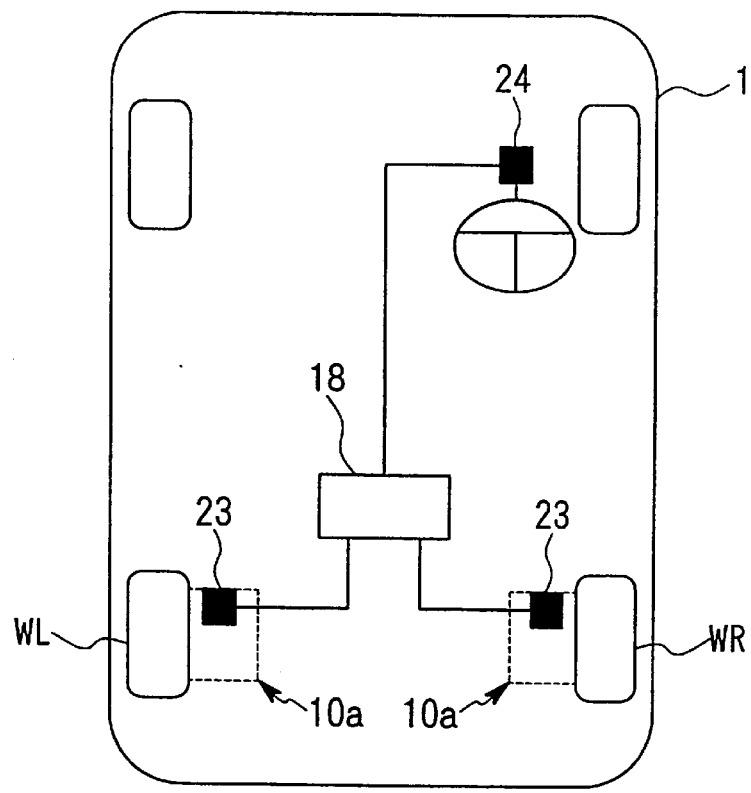
FIG. 21 is a figure showing the positions of a stroke sensor and a steering angle sensor which are provided to the vehicle of FIG. 20.
Figure 22:
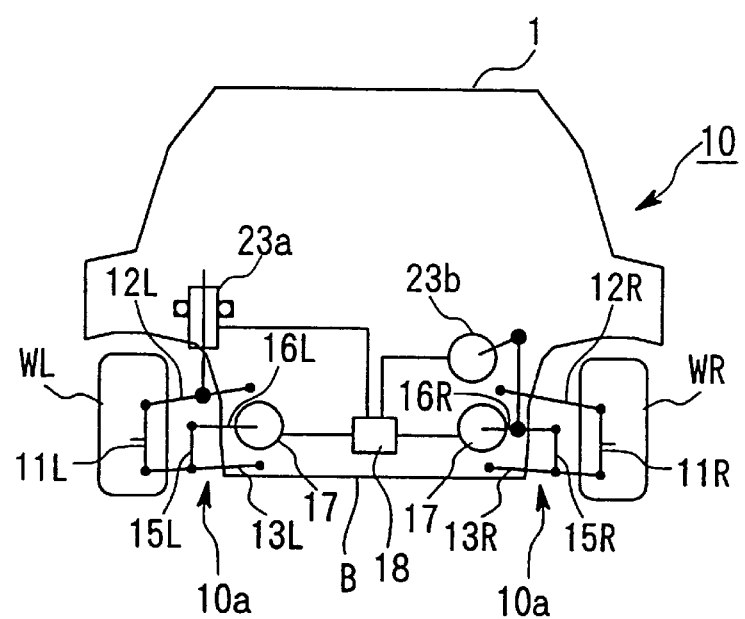
FIG. 22 is a structural view showing a stroke type potentiometer and a rotational type potentiometer which are provided to the suspension control device of FIG. 20.
Figure 23:
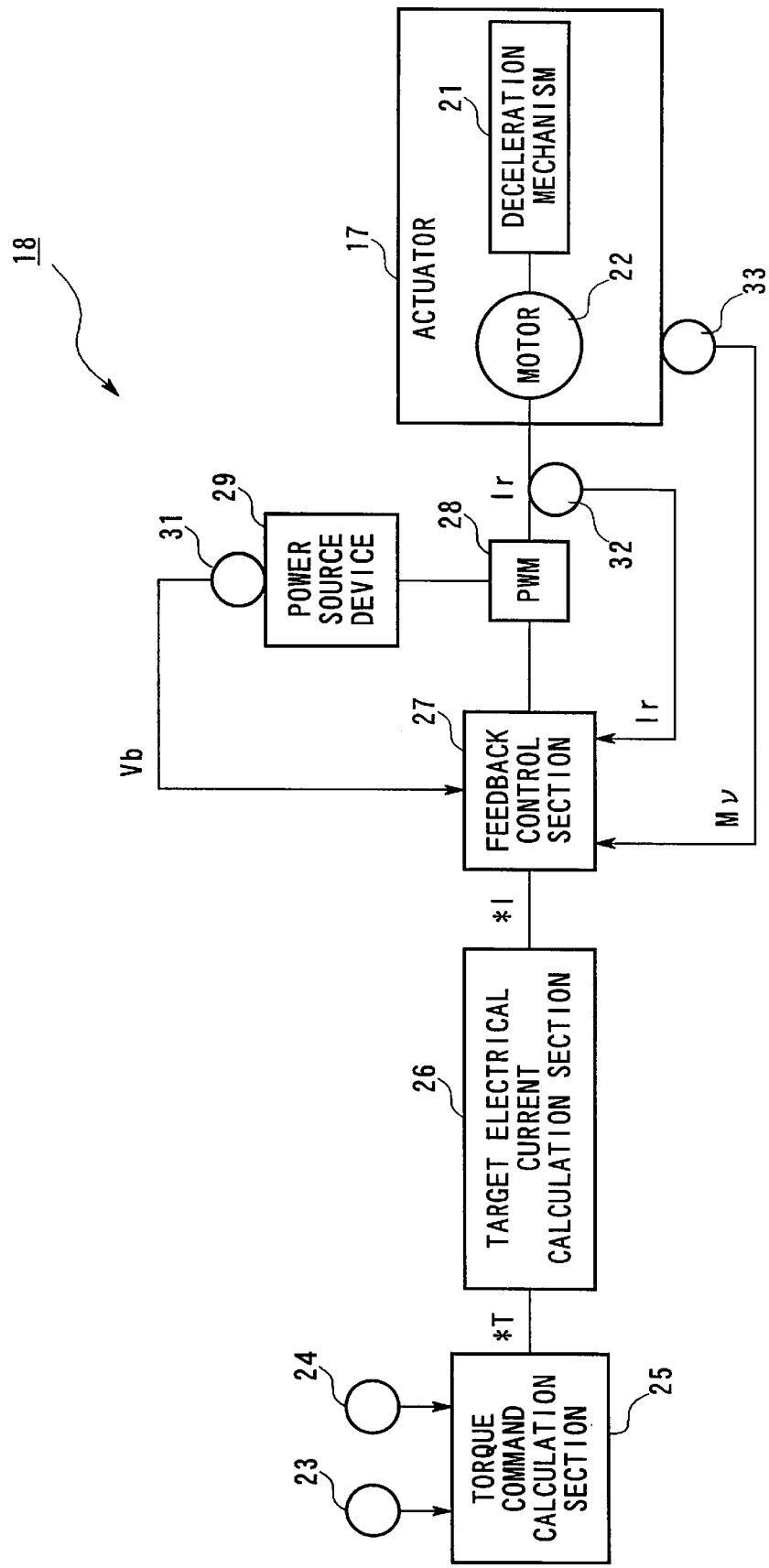
FIG. 23 is a functional block diagram showing the structure of a control device for electromagnetic actuators shown in FIG. 20.

FIG. 20 is a schematic elevation view showing a suspension control device 10 according to this fourth preferred embodiment of the present invention as seen from the rear of a vehicle 1. This suspension control device 10 comprises a control device 18 for the electromagnetic actuators. FIG. 21 is a figure showing the positions of a stroke sensor 23 and a steering angle sensor 24 which are provided to the vehicle 1 of FIG. 20. FIG. 22 is a structural view showing a stroke type potentiometer 23a and a rotational type potentiomenter 23b which are provided to the suspension control device 10 of FIG. 20, while FIG. 23 is a functional block diagram showing the structure of a control device 18 for the electromagnetic actuators shown in FIG. 20.

The suspension control device 10 comprising the electromagnetic actuator control device 18 of this fourth preferred embodiment of the present invention is, for example, provided to the rear wheels of the vehicle 1, and suspension units 10a, 10a of the same structure are provided to the left and the right rear wheels.

First, in the following, by way of example, the suspension unit 10a for the left rear wheel will be explained.

In this suspension unit 10a, a knuckle 11L which supports the wheel WL in a rotatable manner is supported vertically by an "A" shaped upper arm 12L and lower arm 13L so as to be able to move in the upwards and downwards direction. The upper arm 12L is connected via a joint which is provided at its tip end to the upper portion of the knuckle 11L, and is connected to the vehicle body B via a joint which is provided at its base end. Similarly, the lower arm 13L is connected via a joint which is provided at its tip end to the lower portion of the knuckle 11L, and is connected to the vehicle body B via a joint which is provided at its base end. The lower portion of a spring 14L, which may for example be a coil spring, is supported roughly at the central portion of the lower arm 13L, while the upper portion of this spring 14L supports the vehicle body B; and an actuator 17 is connected via a link 15L and a drive arm 16L to the base end of the lower arm 13L. Furthermore, a shock absorber which is not shown in the figures is provided between the vehicle body B and the lower arm 13L.

A suspension 10a of the same structure as that described above with regard to the left rear wheel is provided to the right rear wheel, and a stabilizer bar (not shown in the figures) is connected between the front portion of the knuckle 11L for the left rear wheel and the front portion of the knuckle 11R for the right rear wheel, while the vehicle body B and the rear portion of the knuckle 11L for the left rear wheel and the rear portion of the knuckle 11R for the right rear wheel are connected together by lateral links (also not shown in the figures).

The actuator 17 comprises a deceleration mechanism 21 and a motor 22.

The motor 22 may for example be a DC field motor, and the drive arm 16L is connected to the output shaft of this motor 22 via the deceleration mechanism 21.

In other words, the rotational force of the output shaft of the motor 22 is decelerated at the predetermined gear ratio of the deceleration mechanism 21 and is transmitted to the drive arm 16L so as to result in, for example, a torque value obtained by multiplying the rotational force in the same direction as the rolling direction of the vehicle 1 and the length of the drive arm 16L being transmitted to the lower arm 13L, so that as a result the spring rate of the spring 14L is altered.

For example, in the suspension for the left rear wheel, when the vehicle 1 is being driven around a curve, by the vehicle body B executing upwards and downwards motion and rolling with respect to the road surface, the lower arm 13L and the upper arm 12L which are connected at their tip ends to the knuckle 11L move upwards and downwards around their base ends which are connected to the vehicle body B as axes. Due to this, the spring 14L and the shock absorber which are connected to the lower arm 13L are compressed in correspondence to this upwards and downwards movement, and the upward and downward movement of the vehicle body B with respect to the road surface is buffered.

At this time the actuator 17 is driven by the control section 18, and when the drive arm 16L is rotated in the same direction around the rotation shaft as the rolling, transmits a torque (units N·m) to the drive arm 16L so as to turn the lower arm 13L which is connected thereto via the link 15L upwards and downwards; and thereby the spring rate of the spring 14L is changed so as to complement this spring rate in order to obtain the required roll stiffness for cornering.

Furthermore, as shown in FIG. 21, stroke sensors 23, 23 are provided to the suspension units 10a, 10a for the left and right rear wheels, and these sensors detect the magnitudes of the changes due to upwards and downwards movement of the stroke amounts in the vertical direction due to the rolling.

Yet further, a steering angle sensor 24 is provided for detecting the direction in which the driver is steering, since the upward and downward movement due to rolling depends upon the direction in which the vehicle is being cornered.

As shown in FIG. 22, each of the stroke sensors 23, 23 may be constituted as a stroke type potentiometer 23a which detects change of the upwards and downwards movement in the vertical direction, or as a rotational type potentiometer which detects the rotational distance of the drive arm 16L (16R), or the like; in fact, any type of sensor may be employed, provided that it is capable of measuring an amount which is related to the roll angle of the vehicle body body, so to speak due to rolling. The output detection signals representing the stroke amounts which are outputted from the left and right stroke sensors 23, 23, and the steering angle amount detection signal including the steering angle direction which is outputted from the steering angle sensor 24, are inputted to the control device 18 for the electromagnetic actuators 17, 17, and the actuators 17, 17 are drive controlled based upon the stroke difference between the stroke amounts for the left and right wheels, and the rate of change of steering angle including the steering angle direction.

As shown in FIG. 23, the control device 18 for the electromagnetic actuators 17, 17 may, for example, comprise a torque command calculation section 25, a target electrical current calculation section 26, a feedback control section 27, a current control section 28, a power source device 29, a voltage detector 31, a current detector 32, and a pole position detector 33.

The torque command calculation section 25 calculates the torque value which is required based upon the detection signal for stroke amount which is outputted from the stroke sensor 23 and the steering angle amount detection signal including the steering angle direction which is outputted from the steering angle sensor 24, generates a torque command *T for causing the actuator 17 which includes the motor 22 to generate this torque value, and outputs this command to the target electrical current calculation section 26.

The target electrical current calculation section 26 calculates an electrical current command for designating the electrical current which is to be supplied from the current control section 28 to the motor 22, based upon the torque command value ST, and outputs this electrical current command to the feedback control section 27 as a target electrical current value *I.

The feedback control section 27 performs feedback control of the electrical current by PID control (proportional integral and differential operation), and performs control so as to bring the difference between the target electrical current value *I and the actual value of the electrical current for which is flowing through the motor 22 to zero.

In order to do this, to the feedback control section 27 there are inputted the detection signal from the voltage detector 31 which detects the power source voltage Vb, the detection signal from the current detector 32 which detects the actual value of the electrical current Ir which is flowing through the motor 22, and a signal representing motor rotational speed Mv which is calculated based upon the pole position of the motor 22, in other words upon the rotational angle θ of a rotating element (not shown in the figures).

The current control section 28 performs DC chopping, for example according to pulse width modulation (PWM), and supplies DC electrical power, which is supplied from the power source device 31 which consists of, for example, a battery or a fuel cell or the like, to the motor 22, while varying the direct current value thereof according to the final duty ratio DUTY which is outputted from the feedback control section 27, as will be explained hereinafter.

Figure 24:
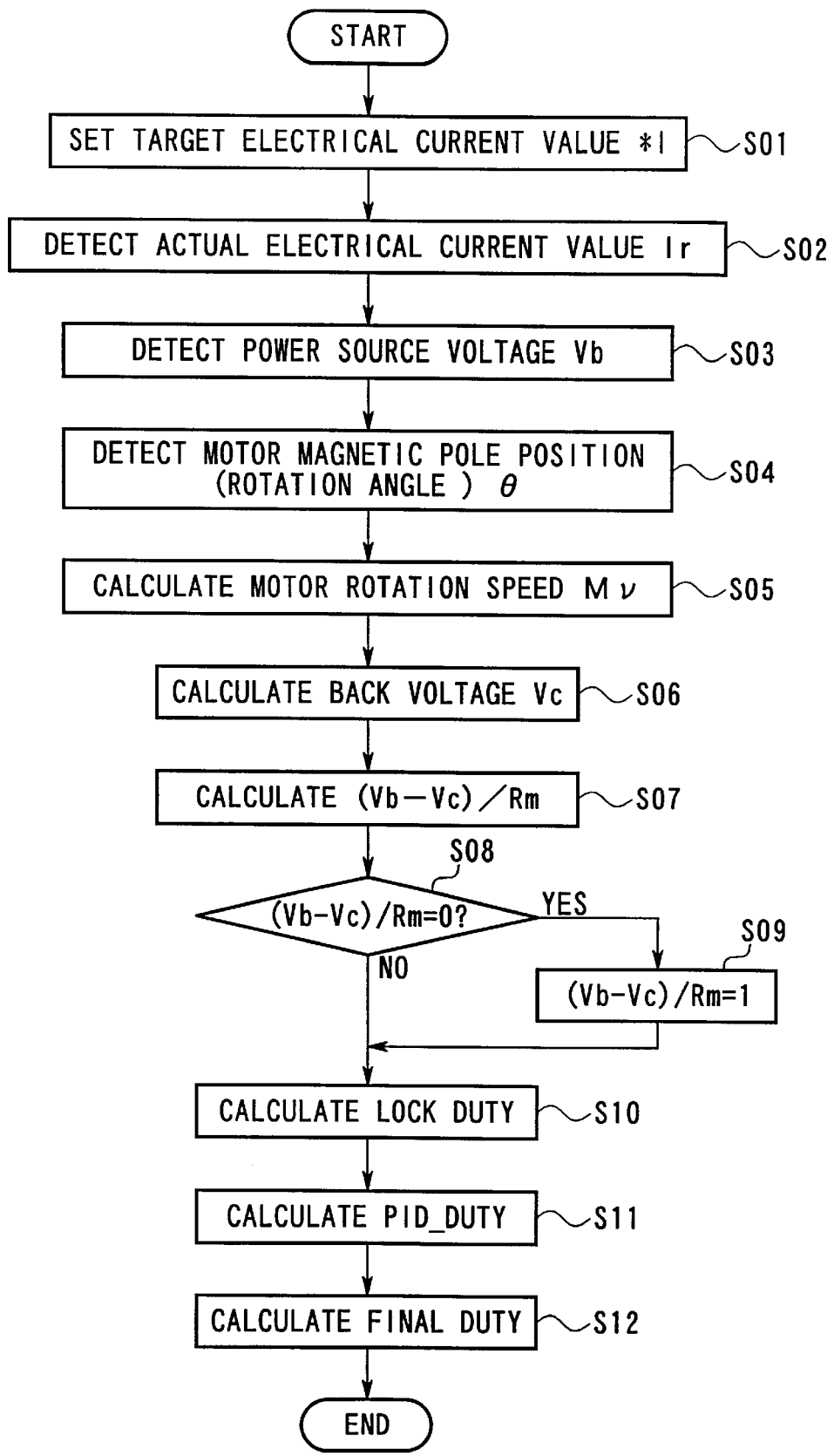
FIG. 24 is a flow chart showing the control flow of a routine for electrical current feedback control of the operation of a control device which is an electromagnetic actuator, and particularly for an actuator which includes a motor.

The electromagnetic actuator control device 18 according to this fourth preferred embodiment of the present invention has the structure described above; and, next, the details of the operation of this electromagnetic actuator control device 18, and in particular of the procedure for electrical current feedback control for the actuator 17 which includes the motor 22, will be explained with reference to the appended drawings. FIG. 24 is a flow chart showing the control flow of the procedure for operation of this electromagnetic actuator control device 18, and in particular of the procedure for electrical current feedback control for the actuator 17 which includes the motor 22.

First, in a step S01 shown in FIG. 24, a target electrical current value *I is set for causing the actuator 17 which includes the motor 22 to generate the torque value which is required. Next, in a step S02, the actual electrical current value kr which is actually flowing through the motor 22 is detected by the current detector 32. Next, in a step S03, the power source voltage Vb from the power source device 29 which performs supply of electrical energy to the motor 22 is detected by the voltage detector 31.

Next, in a step S04, the pole position θ of the motor 22 is detected by the pole position detector 33. This pole position θ corresponds to the phase angle of the induced voltage.

Next, in a step S05, the rotational speed Mv of a rotating element (not shown in the figures) is calculated based upon the pole position θ of the motor 22.

Next, in a step S06, the back voltage Vc is calculated based upon a predetermined induced voltage constant K which is set in advance, and upon the rotational speed Mv which was calculated in the step S05 above, as shown in Equation (1) below:

$$Vc = K \times Mv \tag{1}$$

Next, in a step S07, the electrical current value Im is calculated by dividing the voltage applied to the motor 22, which is obtained by subtracting the back voltage Vc from the power source voltage Vb, by the motor resistance Rm, as shown in Equation (2) below:

$$Im = \frac{(Vb - Vc)}{Rm} \tag{2}$$

Next, in a step S08, a decision is made as to whether or not the electrical current value Im which was calculated in the step S07 is zero.

If the result of this decision is NO, then the flow of control is transferred to a step S10. On the other hand, if the result of this decision is YES, then the flow of control is transferred to a step S09. And in this step S09 the electrical current value Im is set to 1.0.

Next, in a step S10, the lock duty ratio LOCKDUTY is calculated by dividing the target electrical current value *I by this electrical current value Im, according to Equation (3) below. This lock duty ratio LOCKDUTY is thus the value obtained by dividing the target electrical current value *I which has been calculated by the target electrical current calculation section 26, by the electrical current value {(Vb−Vc)/Rm} which is obtained by taking into account the contribution of the back voltage Vc which is generated in accompaniment with the rotation of the motor 22.

If the electrical current value Im which has been calculated in the step S07 is zero, the lock duty ratio LOCKDUTY is set to its upper limit value of 100%. Furthermore, even if the lock duty value LOCKDUTY which has been calculated by the following Equation (3) comes out to be greater than 100%, said lock duty ratio LOCKDUTY is set to 100%, which is thus its upper limit value.

$$LOCKDUTY = \frac{{}^*I}{Im} = \frac{{}^*I}{(Vb - Vc)/Rm} \tag{3}$$

Next, in a step S11, as shown in Equations (4) below, in successive episodes of feedback control, a PID duty ratio PID_DUTY is calculated based upon the deviation P(k) between the value *I(k) for this episode of the target electrical current value *I from the value Ir(k) for this episode of the actual electrical current value Ir, the value I(k) for this episode of the integrated value with respect to the deviation of the target electrical current value *I and the actual electrical current value Ir, the change D(k) of the deviation P(k) for this episode from the deviation P(k−1) for the previous episode, a proportional term Kp, a constant of integration Ki, and a constant of differentiation Kd.

$$PID\_DUTY = Kp \cdot P(k) + Ki \cdot I(k) + Kd \cdot D(k) \tag{4}$$

$$P(k) = {}^*I(k) - Ir(k)$$

$$I(k) = P(k) + I(k-1), \ I(0) = 0$$

$$D(k) = P(k) - P(k-1)$$

Next, in a step S12, the final duty ratio DUTY is calculated as shown in Equation (5) below, by adding together the lock duty ratio LOCKDUTY and the PID duty ratio PID_DUTY; and this completes one episode of this procedure.

$$DUTY = LOCKDUTY + PID\_DUTY \tag{5}$$

In the following, an example of calculation of the lock duty ratio LOCKDUTY will be explained; by way of example, the case is taken of calculating the lock duty ratio LOCKDUTY when the electrical current Iref passing through the motor 22 is 60A. In the following discussion, the back voltage Vc is taken as being 0.

When the power source voltage Vb is taken as being 14V and the motor resistance Rm is taken as being 0.066 Ω, the electrical current 100% which flows through the motor 22 in the locked state=Vb/Rm=212A, and, according to the above Equation (3), the lock duty ratio LOCKDUTY=Iref/(Vb/Rm)=28.3%, and the lock duty ratio LOCKDUTY when it is supposed that Iref=60A is required is 28.3%.

As has been described above, according to the electromagnetic actuator control method according to this fourth preferred embodiment of the present invention, it is possible to make the proportional term for PID control small, and it is possible to suppress the generation of inconvenience such as vibration or the like during feedback control, so that it is possible to enhance the convergence of the actual electrical current value Ir to the target electrical current value *I. Moreover, by taking into account the back voltage Vc which is generated in accompaniment with the rotation of the motor 22 when calculating the lock duty ratio LOCKDUTY, it is possible to obtain the most suitable final duty ratio DUTY, and it is possible to enhance the convergence of the actual electrical current value Ir to the target electrical current value *I by yet a further stage.

Figure 25:
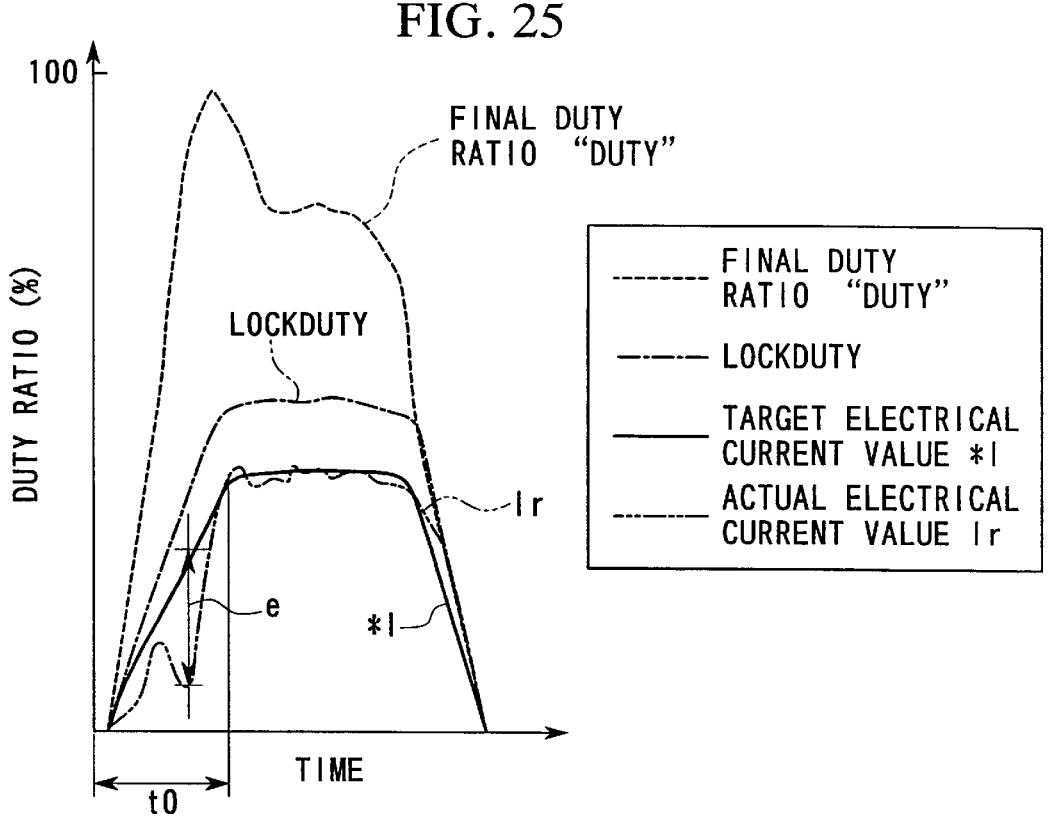
FIG. 25 is a graph showing, as a comparison example for comparison with this preferred embodiment, tracking changes of an actual current value I with respect to a target current value *I, when a lock duty ratio LOCKDUTY is calculated based upon the value of an electrical current which flows in a motor during the locked state.

For example, if as shown in the graph of FIG. 25 which shows, as a comparison example for the preferred embodiment, the tracking change of the actual electrical current value I with respect to the target electrical current value *I when the lock duty ratio LOCKDUTY is calculated based upon the electrical current value which flows through the motor 22 in its locked state, the value simply obtained by dividing the target electrical current value *I which is calculated by the target electrical current calculation section 26, by the electrical current value (Vb/Rm) which flows when the motor 22 has gone into its locked state, is set as the lock duty ratio LOCKDUTY, then undesirably the time period (for example, the time period t0 shown in FIG. 25) which is required for the actual electrical current value Ir (for example, shown by the dotted line in FIG. 25) to converge to the target electrical current value *I (for example, shown in FIG. 25 by the solid line) becomes relatively long.

Figure 26:
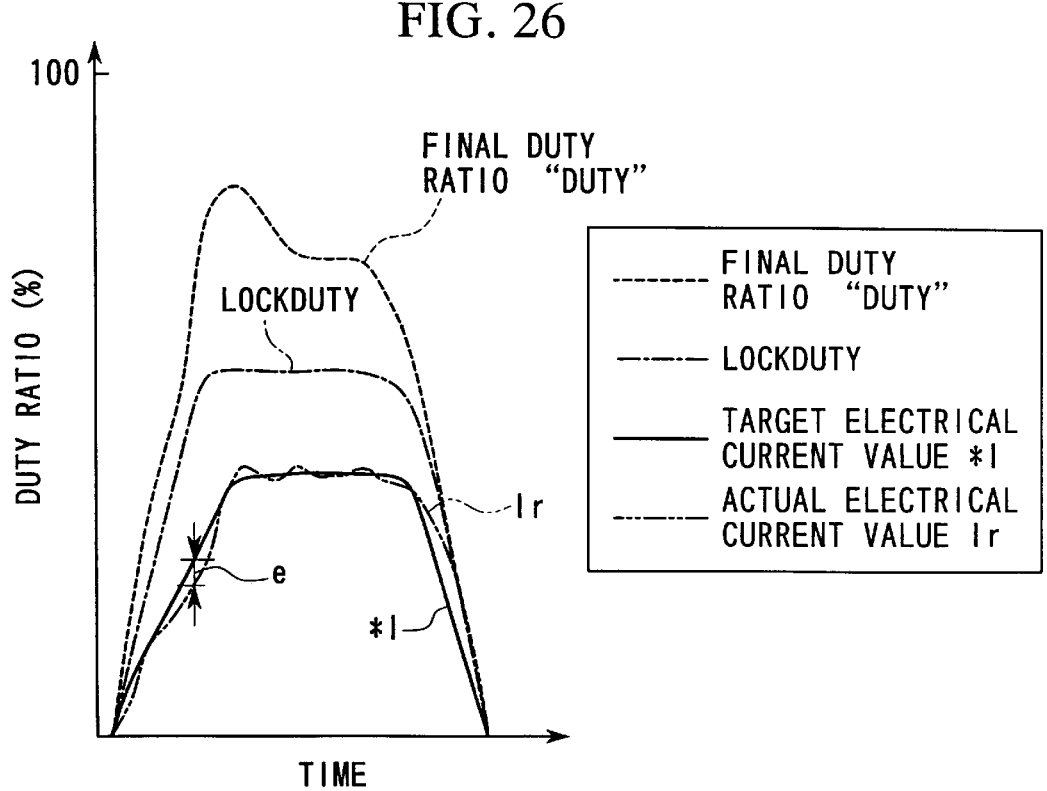
FIG. 26 is a graph showing, for the case of this preferred embodiment, tracking changes of the actual current value I with respect to the target current value *I, when the lock duty ratio LOCKDUTY is calculated by taking account of a back voltage Vc which is generated as the motor rotates.

In this connection, FIG. 26 shows the tracking change of the actual electrical current I with respect to the target electrical current value *I when the lock duty ratio LOCKDUTY is calculated by taking the back voltage Vc which is generated in accompaniment with the rotation of the motor 22 into account. As shown in this graph, it is possible to calculate the most suitable final duty ratio DUTY (for example, the broken line shown in FIG. 26) by calculating the lock duty ratio LOCKDUTY (for example, the single dotted broken line shown in FIG. 26) in consideration of the back voltage Vc, and, by supplying electrical current to the actuator 17 according to this final duty ratio DUTY, it is possible to enhance the convergence during feedback control by shortening the time period which is required for the actual electrical current value Ir (for example, the dotted line shown in FIG. 26) to track the target electrical current value *I (for example, the solid line shown in FIG. 26).

In other words, it is possible to prevent deterioration of the convergence of the actual electrical current value Ir to the target electrical current value *I due to it becoming impossible to supply the desired electrical current to the actuator 17 as the voltage supplied to the motor 22 drops due to, for example, back voltage Vc which is generated by the motor 22 being driven in reversed phase, for example during rotation of the motor 22 in a transient input state, such as for example during relatively high speed rotation of the vehicle steering, or when the vehicle 1 is being displaced upwards and downwards, or during travel over a bumpy road surface or the like.

Moreover, even during transient input to the motor 22 such as during initial driving or the like, it is possible to reduce the deviation (for example, the deviation e shown in FIGS. 25 and 26) between the target electrical current value *I and the actual electrical current value Ir, by a suitable electrical current being flowed through the motor 22 according to the lock duty ratio LOCKDUTY which is calculated based upon the target electrical current value *I. By doing this, it is possible to reduce the constant of proportionality for PID control, in other words the proportional term Kp, and it is possible to suppress the generation of inconveniences such as vibration or the like during feedback control, so that it becomes possible to prevent transient load acting upon the actuator 17.

Furthermore, according to the suspension control device 10 which comprises the electromagnetic actuator control device 18 according to this fourth preferred embodiment of the present invention, when complementing the spring rate of the springs 14L and 14R in the suspension units 10a by controlling the extension and compression of the springs 14L and 14R by the torques which are generated by the actuators 17, it is possible to enhance the convergence of the actual electrical current value Ir of the electrical current which actually flows through the actuator 17 to the target electrical current value *I which corresponds to the torque commands for generating the required torque by the actuator 17.

By doing this, it is possible to increase the roll stiffness of the vehicle body B appropriately according to the operational state of the vehicle 1, and, by alleviating tilting of the vehicle body B during rolling, in other words by reducing the rolling angle, it is possible to enhance both the controllability of the vehicle 1 and also its driving stability. In this fourth preferred embodiment of the present invention as described above, it was supposed that the back voltage Vc was calculated according to Equation (1) above, but this example is not intended to be limitative; for example, it would also be acceptable to calculate the back voltage Vc based upon the power source voltage Vb, the actual value Ir of the electrical current which flows through the actuator 17, and the value R of the internal resistance of the motor 22, as shown in the following Equation (6):

$$Vc = Vb - Ir \cdot R \qquad (6)$$

Embodiment 5

In the prior art, systems which are capable of varying the roll stiffness only operate for reducting the roll angle in the steady state during cornering, and have not been made in consideration of control during the non steady state, such as when the vehicle is being driven along a zigzag course. Due to this, in such variable roll stiffness systems as described above, when abrupt changes of the rolling direction occur such as due to zigzag driving or the like, the adjustment processing for roll angle experiences a lag in tracking changes of the actual roll angle, which is undesirable.

In other words, in such variable roll stiffness systems as described above, there is the problem that, due to response lag of the sidewise G (acceleration in the sidewise direction) sensor inputted during initial cornering, the tracking by the roll angle adjustment process of changes of actual roll angle is delayed in the transient region when rolling is generated.

The fifth preferred embodiment of the present invention, now to be described, resolves the above problem.

By "wheel rate" is meant the value of the force (units N—newtons) which is generated at the edge of each wheel, corresponding to the change of the stroke amounts of the suspensions (the amounts of movement of the vehicle wheels with respect to the vehicle body) on the side of the left wheel WL and the side of the right wheel WR.

Figure 27:
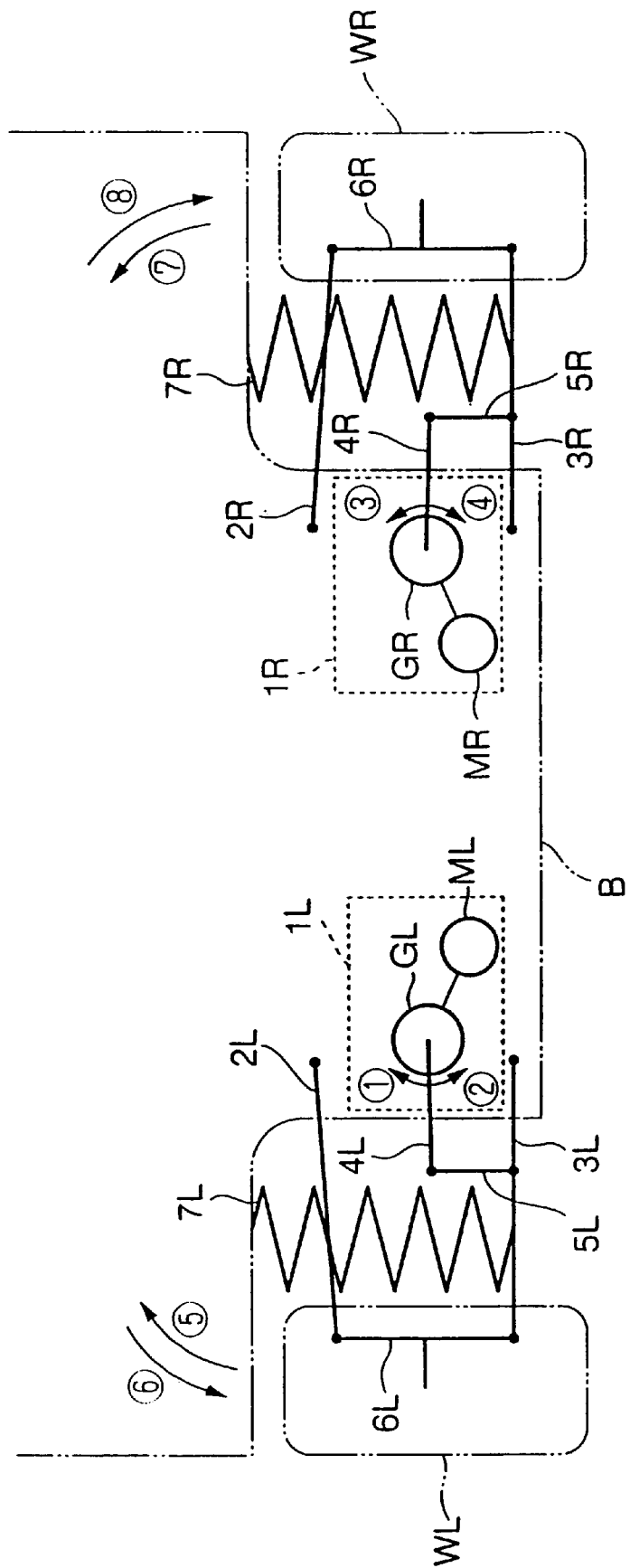
FIG. 27 is a schematic elevation view showing a suspension according to another preferred embodiment of the present invention as seen from the rear of the vehicle.

FIG. 27 is a schematic elevation view showing a suspension according to this fifth preferred embodiment of the present invention as seen from the rear of the vehicle.

In this figure, in the suspension for the left rear wheel WL, a knuckle 6L which supports this wheel WL in a freely rotatable manner is supported so as to be capable of moving in the upwards and downwards direction by an "A" shaped upper arm 2L and an "A" shaped lower arm 3L. The upper arm 2L is connected to the upper portion of the knuckle 6L via a joint which is provided at its tip end, while it is connected to the vehicle body B via a joint which is provided at its base end. Similarly, the lower arm 3L is connected to the lower portion of the knuckle 6L via a joint which is provided at its tip end, while it is connected to the vehicle body B via a joint which is provided at its base end. A lower end portion of a spring 7L is supported on the central portion of the lower arm 3L, while the upper end portion of this spring 7L supports the vehicle body B; and an actuator 1L is connected near the base end of the lower arm 3L via a link SL and a drive arm 4L. Furthermore, a shock absorber not shown in the figure is provided between the vehicle body B and the lower arm 3L. This actuator 1L comprises a downgearing device GL and a motor ML.

Furthermore, in the suspension for the right rear wheel WR, the structure is identical but heterochiral to that described above, and accordingly the structural elements thereof are designated in the figure by the same reference symbols as above, but with the suffix "R" substituted for "L".

Yet further, a stabilizer bar not shown in the figure is connected between the front portions of the knuckle 6L and the knuckle 6R, and lateral links also not shown in the figure are connected between the vehicle body B and the rear portions of the knuckle 6L and the knuckle 6R.

According to the above described structure, in the suspension for the left rear wheel, when the vehicle body B undergoes rolling movement upwards and downwards with respect to the road surface due to cornering, the upper arm 3L and the lower arm 2L which are connected to the knuckle 6L move in the upwards and downwards direction taking their base ends which are corrected to the vehicle body B as start points. Due to this, the spring 7L and the shock absorber which are connected to the lower arm 3L are extended and compressed corresponding to this upwards and downwards movement, and thus the upwards and downwards movement of the vehicle body B with respect to the road surface is buffered. At this time, if the actuator 1L is driven so as to rotate the drive arm 4L around its rotation shaft in the same rotational direction as the rolling, then the torque (in newton-meters) generated thereby is transmitted via the drive arm 4L and the link 5L so as to drive the lower arm 3L in the upwards and downwards directions, and thereby the spring rate of the spring 7L is supplemented.

Furthermore, in the same manner, in the suspension for the right rear wheel WR, the structure is identical but heterochiral to that described above, and accordingly the structural elements thereof are designated in the figure by the same reference symbols as above, but with the suffix "R" substituted for "L". With this structure, it is possible to supplement the spring rates of the springs 7L and 7R by controlling the actuator 1L for the left wheel WL and the actuator 1R for the right wheel 1R in a complementary manner, and it is possible to actively control the roll stiffness of the vehicle body B.

In other words, when the spring 7L which is supported upon the lower arm 3L in the suspension for the left rear wheel WL is extended and compressed due to upwards and downwards movement of the vehicle body B when cornering, torque is actively applied to the vehicle body B, and this operates to correct the tilting of the vehicle body B.

However, since as described above it is necessary to buffer the condition of the road surface during driving in a straight line, the spring 7L is not endowed with a spring rate which only provides the proper torque for returning the vehicle body B to its horizontal position.

Due to this the rotation of the motor ML, which is a DC motor, after having been decelerated by the gearing ratio of the downgearing device GL, is provided to the actuator 1L via the drive arm 4L and the link 5L, and thereby a torque value obtained by multiplying the rotational force in the same rotational direction as the rolling direction by the length of the drive arm 4L, is applied to the lower arm 3L.

As a result, the actuator 1L comes to complement the spring rate of the spring 7L, as described above, by applying a torque to the lower arm 3L in the same direction as the rolling direction.

In the following, for convenience of explanation, the final target torques to be applied to the lower arms 3L and 3R by rotating the drive arms by this driving of the actuators 1L and 1R under control of the control device will be termed, respectively, TTL and TTR.

Figure 28:
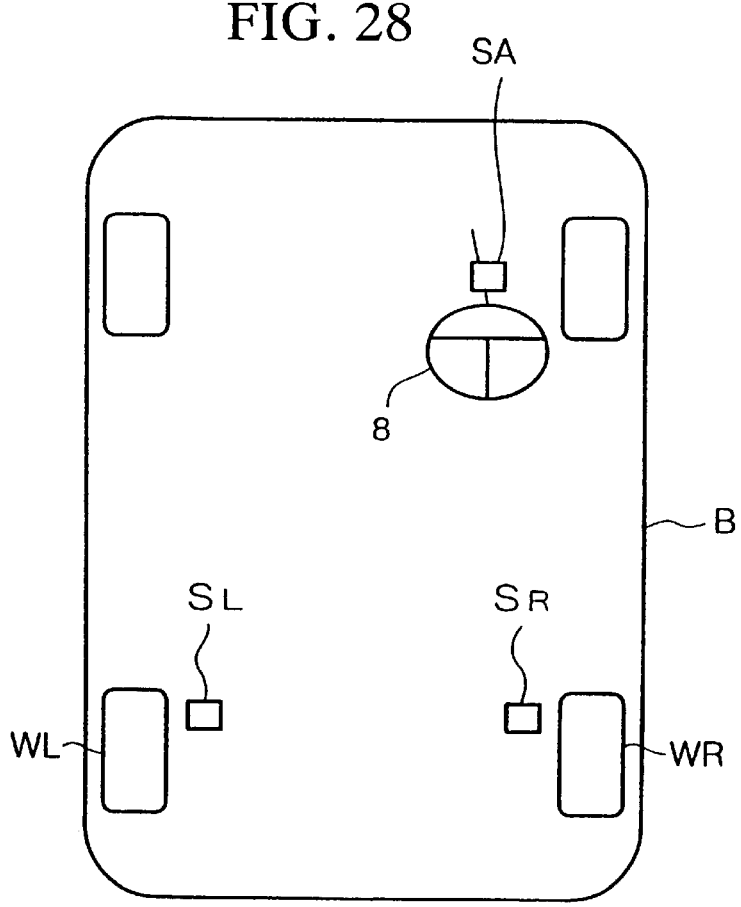
FIG. 28 is a schematic plan view showing the positions of stroke sensors SL and SR and of a steering angle sensor SA in the vehicle body B, as seen from above the vehicle.

As shown in FIG. 28, stroke sensors SL (left) and SR (right) for the suspension units for the respective rear wheels of the vehicle are provided, and the magnitudes of the signals outputted from these stroke sensors SL and SR due to upward and downward movement of the vehicle body B upon rolling are independently detected as the respective stroke amounts. FIG. 28 is a schematic plan view showing the positions of stroke sensors SL and SR and of a steering angle sensor SA in the vehicle body B, as seen from above the vehicle.

Furthermore, a steering angle sensor SA is provided for detecting the direction in which the driver of the vehicle is steering, since the upwards and downwards movement due to rolling depends upon the direction of cornering.

This steering angle sensor SA detects the steering angle of the steering wheel 8 and the direction of steering, and its output is a signed numerical value. For example, when the vehicle is being steered to the left, the output of the sensor SA may be a positive numerical value corresponding to the steering angle; while, when the vehicle is being steered to the right, the output of the sensor SA may be a negative numerical value. The stroke sensors SL and SR shown in FIG. 28 may, for example, be stroke type potentiometers which measure the distances of upwards and downwards movement shown in FIG. 29, or may be rotational type potentiometers which measure the distances through which the drive arms move as rotational angles, or may be laser displacement measurement devices or the like (not shown in the figures) which measure the distance between the vehicle body B and the road surface. In other words, any type of sensor capable of measuring the tilting amount of the vehicle body B with respect to the road surface, which is related to the roll angle of the vehicle body B due to rolling, may be used.

Figure 29:
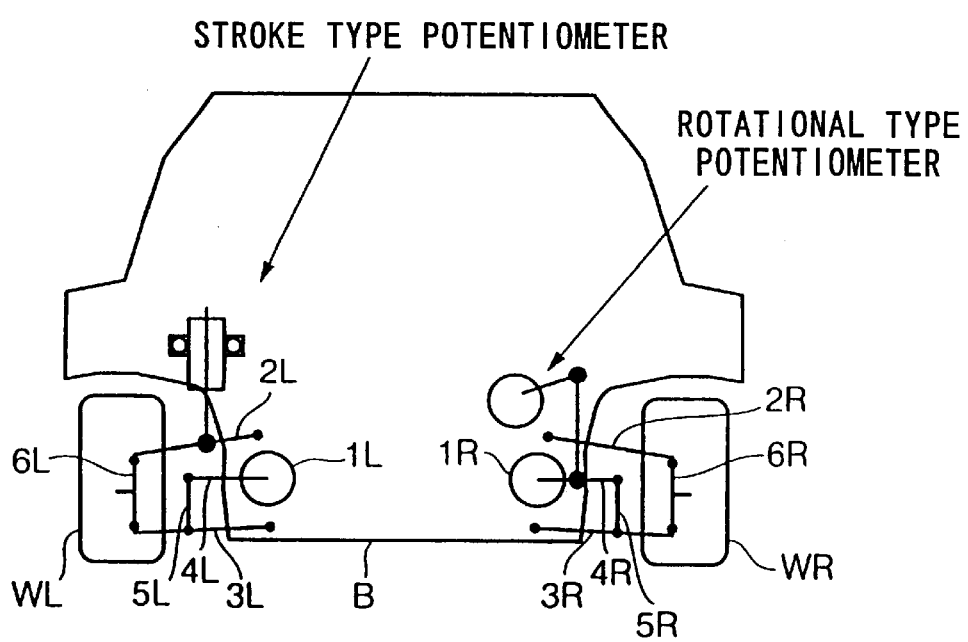
FIG. 29 is a schematic view showing the stroke sensors of FIG. 28.

In the example shown in FIG. 29, a stroke type potentiometer is fitted as the stroke sensor SL for the suspension for the left rear wheel WL, and this sensor SL is fitted to the vehicle body B, and is connected by a link to the upper arm 2L. Furthermore, in this example, a rotational type potentiometer is fitted as the stroke type sensor SR for the suspension for the right rear wheel WR.

Furthermore, the control of the above described actuators 1L and 1R, and the detection of the outputs of the above described stroke sensors SL and SR, is performed by a control circuit not shown in the figures. This control circuit comprises a CPU and a storage section such as a memory or the like, and, according to a program which is stored in the storage section, the CPU controls the directions and the torque amounts of the torques provided by the actuators 1R and 1L, based upon the numerical values of the various parameters, such as the stroke amounts which are obtained from the sensors SL and SR and the steering angle and so on.

Figure 30:
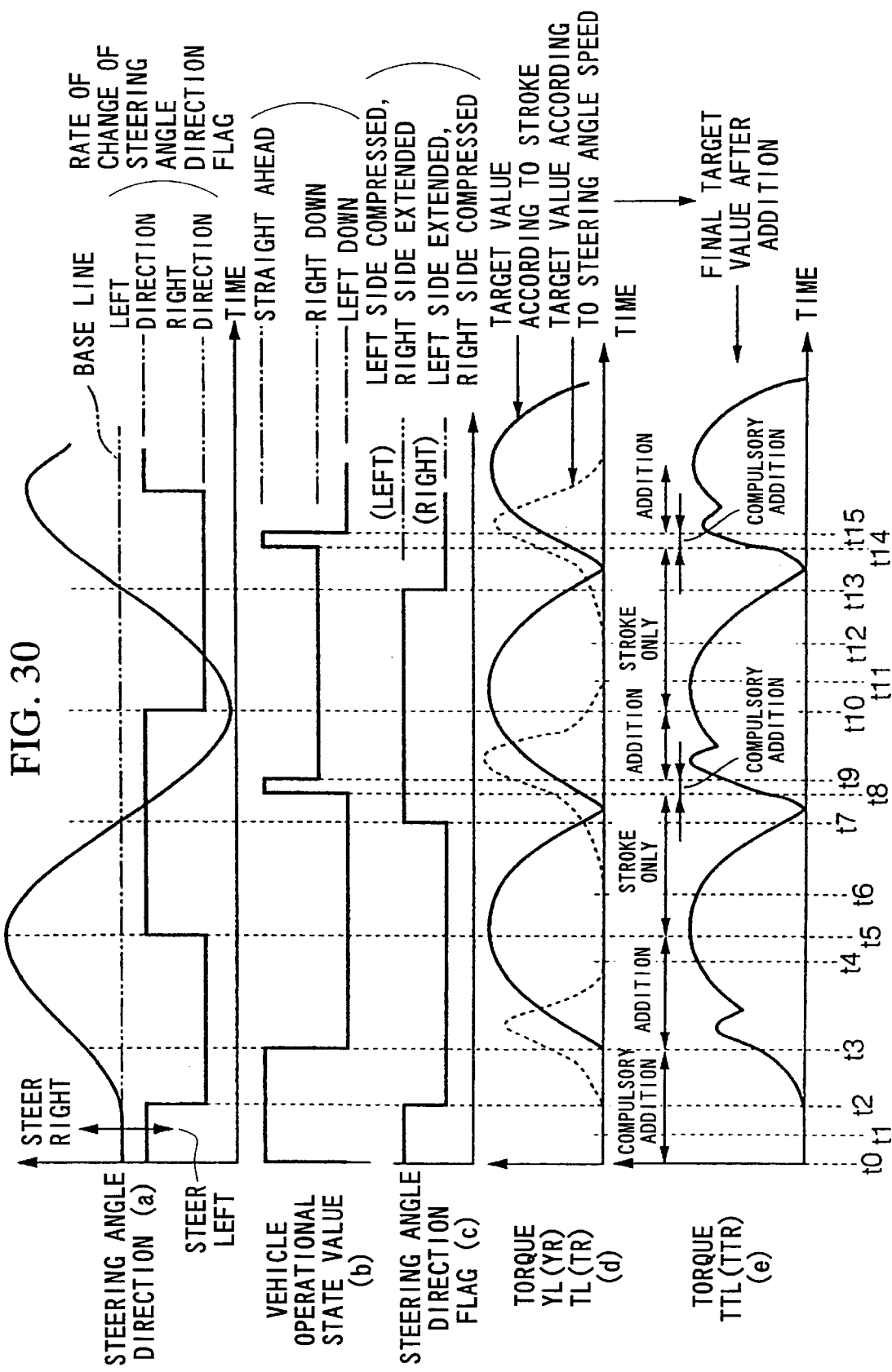
FIG. 30 is a timing chart showing the change of various parameters for calculation of the torque amounts which are generated by actuators 1L and 1R, according to the direction in which the driver of the vehicle is steering.

Next, an example of the operation of this fifth preferred embodiment of the present invention will be explained with reference to FIGS. 27 and 30. FIG. 30 is a timing chart which shows the changes of the various parameters for calculating the amounts of torque to be generated by the actuators 1L and 1R, according to the direction in which the driver is steering. Before the explanation of actual operation, the flow of a procedure which is executed by the control circuit for controlling the actuators 1L and 1R will be explained with reference to the flow charts shown in FIGS. 31, 32, and 33.

As a prerequisite for operation, the driver enters the vehicle and turns the ignition switch to ON, whereby the above described control circuit stores the measured values MDL and MDR (units mm) which are outputted from the stroke sensors SL and SR at this time point in the storage section as standard values DL and DR (units mm) therefor.

This is done in order to obtain, according to circumstances, accurate standard values from time to time, corresponding to the weight which is acting upon the suspension, by measuring these standard values which vary according to the weight of the vehicle body and of the load and personnel being carried in it at the time point that the engine is started, since the stroke difference ΔLR which is used hereinafter is calculated based upon the amounts of displacement (the amounts of movement of the vehicle wheels with respect to the vehicle body) from the standard values of stroke position.

In order to do this, the values which are read in from the stroke sensors SL and SR in the state in which the ignition switch of the vehicle has just been turned ON are used as the standard values of stroke position, since it is necessary to use values which are measured in the state of gravitational acceleration of 9.8 m/sec$^2$ when the vehicle is stationary, according to the number of people riding in the vehicle and their weight, the load carried in the vehicle, the weight of gasoline in the tank, and the like.

Figure 31:
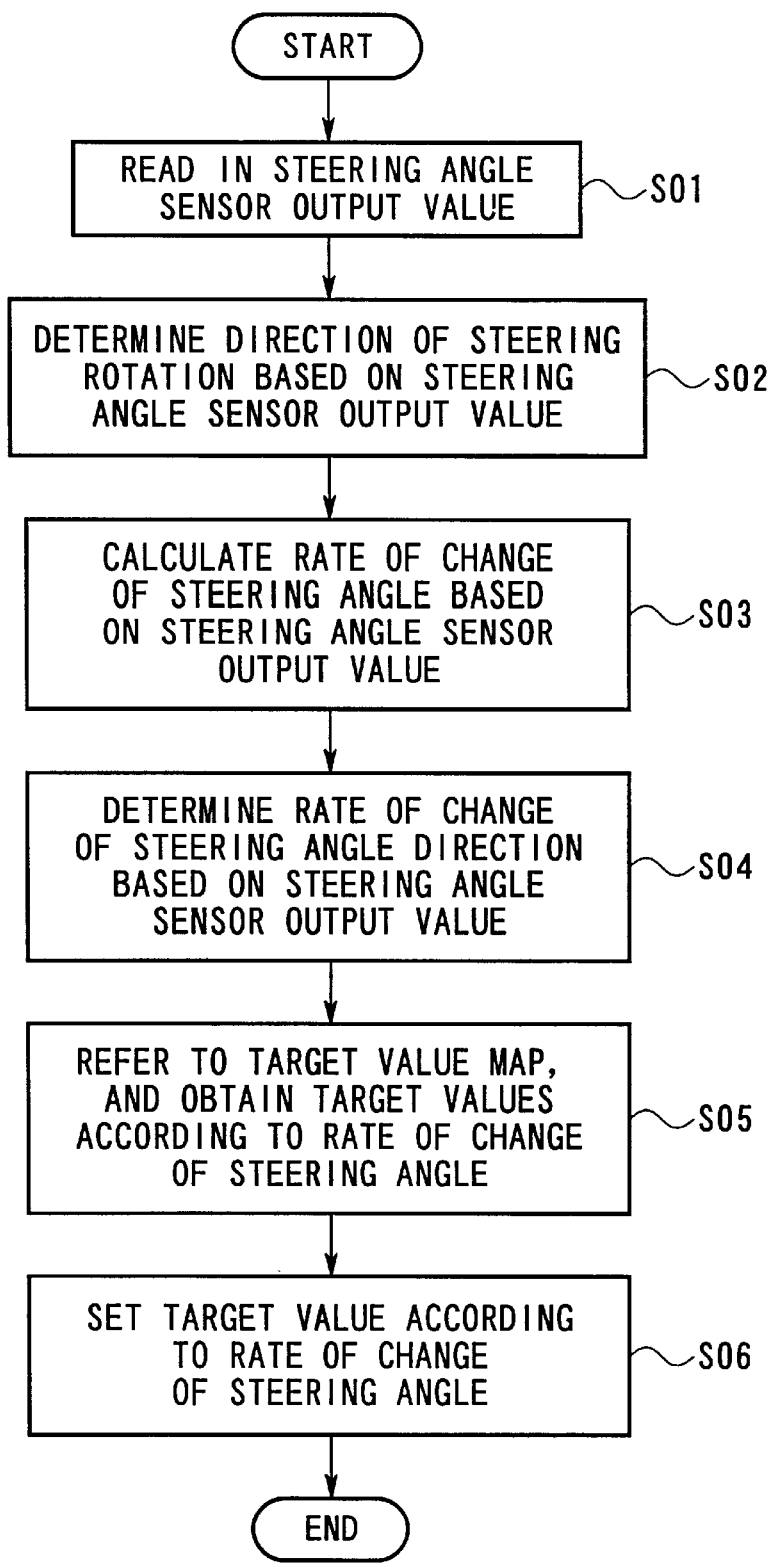
FIG. 31 is a flow chart showing the control flow of a calculation method for obtaining torques YL and YR which are generated by the actuators 1L and 1R, based upon rate of change of steering angle (rad/sec).
Figure 32:
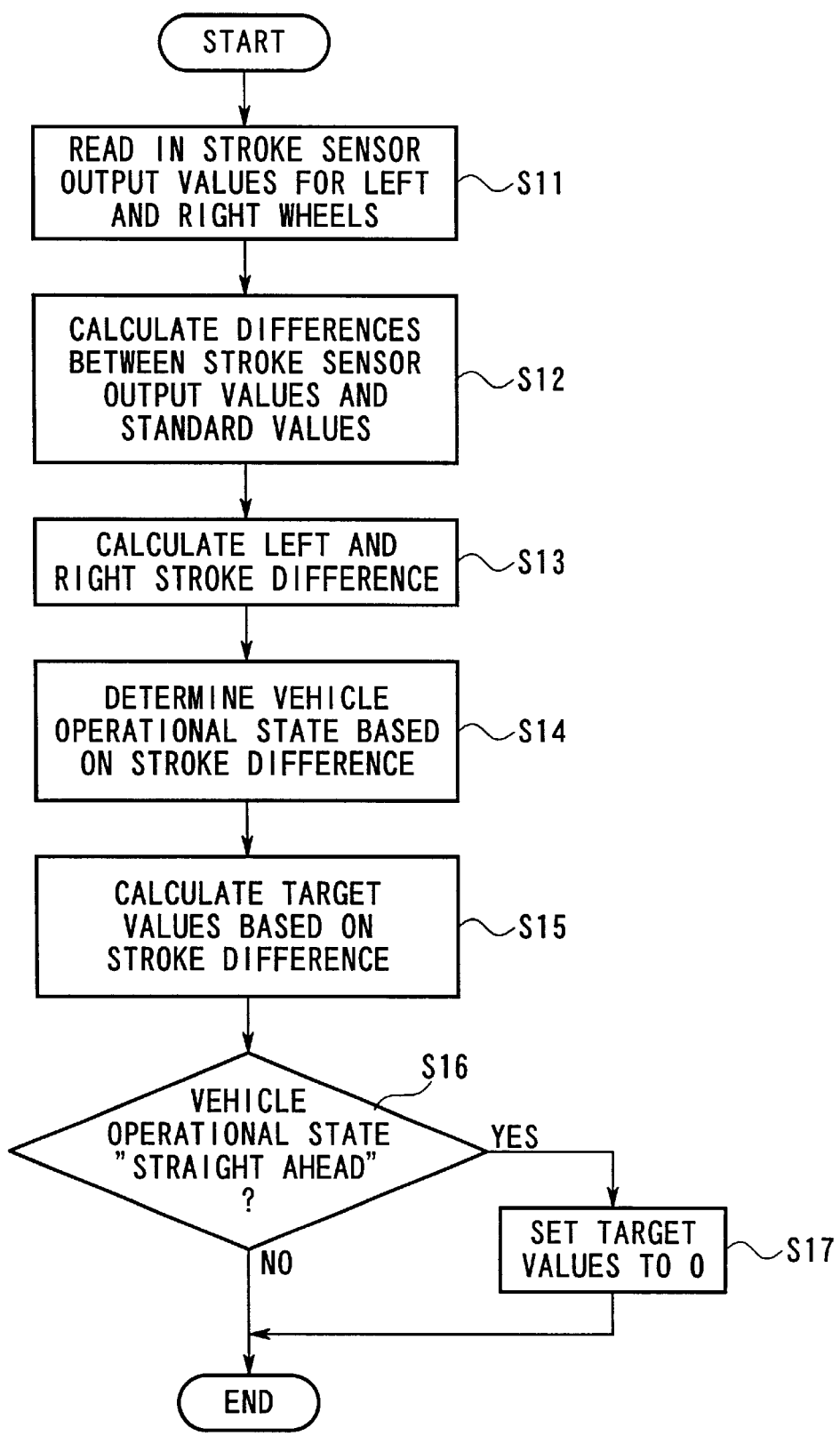
FIG. 32 is a flow chart showing the control flow of a calculation for obtaining torques TL and TR which are generated by the actuators 1L and 1R, based upon stroke amount.
Figure 33:
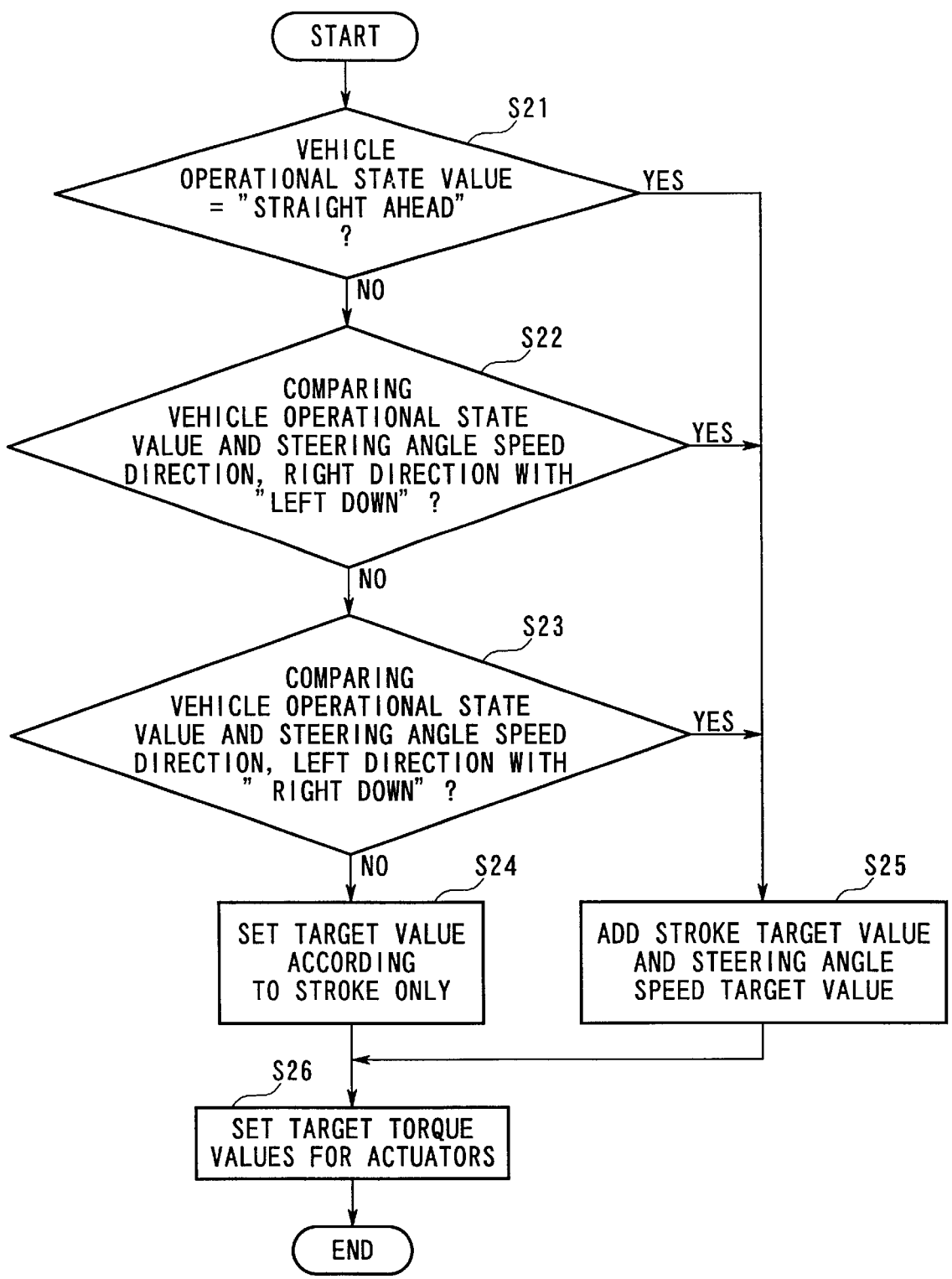
FIG. 33 is a flow chart showing the control flow of a calculation for obtaining the torques TTL and TTR which are actually generated by the actuators 1L and 1R, based upon the torques YL and YR and the torques TL and TR which have been obtained by the procedures whose flow charts are shown in FIGS. 31 and 32.

The control circuit starts the operation of the program whose flow chart is shown in FIGS. 31, 32, and 33. The procedure of these flow charts is repeated at a fixed period (for example, 10 m/sec), and, from the results obtained, control of the torques TL and TR generated by the respective actuators 1L and 1R is performed at this fixed period. Before explaining the actual control flow according to FIG. 30, an explanation of the procedure whose flow chart is shown in FIGS. 31, 32, and 33 will be provided.

In the flow chart of FIG. 31, a calculation is performed in order to obtain the torques YL and YR to be generated by the actuators 1L and 1R, based upon the rate of change of steering angle (units radians/sec) which gives the steering speed.

This calculation obtains the torques YL and YR in correspondence to the rate of change of steering angle from the relationship shown in FIG. 11 between the rate of change of steering angle and these torques YL and YR. In FIG. 11, the rate of change of steering angle is shown along the horizontal axis, and the torques YL, YR are shown along the vertical axis.

When the rate of change of steering angle is, for example, less than 0.5 (units radians/sec), then the values of the torques YL and YR are set to zero. This is done because it sometimes happens than a small steering angle is generated due to wobbling or the like of the steering wheel 8 while the vehicle is being driven straight ahead, and this step prevents undesirable increase of the stiffness of the suspension as a hypersensitive reaction to such wobbling.

In other words, with a rather small rate of change of steering angle, no torque is generated by the actuators 1L and 1R, so that, when the vehicle is being driven straight ahead, the suspension operates at its standard spring rate, and accordingly priority is given to the comfort of the ride.

Furthermore, the maximum values for the torques YL and YR are set to, for example, 200 N·m. These maximum values for the torques YL and YR are determined based upon numerical values or the like which have been selected by a plurality of persons who have performed test rides to evaluate ride comfort and controllability of the vehicle. Next, each of these steps will be explained.

In a step S01, the control circuit inputs from the steering angle sensor SA the steering angle amount, which includes information as to the steering angle direction. Next, in a step S02, the control circuit sets the steering angle direction which has been obtained from the steering angle sensor SA into a steering angle flag in the storage section.

Next, in a step S03, the control circuit performs a calculation to obtain the change of the steering angle amount over the above described fixed time period, in other words the rate of change of steering angle, as the differential value of the steering amount. At this time, as the differential value, for example, the measured value for the previous iteration of this program is stored in the storage section, and this measured value upon the previous iteration is subtracted from the measured value which is obtained this time.

Next, in a step S04, the control circuit sets thed rate of change of steering angle direction, which gives the direction of the rate of change of steering angle, into a rate of change of steering angle direction flag in the storage section.

It may happen, when the steering wheel 8 is returned or the like, that, although the steering angle direction is constant, the direction of the steering angle and the rate of change of steering angle are different from one another. Accordingly, next, in a step S05, the control circuit selects the torques YL and YR which correspond to the rate of change of steering angle from the graph shown in FIG. 11 stored in the storage section which gives the relationship between the rate of change of steering angle and the torques to be generated by the actuators 1L and 1R, and outputs them as the result of the calculation. Furthermore, the maximum values for the torques YL and YR in FIG. 11 are set to, for example, 200 N·m.

These maximum values for the torques YL and YR are determined, for each type of vehicle, based upon numerical values or the like which have been selected by a plurality of persons who have performed test rides to evaluate ride comfort and controllability of the vehicle.

Next, in a step S06, the control circuit sets the torques YL and YR to be generated by the actuators 1L and 1R in this predetermined time period. Furthermore, in the flow chart of FIG. 32, a calculation is performed in order to determine the torques TL and TR to be generated by the actuators 1L and 1R, based upon the stroke amounts.

First, in a step S11, the control circuit reads in the respective measured values MDL and MDR from the stroke sensors SL and SR for the left and right suspension units. Next, in a step S12, the control circuit calculates the differences between these measured values and their standard values, in other words the stroke amounts.

In other words, the control circuit calculates the stroke amount ΔDL for the left rear wheel according to the expression MDL−DL, and similarly calculates the stroke amount ΔDR for the right rear wheel according to the expression MDR−DR, and stores both of these values in the storage section.

Next, in a step S13, the control circuit calculates the stroke difference ΔLR between the stroke amount ΔDL for the left rear wheel and the stroke amount ΔDR for the right rear wheel according to the expression ΔDL−ΔDR.

Next, in a step S14, the control circuit makes a decision as follows: if the stroke difference ΔLR is ±α, then it takes the vehicle operational state as "straight ahead"; if the stroke difference ΔLR is >α, then it takes the state of the vehicle body B as "right down"; and, if the stroke difference ΔLR is <−α, then it takes the state of the vehicle body B as "left down". The result of this decision is taken as the vehicle operational state, which is stored together with the stroke difference ΔLR in the storage section.

The value α may be, for example, set to 0.3 mm, and is the range of stroke difference ΔLR which is taken as being equivalent to zero. By setting this "straight ahead" range, undesirable increase of the stiffness of the suspension while the vehicle is being driven straight ahead due to hypersensitive reaction to minute irregularities in the road surface is prevented.

In other words, no torque is generated by the actuators 1L and 1R for minute changes of the stroke positions, and thus, during straight ahead driving of the vehicle, the suspension operates only according the basic spring rate of the springs without any supplementation of the roll stiffness, whereby priority is accorded to the comfort of the ride.

Next, in a step S15, the control circuit calculates the torques TL and TR to be generated by the actuators 1L and 1R, based upon the stroke difference ΔLR.

In detail, the value obtained by multiplying the stroke difference ΔLR by the spring rate difference ΔJ between a target spring rate JT (units newtons/mm, and including a spring rate based upon the torsional stiffness of the stabilizer not shown in the figures) which is set according to the type of vehicle, and the basic spring rate JS (units newtons/mm) of the springs 7L, 7R which are actually provided to the suspension, is taken as the roll stiffness reaction force deficiency force FW.

The target spring rate JT is obtained by adding together the maximum values of each of the torque YL and the torque TL, which are each determined according to the type of vehicle and may be for example 32 N/mm, and converting the torque TTL which is the result of this addition into a spring rate, and adding this to the basic spring rate (although this value is different for different types of vehicle, it may be for example 14.6 N/mm).

Accordingly, the control circuit obtains this roll stiffness reaction force deficiency force F by calculating it according to the expression [(JT−JS)×ΔLR].

Furthermore, the torques TL and TR which are respectively generated by the actuators 1L and 1R are the torques which are necessary for complementing the spring rate difference ΔJ which is the deficiency of the basic spring rate JS with respect to the target spring rate JT, and are obtained by multiplying the previously obtained roll stiffness reaction force deficiency force FW by the lever ratio DD (substantially, the length of the drive arm 4L or 4R, units mm).

In order to do this, the control circuit calculates the torques TL and TR according to the expression (FW×DD)/2.

In the above expression, the reason for dividing (FW×DD) by 2 is in order to perform control so as to generate half of the torque (the apparent spring rate increase amount) which is required to supplement the roll stiffness by each one of the actuators 1L and 1R, which operate in opposite directions.

The control circuit appends a polarity to this value (FW×DD)/2 which has been calculated in the step S15, according to which of "right down" and "left down" the vehicle operational state value currently is, and thus calculates the torques TL and TR.

For example, if it is supposed that the driver is performing steering to the right and that the vehicle body B is rolling in the left direction, in other words that the left side of the vehicle body is depressed in the direction ⑥ in FIG. 27 and its right side is rising up in the direction ⑦ (so that the vehicle operational state is "left down"), then the control circuit rotates the actuator 1L in the direction ②, and calculates the torque TL for extending the spring 6L as +(FW×DD)/2; while, on the other hand, it rotates the actuator 1R in the direction ④, and calculates the torque TR for extending the spring 6R as −(FW×DD)/2. (Conversely, if the vehicle body B is rolling in the right direction, in other words the right side of the vehicle body is depressed in the direction ⑧ in FIG. 27 and its left side is rising up in the direction ⑤, then the vehicle operational state is "right down".)

In the following, for the convenience of explanation, the torque direction for expanding the respective springs will be taken as the +direction, while the torque direction for compressing the springs will be taken as the −direction.

Furthermore, the maximum value for the torques TL and TR which are obtained from the stroke difference is set to, for example, 200 N·m.

This maximum value for the torques TL and TR is determined, for each type of vehicle, based upon numerical values or the like which have been selected by a plurality of persons who have performed test rides to evaluate ride comfort and controllability of the vehicle.

Next, in a step S16, the control circuit decides whether or not the operational state of the vehicle is "straight ahead".

If the result of this decision is that the operational state of the vehicle is not "straight ahead", then the control circuit stores the values of the torques TL and TR which have been obtained in the step S15 in the storage section, and then the procedure of this flow chart is terminated.

On the other hand, if the result of this decision is that the operational state of the vehicle is indeed "straight ahead", then the flow of control proceeds to the step S17.

In this step S17, since the stroke difference ΔLR is in the range for "straight ahead", the control circuit sets the target values for the torque TL and the torque TR according to the stroke difference ΔLR to zero and stores them in the storage section, and then the procedure of this flow chart is terminated.

Next, in the procedure whose flow chart is shown in FIG. 33, the values of the torques TTL and TTR to be actually generated by the actuators 1L and 1R are obtained based upon the torques YL and YR and the torques TL and TR which have been obtained by the procedures whose flow charts are shown in FIGS. 31 and 32.

First, in a step S21, the control circuit makes a decision as to whether or not the operational state of the vehicle is "straight ahead", and if the result of this decision is that the operational state is not "straight ahead" then the flow of control proceeds to the next step S22, while if the result of this decision is that the operational state is indeed "straight ahead" then the flow of control is transferred to a step S25.

Next, in a step S22, the control circuit makes a decision as to the comparison of the value of the operational state of the vehicle and the direction of the rate of change of steering angle, in other words as to whether or not the rolling direction is in correspondence to the rate of change of steering angle direction, which here amounts to whether or not the vehicle operational state value is "left down" and moreover the steering speed direction is rightwards. If at this time the control circuit determines that the vehicle operational state value is "left down" and moreover the steering speed direction is rightwards, then the flow of control is transferred to the step S25, while in the case of any other combination the flow of control is transferred to the next step S23.

Next, in this step S23, the control circuit makes a decision as to the comparison of the value of the operational state of the vehicle and the direction of the rate of change of steering angle, in other words as to whether or not the rolling direction is in correspondence to the rate of change of steering angle direction, which here amounts to whether or not the vehicle operational state value is "right down" and moreover the steering speed direction is leftwards. If at this time the control circuit determines that the vehicle operational state value is "right down" and moreover the steering speed direction is leftwards, then the flow of control is transferred to the step S25, while in the case of any other combination the flow of control is transferred to the next step S24. Next, in this step S24, the control circuit stores the torques TL and TR which were obtained from the stroke difference ΔLR in the storage section as the respective torques TTL and TTR.

Furthermore, in the step S25, the control circuit calculates the torque TTL to be generated by the actuator 1L based upon the expression [YL+TL], and calculates the torque TTR to be generated by the actuator 1L based upon the expression [YR+TR], and then stores these torques TTL and TTR which have been calculated in the storage section.

Next, in a step S26, the control circuit calculates the values of the electrical currents which must to be supplied to the actuators 1L and 1R in order to cause them to output these torquese TTL and TTR. For example, if the motors ML and MR which are being used are DC motors and these motors ML and MR are being controlled by PWM (pulse width modulation), then the control circuit calculates a duty ratio for continuous pulses at a constant period of width between H level and L level suitable for adjusting the electrical current values.

Table 1 shows the combinations of calculations performed by the control circuit in the flow chart of FIG. 33, based upon the states of the above described vehicle operational state value and rate of change of steering angle direction flag.

TABLE 1

| VEHICLE OPERATIONAL STATE VALUE | RATE OF CHANGE OF STEERING ANGLE DIRECTION FLAG | ENTITIES TO BE ADDED |
|---|---|---|
| LEFT DOWN | RIGHT DIRECTION | ADD STEERING ANGLE SPEED AND TARGET VALUE OF STROKE |
| RIGHT DOWN | LEFT DIRECTION | ADD STEERING ANGLE SPEED AND TARGET VALUE OF STROKE |
| STRAIGHT AHEAD | NO DIRECTIONAL RELATIONSHIP | VEHICLE OPERATIONAL STATE VALUE = STRAIGHT AHEAD→TARGET VALUE COMPULSORY ADDITION |
| LEFT DOWN | LEFT DIRECTION | ONLY TARGET VALUE OF STROKE |
| RIGHT DOWN | RIGHT DIRECTION | ONLY TARGET VALUE OF STROKE |

"Compulsory addition" for the item "straight ahead" for the vehicle operational state is a name which is defined as a special addition process in the operation of the program which does not depend upon the vehicle operational state. In other words, normally, the vehicle body B rolls in the opposite direction from the steering angle due to centrifugal force, delayed by an amount due to the vehicle body compliance.

Thus, if the actuators 1L and 1R are not controlled when the operational state of the vehicle body B is "straight ahead" and the steering wheel 8 has already been turned, next rolling starts in stages in the direction opposite to the direction of the relative steering angle of the steering wheel 8.

Accordingly, since control of the roll stiffness during initial cornering is undesirably delayed by the amount of the vehicle body compliance, this compulsory addition is performed in order forcibly to generate torques by the actuators 1L and 1R opposite to the rolling direction, according to the steering angle direction.

In other words, when the vehicle body operational state value is "straight ahead", as has been described above, if the rate of change of steering angle direction flag and the vehicle operational state value do not agree with one another, the controlled torques TTL and TTR are set to zero, and, for the transient state at the start of cornering (when the stroke difference ΔLR is zero), no control can be performed, and, in the anti-rolling control, a delay in the control of the vehicle body B is undesirably caused, based upon the delay of the control system such as the actuators or the like, and upon the amount of compliance of the vehicle.

Thus, in this fifth preferred embodiment of the present invention, if the operational state value of the vehicle body B is "straight ahead", the torques YL and YR, based upon the rate of change of steering angle which is the differential coefficient of the steering angle amount, are compulsorily added to the respective torques TL and TR which are zero, so that the lag in the control of the vehicle body B is compensated for, and the response speed during initial cornering (going around a curve) is improved.

Furthermore, as will be understood from Table 1, in the behavior of the vehicle body B, when the rate of change of steering angle direction flag and the vehicle operational state value according to the rolling direction which corresponds to this rate of change of steering angle direction are in mutual agreement, the torques YL and YR which have been obtained from the rate of change of steering angle and the torques TL and TR which have been obtained from the stroke difference ΔLR are respectively added together, so as to yield the final target torques TTL and TTR which are to be outputted to the actuators 1L and 1R.

Furthermore, when the control circuit is performing this addition, if the rate of change of steering angle direction flag and the vehicle operational state value based upon this rate of change of steering angle direction do not agree with one another, it outputs the final target torques TTL and TTR as the result of calculation only according to the torques TL and TR based upon the stroke difference ΔLR.

This is in order to prevent diminution of the torques TTL and TTR, since the rate of change of steering angle direction is in the opposite direction, and the torque directions of the torques YL and YR which are obtained from the rate of change of steering angle become opposite to the direction of the torque which is required for suppressing the rolling, and the values of the torques YL and YR are subtracted from the torques TL and TR to provide the torque amounts for the torques TTL and TTR. At this time, if the steering angle direction has reversed, already the steering wheel 8 is steered in the opposite direction with respect to the direction which gives rise to the present rolling direction, as will be understood from the rate of change of steering angle direction, and it is necessary forcibly to generate torques by the actuators 1L and 1R opposite to the steering angle direction, since the control of the roll stiffness during initial cornering is undesirably delayed by the vehice body compliance.

Due to this, if the rate of change of steering angle direction flag and the value of the operational state of the vehicle based upon this rate of change of steering angle direction do not agree, and moreover the steering angle direction does not correspond to the present rolling direction, then, at the time point at which the steering angle direction flag becomes opposite to the direction which indicates the vehicle operational state value, the signs of the torques TTL and TTR become opposite to the signs of the torques TL and TR, and the directions of these torques TTL and TTR change to being the same direction as the rolling direction.

In other words, since undesirably the control of the roll stiffness during initial cornering is being delayed by the amount of the vehicle body compliance because the steering wheel 8 has already been turned and the steering angle direction has changed, the directions which give rise to this rolling are assumed, and the actuators 1L and 1R are controlled so as to generate torques in the same direction as the present rolling direction.

By the above described procedure, in this fifth preferred embodiment of the present invention, it is possible smoothly to control the roll stiffness of the vehicle body B in correspondence to the vehicle operational state during cornering or the like during anti-rolling control, if for example the vehicle body operational state value changes from "right down" to "straight ahead", and from "straight ahead" to "left down", since the torques TTL and TTR are calculated while predicting the next rolling direction in consideration of the amount of compliance and the amount of control lag.

Furthermore, if it is desired to make the values of the electrical currents which are supplied to the motors ML and MR larger in order to increase the torques which they provide, then the control circuit calculates the duty ratio for the above described PWM control so as to increase the width of the H level (of the H pulse at positive logic level) and so as to narrow the width of the L level, while conversely, if it is desired to make the values of the electrical currents smaller in order to decrease the torques which they provide, then it calculates the duty ratio for the above described PWM control so as to narrow the width of the H level and so as to increase the width of the L level; and thereby the desired torques TTL and TTR are obtained.

At this time, the directions in which the torques are generated are controlled to be opposite to the directions of the electrical currents which flow through the motors ML and MR.

In the following, for the convenience of explanation, the direction for electrical current which causes the actuator 1L to rotate in the direction ② (refer to FIG. 27), in other words in the (+) direction, and to generate torque TL in the direction to extend the spring 7L, will be defined to be the (+) direction, while the opposite electrical current direction which causes the actuator 1L to rotate in the direction ①, in other words in the (−) direction, and to generate torque TL in the direction to compress the spring 7L, will be defined to be the (−) direction.

In the same manner, the direction for electrical current which causes the actuator 1R to rotate in the direction ④, in other words in the (+) direction, and to generate torque TR in the direction to extend the spring 7R, will be defined to be the (+) direction, while the opposite electrical current direction which causes the actuator 1R to rotate in the direction ③, in other words in the (−) direction, and to generate torque TR in the direction to compress the spring 7R, will be defined to be the (−) direction.

Next, to return to FIG. 30, the actual flow of control will be explained. First, a simple explanation of the various views shown in FIG. 30 will be provided.

FIG. 30(*a*) shows the direction of the steering angle, and the side above the standard line shows the steering angle to the right when the vehicle is turning to the right, while the side below the standard line shows the steering angle to the left when the vehicle is turning to the left.

Furthermore, in FIG. 30(*a*), the rectangular solid line shows the direction of the rate of change of steering angle, in other words the direction in which the steering wheel is being turned.

For example, even if the steering angle is to the right side, when the steering wheel is turned to the left, the direction of the rate of change of steering angle becomes left, and thus the directions of the steering angle and the rate of change of the steering angle do not agree with one another.

FIG. 30(*b*) shows the vehicle operational state value which is the rolling state of the vehicle body B due to the steering wheel being turned. In other words, the vehicle operational state value, as obtained from the above described stroke difference ΔLR, is specified as being one or the other of "straight ahead", "right down", and "left down".

FIG. 30(*c*) shows the state of the steering angle direction flag, and simultaneously shows the directions in which torque is generated by the actuators 1L and 1R.

For example, as this torque generation direction, if the actuator 1R is rotated in the (+) direction so as to extend the right side spring 7R, and the actuator 1L is rotated in the (−) direction so as to compress the left side spring 7L, then the steering angle direction flag is "left"; and, conversely, if the actuator 1L is rotated in the (+) direction so as to extend the left side spring 7L, and the actuator 1R is rotated in the (−) direction so as to compress the right side spring 7R, then the steering angle direction flag is "right".

In other words, the control circuit controls the polarities of the electrical currents which are supplied to the actuators 1L and 1R based upon this steering angle direction flag.

FIG. 30(*d*) shows the torques YL and YR which have been calculated based upon the rate of change of steering angle and the absolute value of the torques TL and TR which have been calculated based upon the stroke difference ΔLR. The torque YL and the torque YR have the same absolute value, but the directions of the forces which they exert are mutually opposite, and in the same manner the torque TL and the torque TR have the same absolute value, but the directions of the forces which they exert are mutually opposite.

FIG. 30(e) shows the absolute value of the torque TTL which is the final target torque value, and which is obtained by adding together the torques YL and TL of FIG. 30(d), and the absolute value of the torque TTR which is the final target torque value, and which is similarly obtained by adding together the torques YR and TR. Again, the torque TTL and the torque TTR have the same absolute value, but the directions of the forces which they exert are mutually opposite.

Furthermore, with regard to the maximum values for these torques TTL and TTR, the torque TTL is obtained by adding together the respective maximum values for the torque YL and the torque TL, and, when the appropriate electrical current is supplied to the actuator 1L for generating this torque TTL, this determines a strength of the actuator 1L which is capable of coping with a torque in the direction opposite to this torque TlT.

FIGS. 30(d) and 30(e) show absolute values, and the directions of the torques which are generated by the actuators 1L and 1R are given by the steering angle direction flag.

At each instant of the explanation which follows, the control circuit samples the values of the various required parameters from the various sensors, and performs calculations to obtain the torques TTL and TTR which are the final control targets, according to the procedure of the flow charts described above and shown in FIGS. 31, 32, and 33 which it executes repeatedly at a fixed interval.

At the time point t0 the vehicle body B is not in the rolling state, since it is being steered neither in the right direction nor in the left direction.

Due to this, the stroke difference ΔLR is zero, and the vehicle operational state value is "straight ahead".

Accordingly, the control target torques YL and YR which are obtained from the rate of change of steering angle and the control target torques TL and TR which are obtained from the stroke difference ΔLR are all zero, and the resultant torques TTL and TTR which are obtained by adding them respectively together are also both zero, so that the electrical current values which are calculated for producing these torques are also zero, and no electrical current is supplied to the actuators 1L and 1R for causing them to generate any torques.

Next, at the time point t1, the driver initiates cornering in the rightwards direction, and, when he starts to steer the vehicle to the right, the steering angle gradually starts to increase in the rightwards direction.

However, since at this time point t1 the steering wheel 8 still has not been turned, and the rate of change of steering angle is still zero, therefore the control circuit does not perform any change of the states of the steering angle direction flag and the rate of change of steering angle direction flag from their states of "left" during the previous iteration of this procedure.

Due to this, since the torques YL, YR, TL, and TR are all obtained as being zero as the results of calculation based upon the stroke difference ΔLR and upon FIG. 11, the control circuit calculates the torques TTL and TTR at this time point t1 as zero, and outputs this value for them.

Accordingly, the control circuit does not output any electrical current to cause the actuators 1L and 1R to generate any torque, and no torque control for the actuators 1L and 1R is performed.

Next, at the time point t2, the driver gradually increases the steering angle in the rightwards direction by turing the steering wheel 8, but, due to lag caused by the amount of compliance of the vehicle body B, rolling does not yet occur, and the vehicle operational state value remains at "straight ahead".

On the other hand, because a rightwards steering angle is being generated since the steering wheel is being turned, the control circuit stores "right" in the steering angle flag based upon the steering angle which it obtains each fixed time period from the steering angle sensor SA, and calculates a rate of change of steering angle based upon the steering angle which it has just obtained and the steering angle during the previous iteration of this procedure.

At this time, at the time point that steering starts, the previous value of steering angle for calculation of the rate of change of steering angle is set to zero.

The control circuit changes the rate of change of steering angle flag to the state "right", since the direction of the rate of change of steering angle which has been obtained as a result of calculation is "right" because the steering wheel 8 is being steered in the rightwards direction.

The control circuit performs calculation to obtain the torques YL and YR which are the target values from this rate of change of steering angle which has been obtained, by referring to the graph of FIG. 11 which shows the relationship between the torque and the rate of change of steering angle.

In order to set a stiffness for the suspension during gentle cornering which does not exert any negative influence upon the comfort of the ride for the driver or upon the control stability, for each type of vehicle, the rate of change of steering angle which exerts such an influence is measured in advance, and, based upon the results of these measurements, a lower limit is set for the rate of change of steering angle which generates the target values of the torques YL and YR in FIG. 11, and a tilt is set which changes in correspondence to the rate of change of steering angle up to the maximum values of the target values YL and YR.

Furthermore, although the control circuit obtains the torques TL and TR from the stroke difference ΔLR, since the vehicle operational state value is "straight ahead", torques TL and TR of zero are outputted as the results of the calculation.

At this time, since the vehicle operational state is "straight ahead", the control circuit performs the compulsory addition procedure detailed above, and adds together the torque YL and the torque TL, and the torque YR and the torque TR.

Since the torques TL and TR are zero, the torques TTL and TTR which result from the above calculation are just the same as the torques YL and YR which were obtained from the stroke difference ΔLR.

Based upon the steering angle direction flag which has been set to "right", the control circuit sets the direction in which the actuator 1L generates torque to the direction "extend the left side spring 7L", and sets the direction in which the actuator 1R generates torque to the direction "compress the right side spring 7R".

In other words, from the time point t2 at which the vehicle operational state is "straight ahead" to the time point t3, the final target torques TTL and TYR which are generated by the actuators 1L and 1R are obtained as just the torques YL and YR which are obtained from the rate of change of steering angle, since the torques TL and TR based upon the stroke difference ΔLR are zero.

The control device controls electrical currents to flow to the actuators 1L and 1R for generating these torques TTL and TTR, based upon the steering angle direction flag which indicates "right".

By doing this, the control circuit causes the actuator 1L to generate a torque TTL in the (+) direction ② (refer to FIG. 27), and causes the actuator 1R to generate a torque TTR in the (−) direction ③.

Accordingly, the vehicle body B is controlled in the direction to make the roll angle with respect to the road surface zero, in other words in the opposite direction to the roll angle, which is "left down".

Next, at the time point t3, based upon the value of the stroke difference ΔLR, the control circuit detects that the vehicle body operational state has changed from "straight ahead" to "left down".

Accordingly, if the rate of change of steering angle direction flag is "right" with the vehicle operational state being "left down"(so that the rolling direction of the vehicle body B and the steering speed direction are in mutual agreement), then the control circuit obtains, as the torque values for control, the torques TR and TL which are no longer zero, and which are the target values which have been obtained based upon the stroke difference ΔLR.

Due to this, the control circuit obtains the torque TTL as a result of calculation by adding together the torque YL and the torque TL, and similarly obtains the torque TTR as a result of calculation by adding together the torque YR and the torque TR.

Based upon the steering angle flag which indicates "right", the control circuit causes the actuator 1L to generate a torque TTL in the (+) direction ②, and causes the actuator 1R to generate a torque TTR in the (−) direction ③.

Accordingly, the vehicle body B is controlled in the opposite direction with respect to the rolling direction so as to reduce the stroke difference ΔLR to zero, in other words in the direction to make the roll angle with respect to the road surface equal to zero.

Next, at the time point t4, the control circuit outputs torque values YR and YL of zero, since the rate of change of steering angle is below its lower limit value which was set in the graph of FIG. 11. As a result, the control circuit outputs torques TTL and TTR as the result of its calculations according to the values of these torques TL and TR, respectively.

At this time, just like the control at the time point t3, the control circuit causes the actuator 1L to generate a torque TTL in the (+) direction ②, and causes the actuator 1R to generate a torque TTR in the (−) direction ③, so that the vehicle body B is controlled in the direction opposite to the rolling direction.

Next, at the time point t5, the driver returns the direction of the vehicle to the straight ahead direction by stopping driving around the corner.

In order to do this, although the steering angle direction of the vehicle is the right direction, the rate of change of steering angle direction in which the steering wheel is being turned goes to the so-called left direction state.

At this time the control circuit outputs the value zero for the torques YL and YR, although the rate of change of steering angle direction flag is set to "left", since the rate of change of steering angle is below its lower limit value which has been set in the graph of FIG. 11. In other words, at the time point t5, the control circuit only outputs the torques TL and TR which are obtained from the stroke difference ΔLR as the torques TTL and TTR, with the torque directions being set based upon the steering angle direction flag, since the time point 5 is a region of continuous steady turning around a curve in which the steering angle does not change.

Next, at the time point t6, the control circuit outputs the torques YL and YR which are obtained from the graph of FIG. 11 as the results of calculation, since the rate of change of steering angle is greater than its lower limit value which has been set in this graph.

However, when the control circuit sets the vehicle operational state value to "left" based upon the flow chart of FIG. 33, and sets the rate of change of steering angle direction flag to "left" (so that the roll direction of the vehicle and the steering speed direction do not agree with one another), then the torques YL and YR which are obtained based upon the rate of change of steering angle are not used, but instead the torques TL and TR which are obtained based upon the stroke difference ΔLR are outputted as the torques TTL and TTR.

Due to this, since the steering angle direction flag remains at "right" just as before, the control circuit performs control just as it did at the time point t3, by causing the actuator 1L to generate a torque TTL in the (+) direction ②, and causing the actuator 1R to generate a torque TTR in the (−) direction ③, so that the vehicle body B is controlled in the direction opposite to the rolling direction.

Next, at the time point t7, the control circuit detects that the direction of steering rotation has become "left" from the steering angle which it obtains from the steering angle sensor SA, and sets the steering angle direction flag to "left".

Furthermore, based upon the data "left" which has been set in the steering angle direction flag, the control circuit sets the direction of the torque which is generated by the actuator 1L to "compress left side spring 7L", and sets the direction of the torque which is generated by the actuator 1R to "extend right side spring 7R".

The control device causes electrical currents to be supplied to the actuators 1L and 1R for causing them to generate the torques TTL and TTL respectively, based upon the required directions for these torques to generated by these actuators as set in the above described manner.

By doing this, the control circuit performs control so as to cause the actuator 1L to generate a torque TTL in the (−) direction ①, and so as to cause the actuator 1R to generate a torque TTR in the (+) direction ④.

Accordingly, the control circuit starts to perform control in the direction to make the roll angle with respect to the road surface zero, in correspondence to the rolling of the vehicle body B which is being generated next, based upon the direction of steering rotation of the steering wheel 8, due to the vehicle body compliance amount, in other words in the opposite direction to the rolling direction, which is "right down".

At this time, the control circuit does not perform any change with regard to the other control parameters.

Next, at the time point t8, the control circuit detects the fact that the stroke difference ΔLR has entered within the range for "straight ahead", and accordingly sets the vehicle body operational state value to "straight ahead".

Based upon this vehicle operational state value and upon the rate of change of steering angle direction, the control circuit sets the torques TL and TR which are obtained from the stroke difference ΔLR to zero, and then performs the compulsory addition process, so as to output only the torques YL and YR which are obtained from the steering speed as the respective final target torques TTL and TTR.

Next, at the time point t9, the control circuit sets the vehicle body operational state flag to "right down", and, if the rate of change of steering angle direction flag is set to "left" (so that the roll direction of the vehicle and the steering speed direction do not agree with one another), detects the fact that the operational state of the vehicle body has changed from "straight ahead" to "right down", based upon the value of the stroke difference ΔLR.

Accordingly, based upon the value of the stroke difference ΔLR, the control circuit does not set the torques TR and TL which are the obtained target values, to zero, but instead obtains them by calculation as torque values for control. By doing this, the control circuit obtains the torque TTL as the result of calculation by adding together the torque YL and the torque TL, and in the same manner obtains the torque TTR as the result of calculation by adding together the torque YR and the torque TR.

Based upon the steering angle direction flag which indicates "left", the control circuit performs control so as to cause the actuator 1L to generate a torque TTL in the (−) direction ①, and so as to cause the actuator 1R to generate a torque TTR in the (+) direction ④, based upon setting of the torque generation direction for the actuator 1L to "compress left side spring 7L" and upon setting of the torque generation direction for the actuator 1R to "extend right side spring 7R".

Accordingly, during rolling, the vehicle body B is controlled in the direction to bring the roll angle to zero with respect to the road surface, in other words in the opposite direction to the rolling direction, which is the direction to bring the stroke difference ΔLR to zero.

Next, at the time point t10, the control circuit outputs the value zero for the torques YL and YR, since the rate of change of steering angle is below its lower limit value which has been set in the graph of FIG. 11.

As a result, the control circuit outputs only the respective torques TL and TR as the torques TTL and TTR as the result of its calculations, since the vehicle operational state is that of steadily turning around a curve.

At this time, since as above the steering angle direction flag indicates "left", in the same manner as with the control at the time point t9, therefore the control circuit performs control so as to cause the actuator 1L to generate a torque TTL in the (−) direction ①, and so as to cause the actuator 1R to generate a torque TTR in the (+) direction ④, thus controlling the vehicle body B in the direction opposite to the rolling direction. Next, at the time point till, the driver starts to return the direction of the vehicle to the straight ahead direction by ceasing to drive around the corner. Due to this, although the steering angle direction of the vehicle remains at the left direction, the rate of change of steering angle direction in which the steering wheel is being turned now becomes the so-called right directional state.

At this time, the control circuit sets the rate of change of steering angle direction flag to "right", but outputs zero as the value of the torques YL and YR, since the rate of change of steering angle is lower than its lower limit value which has been set by the graph of FIG. 11.

Next, at the time point t12, the control circuit calculates the torques YL and YR which are obtained from the graph of FIG. 11 and outputs the results, since now the rate of change of steering angle is greater than its lower limit value which has been set by this graph.

However, when the control circuit sets the vehicle operational state value to "right" based upon the flow chart of FIG. 33, and sets the rate of change of steering angle direction flag to "right" (so that the roll direction of the vehicle and the steering speed direction do not agree with one another), then the torques YL and YR which are obtained based upon the rate of change of steering angle are not used, but instead the torques TL and TR which are obtained based upon the stroke difference ΔLR are outputted as the torques TTL and TTR.

Due to this, since the steering angle direction flag remains at "left" just as before, the control circuit performs control just as it did at the time point t9, by causing the actuator 1L to generate a torque TTL in the (−) direction ①, and causing the actuator 1R to generate a torque TTR in the (+) direction ④, so that the vehicle body B is controlled in the direction opposite to the rolling direction.

Next, at the time point t13, the control circuit detects that the direction of steering rotation has become "right" from the steering angle which it obtains from the steering angle sensor SA, and sets the steering angle direction flag to "right".

Furthermore, based upon the data "right" which has been set in the steering angle direction flag, the control circuit sets the direction of the torque which is generated by the actuator 1L to "extend left side spring 7L", and sets the direction of the torque which is generated by the actuator 1R to "compress right side spring 7R".

The control device causes electrical currents to be supplied to the actuators 1L and 1R for causing them to generate the torques TTL and TTR respectively, based upon the required directions for these torques to generated by these actuators as set in the above described manner.

By doing this, the control circuit performs control so as to cause the actuator 1L to generate a torque TTL in the (+) direction ②, and so as to cause the actuator 1R to generate a torque TTR in the (−) direction ③.

Accordingly, the control circuit starts to perform control in the direction to make the roll angle with respect to the road surface zero, in correspondence to the rolling of the vehicle body B which is being generated next, based upon the direction of steering rotation of the steering wheel 8, due to the vehicle body compliance amount, in other words in the opposite direction to the rolling direction, which is "left down".

At this time, the control circuit does not perform any change with regard to the other control parameters.

The procedure from the time point t14 onwards is merely a repetition of the procedure from the time point t1 described above, and accordingly its description will be curtailed.

As described above, in the control method for a suspension according to the present invention, the torques which are obtained from the rate of change of steering angle direction and from the stroke difference are obtained by performing the addition procedure shown for each combination of circumstances in Table 1, and the actuators 1L and 1R are controlled so as to generate these torques as target values in the direction opposite to the rolling direction, and, by thus increasing the opposing spring rate, the roll stiffness of the vehicle body is appropriately controlled in correspondence with the operational states of the vehicle being driven in a straight line, and of being driven around a corner or the like which causes rolling.

Due to this, in the above described suspension control method, including the case when the vehicle body is in the central state, the torques TL and TR are generated based upon the speed with which the steering wheel is being turned, in other words upon the rate of change of steering angle, and the actuators are torque controlled in the direction opposite to the rolling direction, so that, by thus increasing the opposing spring rate, by comparison with the case of performing control based upon the amount of stroke change, the initial responsiveness of supplementation of roll stiffness during cornering is enhanced, and it is possible to improve the response lag due to the compliance of the vehicle, so that it is possible to position the center of gravity of the vehicle at the center of the vehicle body from the start of cornering, and stability of the vehicle with respect to the centrifugal force which is always generated during cornering is obtained.

At this time, the directions of the torques to be generated by the actuators 1L and 1R is determined according to the steering angle direction flag.

Furthermore, in the above described torque control of the actuators 1L and 1R, when determining the directions of the forces which are exerted by the torques of the actuators 1L and 1R from the vehicle operational state value according to the stroke difference ΔLR, if the operational state is not "straight ahead", then torque control according to the rolling direction is not performed, and, as has been described above, no control of torque is performed in correspondence to change of the rolling direction, due to the amount of compliance of the vehicle and due to lag in the control system.

Due to this, with the suspension control method of this invention, since the direction of the next rolling due to the steering angle direction is estimated in advance and torque control is performed based thereupon, thereby, even if the driver wobbles the steering wheel 8 in a zigzag manner so that the steering angle direction continually changes, the torque control is able to react to the changes of rolling direction, and it is possible to enhance the responsiveness of control of the roll stiffness according to the rolling.

Furthermore, with the suspension control method according to the present invention, even if it should happen that, while the vehicle is being driven at high speed upon a high speed expressway or the like, the steering wheel 8 is snatched by the tires of the vehicle being guided by ruts or the like which have been created by the passage of large vehicles and so on, or by the impact of a side wind or the like, the stiffness of the stabilizer in the suspension is supplemented by the torques which are generated in response to the rate of change of steering angle which is generated at this time, and therefore it is possible to increase the apparent stiffness of the stabilizer, so that it is possible to prevent staggering of the rear end of the vehicle.

Yet further, with the suspension control method of the present invention, when the vehicle is being driven in a straight line, a rate of change of steering angle of zero is obtained because the steering angle which is inputted by rotating the steering wheel 8 is small since no steering operation is being performed, and moreover the control circuit does not control the actuators 1L and 1R since the stroke difference ΔLR due to rolling which is obtained is zero, so that the stiffness of the suspension is not supplemented, and therefore the suspension operates according to the basic values of the spring rates of the springs 7L and 7R, so that no loss of the basic ride comfort which has been set in advance is experienced.

Embodiment 6

The structure of the sixth preferred embodiment of the present invention is the same as that of the fifth preferred embodiment described above, and accordingly structural descriptions will be curtailed.

Figure 34:
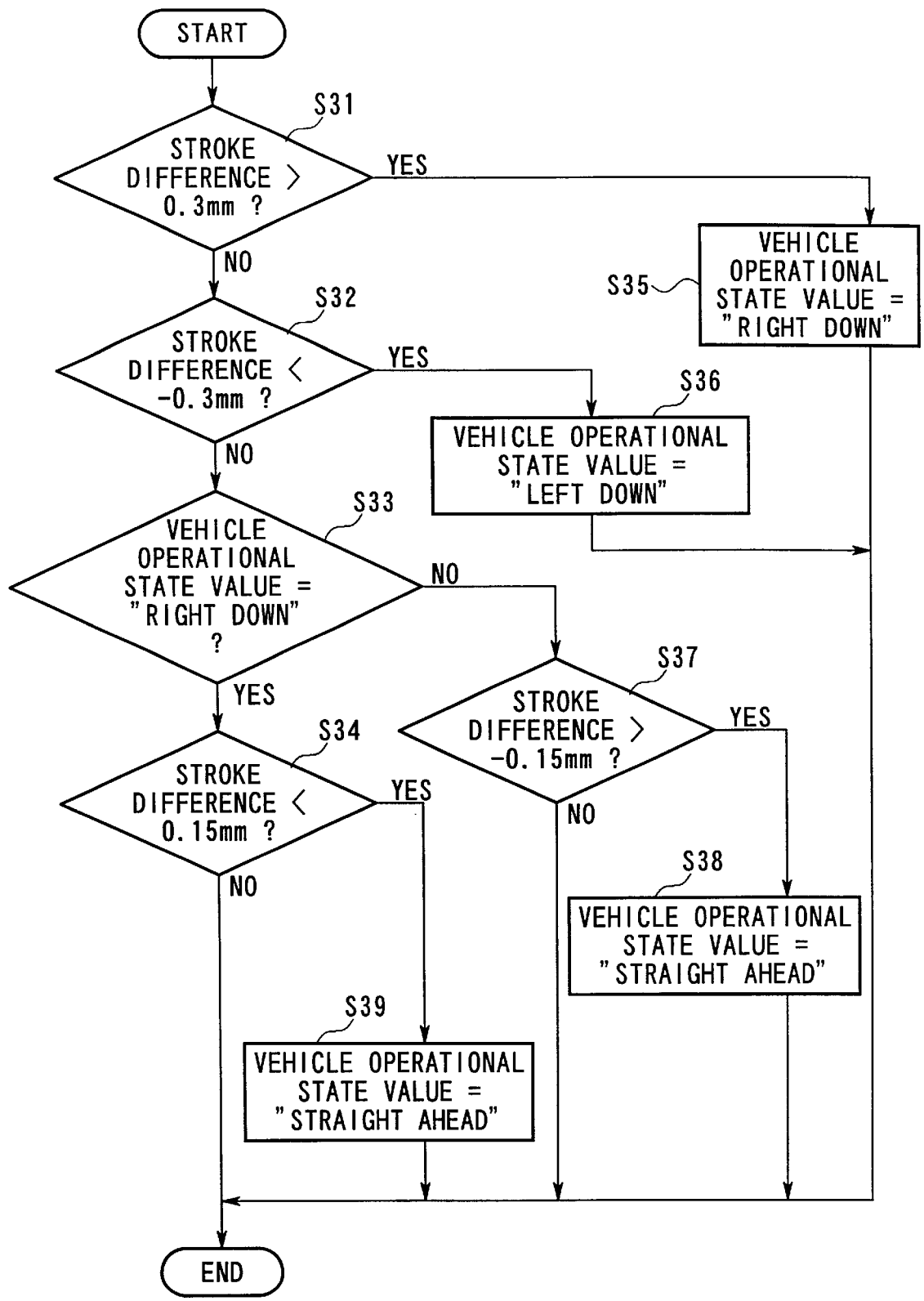
FIG. 34 is a flow chart showing the control flow of a determination procedure, when a threshold value used for determination of the state of the vehicle body exhibits hysteresis.

The point of difference between this sixth preferred embodiment and the fifth preferred embodiment is that the step S14 of the procedure whose flow chart is shown in FIG. 32 is replaced by steps S31 through S39, a flow chart whereof is shown in FIG. 34.

In the fifth preferred embodiment described above, the range α within which the stroke difference ΔLR was taken as being zero was ±0.3 mm.

Figure 35:
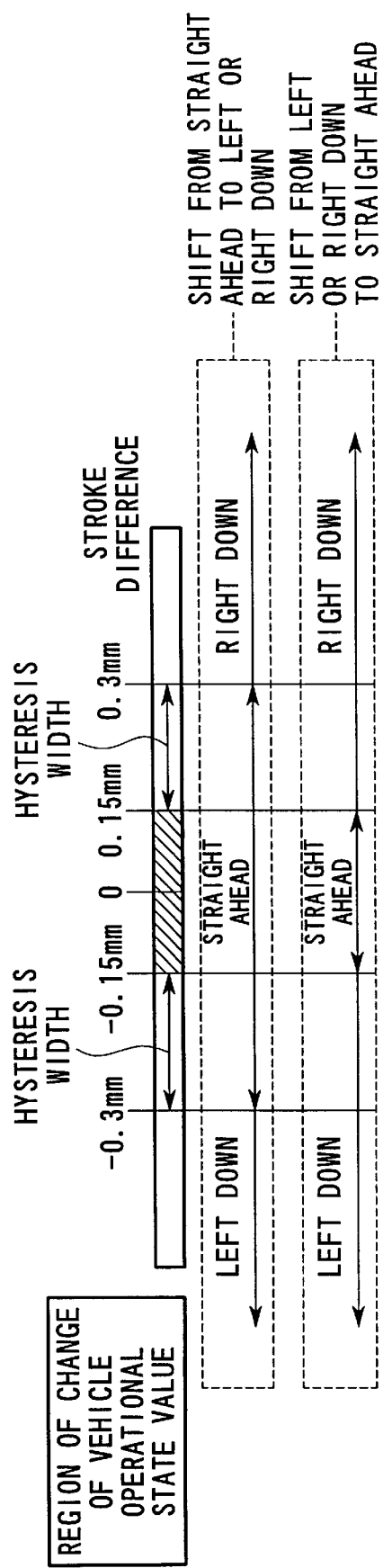
FIG. 35 is an overall view showing the hysteresis width of this threshold value which is used for determination of the state of the vehicle body.

On the other hand, with this sixth preferred embodiment, as shown in FIG. 35, a range α0 (which may for example be ±0.3 mm) within which the stroke difference ΔLR is taken as being zero is used when the vehicle operational state value has changed from "straight ahead" to "right down" or to "left down", while a range α1 (which may for example be ±0.15 mm) within which the stroke difference ΔLR is taken as being zero is used when the vehicle operational state value has changed from "right down" or "left down" to "straight ahead".

In other words, in this sixth preferred embodiment of the present invention, different values are used for the range for deciding upon the "straight ahead" state, after the vehicle operational state value has changed from "straight ahead" to some other value, and after it has changed from some other value to "straight ahead"; thus, the operation exhibits a hysteresis of a width of 0.15 mm.

Next, the operation of the steps shown in FIG. 34 will be explained. Since these steps replace the step S14 in FIG. 32, the explanation of the operation of the other steps in FIG. 32 will be curtailed.

It is presumed that in the step S13 of FIG. 32 the control circuit has calculated the stroke difference ΔLR between the stroke amount ΔDL of the left rear wheel and the stroke amount ΔDR of the right rear wheel according to the expression ΔDL−ΔDR.

To return to FIG. 34, first in a step S31 the control circuit makes a decision as to whether or not the stroke difference ΔLR is greater than 0.3 mm.

If at this time the control circuit determines that in fact the stroke difference ΔLR is not greater than 0.3 mm, then the flow of control is transferred to a step S32, while on the other hand, if the stroke difference ΔLR is indeed greater than 0.3 mm, then the flow of control is transferred to a step S35.

Next, in this step S35, the control circuit sets the vehicle operational state value to "right down", since the vehicle operational state is "right down".

Furthermore, in the step S32, the control circuit circuit makes a decision as to whether or not the stroke difference ΔLR is less than −0.3 mm. At this time, if the control circuit determines that in fact the stroke difference ΔLR is not less than −0.3 mm, then the flow of control is transferred to a step S33, while on the other hand, if the stroke difference ΔLR is indeed less than −0.3 mm, then the flow of control is transferred to a step S36.

Next, in this step S36, the control circuit sets the vehicle operational state value to "left down", since the vehicle operational state is "left down".

Furthermore, in the step S33, the control circuit circuit makes a decision as to whether or not the present state of the vehicle operational state value which was set in the previous iteration of this routine is set to "right down".

If at this time the control circuit determines that indeed the vehicle operational state value is set to "right down", then the flow of control is transferred to a step S34, while on the other hand, if in fact the vehicle operational state value is not set to "right down", then the flow of control is transferred to a step S37.

Next, in the step S37, since it has been checked that the present state of the vehicle operational state value is set to "left down", the control circuit makes a decision as to whether or not the stroke difference ΔLR is greater than −0.15 mm.

At this time, if the control circuit determines that in fact the stroke difference ΔLR is not greater than −0.15 mm, then the flow of control is transferred to the step S15 of FIG. 32, without altering the current vehicle operational state value which is "left down"; while on the other hand, if the stroke difference ΔLR is indeed greater than −0.15 mm, then the flow of control is transferred to a step S38.

Next, in a step S38, since the stroke difference ΔLR is greater than −0.15 mm, the control circuit detects that the present vehicle operational state has transited to "straight ahead", and accordingly it changes the vehicle operational state value from "left down" to "straight ahead".

Further, in the step S34, since it has been checked that the present state of the vehicle operational state value is set to "right down", the control circuit makes a decision as to whether or not the stroke difference ΔLR is less than 0.15 mm.

At this time, if the control circuit determines that in fact the stroke difference ΔLR is not less than 0.15 mm, then the flow of control is transferred to the step S15 of FIG. 32, without altering the current vehicle operational state value which is "right down"; while on the other hand, if the stroke difference ΔLR is indeed less than 0.15 mm, then the flow of control is transferred to a step S39.

Next, in this step S39, since the stroke difference ΔLR is less than 0.15 mm, the control circuit detects that the present vehicle operational state has transited to "straight ahead", and accordingly it changes the vehicle operational state value from "right down" to "straight ahead".

As described above, with this sixth preferred embodiment of the present invention, a hysteresis width like that shown in FIG. 35 is set by, when detecting the vehicle operational state based upon the stroke difference ΔLR which is obtained from the amounts of change of the left and right stroke positions, setting different numerical values for the threshold value for determining that the vehicle body B has transited either from the "left down" state or from the "right down" state to the "straight ahead" state, and for the threshold value for determining that the vehicle body B has transited from the "straight ahead" state either to the "left down" state or to the "right down" state.

With this hysteresis width, the reason for setting the threshold value for determining that the vehicle body B has transited from the "straight ahead" state either to the "left down" state or to the "right down" state, to be wider than the threshold value for determining that the vehicle body B has transited either from the "left down" state or from the "right down" state to the "straight ahead" state, is in order to prevent hypersensitive responsiveness to minute changes of the stroke difference in the "straight ahead" state, so that, after once transit has occurred either to the "left down" state or to the "right down" state, it should not return to the "straight ahead" state due to a minute variation of the stroke difference.

This hysteresis width may be adjusted as found appropriate, according to the performance characteristic of the control of the vehicle body B in terms of response speed, or according to the responsiveness characteristics of the sensors, or the like.

By including the above described procedure, this sixth preferred embodiment of the present invention adds the beneficial effects to those of the fifth preferred embodiment described above, that, since hysteresis is provided in the threshold value for transition to the "straight ahead" state, thereby hunting of the vehicle operational state value has been prevented from occurring in the case of the stroke difference ΔLR varying around the threshold value, which could happen if the threshold values were the same, and that, in the step S17 of the FIG. 32 flow chart, it is possible to avoid the problem of occurrence of oscillation of the output torques TTL and TTR, which are the final torque target values, between the target values of the torques TL and TR which are obtained from the stroke difference ΔLR becoming zero, and the torques TL and TR having non-zero values.

As a result, with this sixth preferred embodiment of the present invention, by stabilizing the electrical current values which the control circuit supplies to the actuators 1L and 1R without the occurrence of hunting, thereby the beneficial results are obtained that the performance of convergence of the control of the electrical current in correspondence to the torques TTL and TTR is enhanced, and the responsiveness of roll stiffness control of the suspension is improved.

Furthermore, with this sixth preferred embodiment of the present invention, since it is possible to prevent hunting due to changes of the stroke position about "straight ahead" as described above, accordingly during anti-rolling control of the vehicle body B the stability of the behavior of the vehicle body B is enhanced, since there is no oscillation of the vehicle body B due to hypersensitivity to the influence of minute changes.

Embodiment 7

Figure 36:
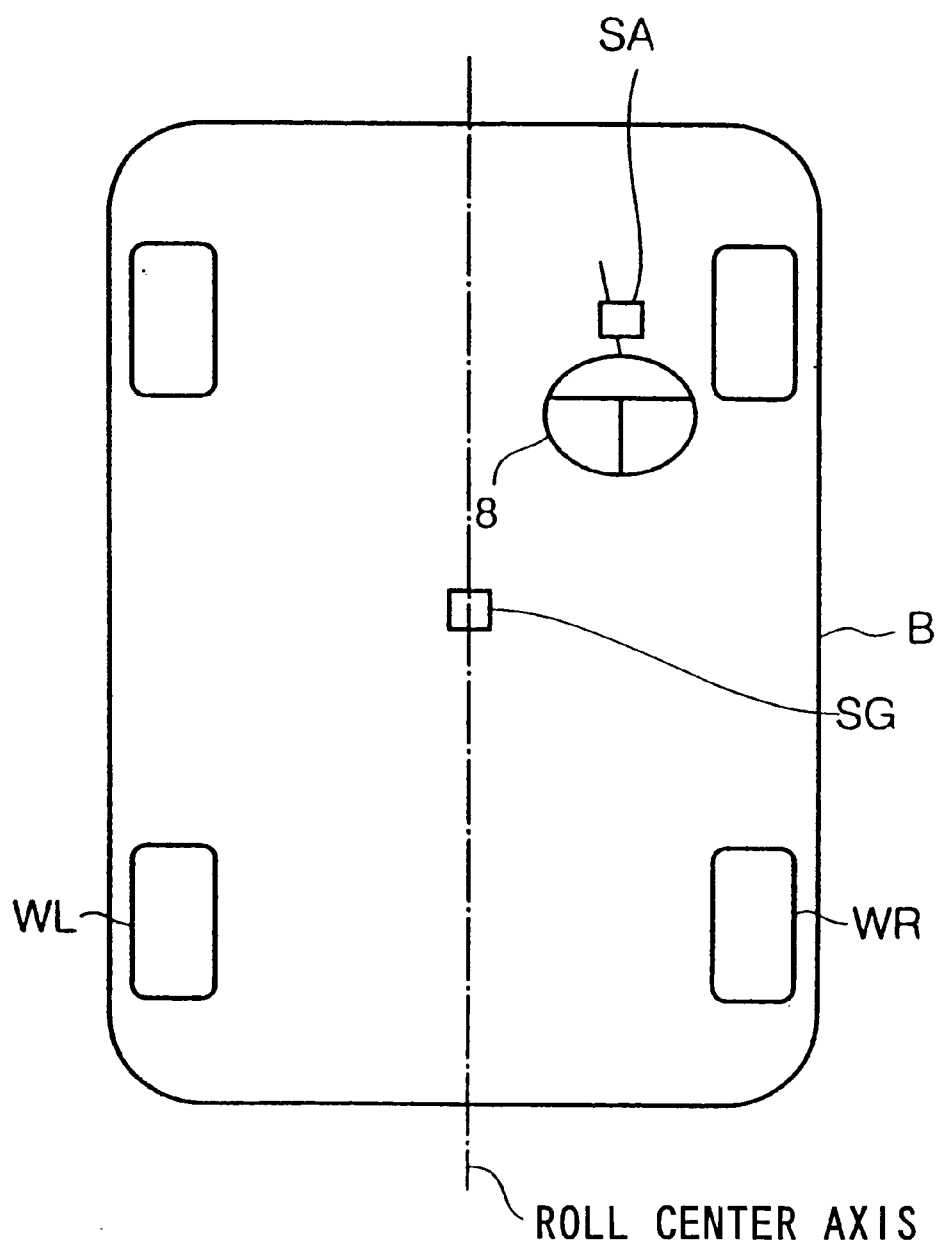
FIG. 36 is a schematic plan view showing the arrangement of an acceleration sensor SG and a steering angle sensor SA in the vehicle body B, as seen from above.

The particular outstanding point in connection with the structure of a seventh preferred embodiment of the present invention is that, as shown in FIG. 36, instead of the stroke sensors SL and SR, there is provided a sideways acceleration sensor SG which measures the acceleration of the vehicle body B in the sideways direction. This sideways acceleration sensor SG is provided at a point upon the vehicle body B upon the roll axis thereof.

FIG. 36 is a schematic plan view as seen from above showing the arrangement of the acceleration sensor SG and the steering angle sensor SA in the vehicle body B. The other details of the structure of this seventh preferred embodiment of the present invention are the same as those of the fifth preferred embodiment described above, and accordingly description thereof will be curtailed.

Due to the above described structural difference, in this seventh preferred embodiment of the present invention, the control circuit obtains the torques TL and TR (which in the fifth preferred embodiment were obtained from the stroke difference ΔLR) based upon the value of the sidewise acceleration DG (units m/sec$^2$) which is outputted from the sideways acceleration sensor SG.

In this seventh preferred embodiment, the flow of the procedure for determining the torques YL and YR from the rate of change of steering angle is the same as in the fifth preferred embodiment described above, and accordingly explanation of this procedure for determining the torques YL and YR will be curtailed.

Figure 37:
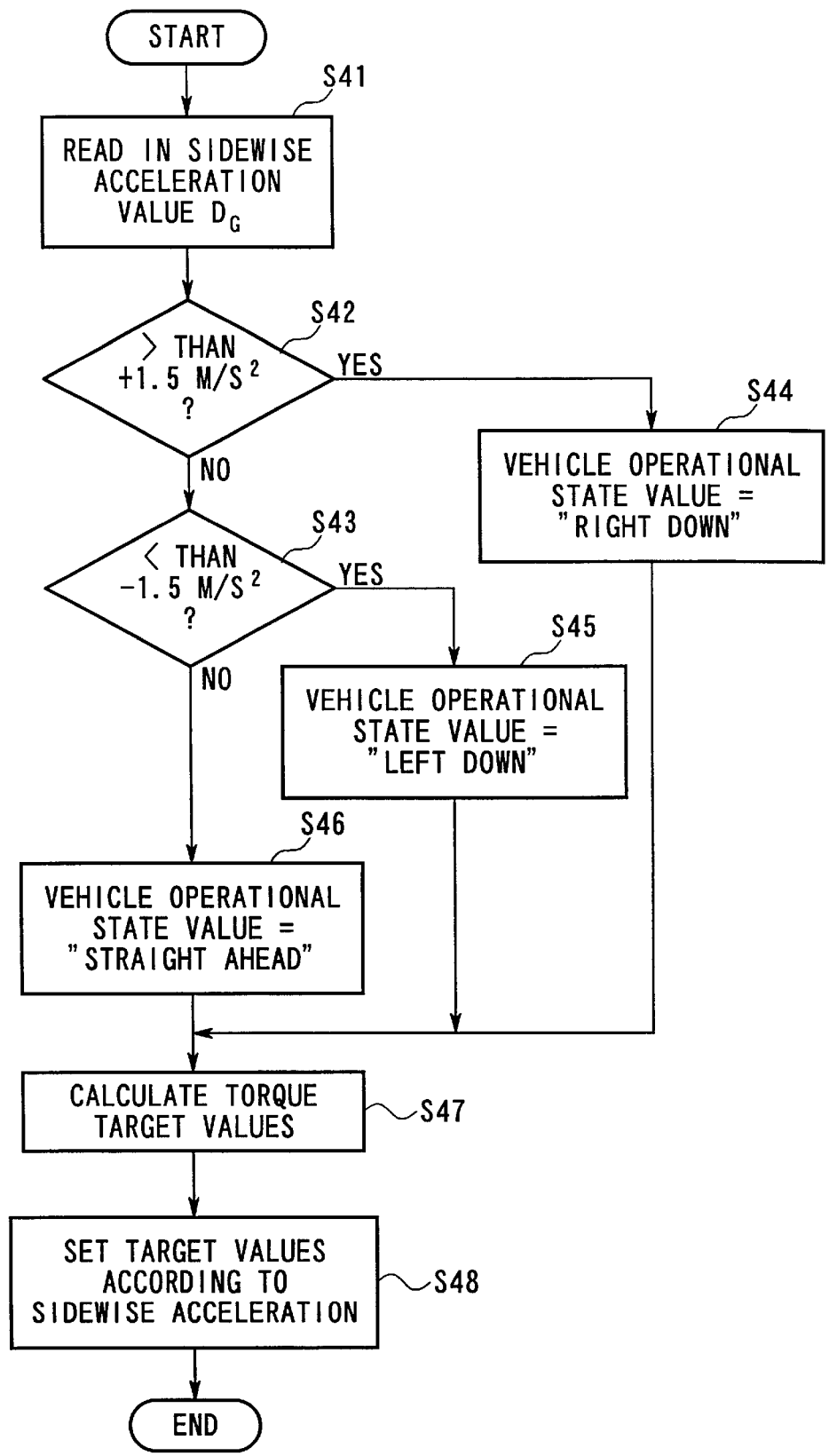
FIG. 37 is a flow chart showing the flow of a calculation routine for obtaining the torques YL and YR which are generated by the actuators 1L and 1R, based upon a sidewise accereration value DG.

In the procedure whose flow chart is shown in FIG. 37, a calculation is performed in order to obtain the torques YL and YR which are to be generated by the actuators 1L and 1R, based upon the sideways acceleration value DG.

Figure 38:
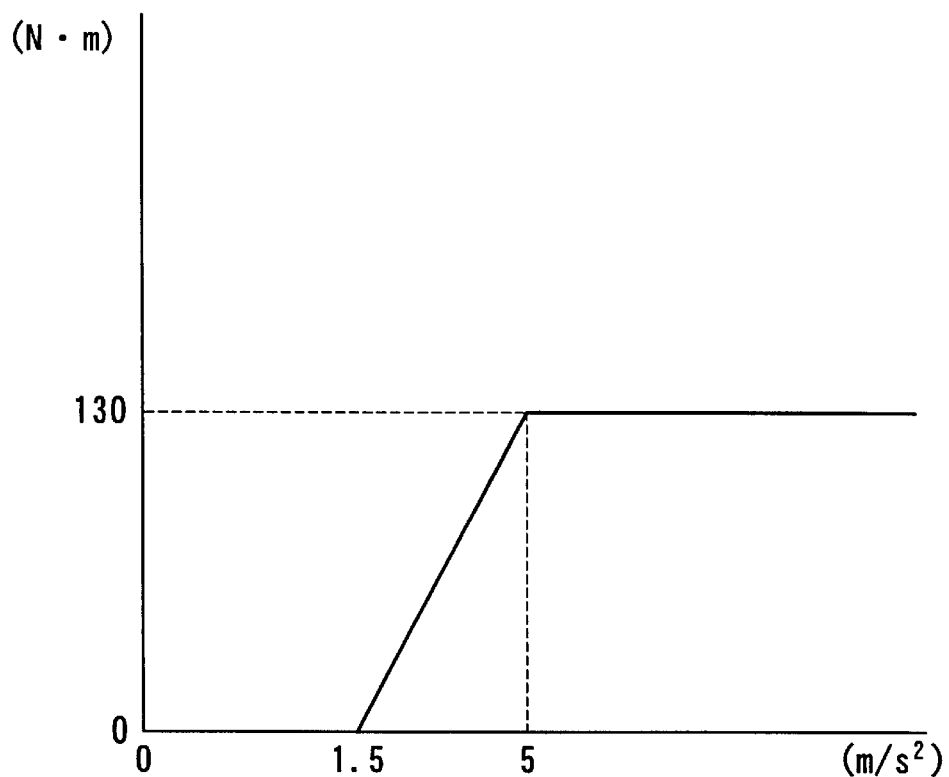
FIG. 38 is a figure showing the relationship between the sidewise acceleration value DG and the torques YL and YR.

This calculation obtains the torques YL and YR in correspondence to the rate of change of steering angle, from the relationship between the sideways acceleration value DG and the torques YL and YR which is shown in the graph of FIG. 38.

In FIG. 38, the sideways acceleration value DG is shown along the horizontal axis, while the torques YL and YR are shown along the vertical axis.

The values of the torques YL and YR are set to zero when the absolute value of the sideways acceleration value DG is, for example, less than 1.5 m/sec$^2$.

This is because it may happen that, while the vehicle is being driven straight ahead, minute sideways acceleration may be generated due to the steering wheel 8 being wobbled slightly, and is done in order to prevent undesirable increase of the stiffness of the suspension of the vehicle due to hypersensitivity to this wobbling.

In other words, for quite small sideways accelerations, the actuators 1L and 1R are not controlled to generate any torques, and when the vehicle is being driven straight ahead, the suspension operates at the basic spring rates of the springs, so that priority is given to the comfort of the ride.

Furthermore, the maximum values of the torques YL and YR are set to, for example, 130 n.m, corresponding to an acceleration value DG of 5 m/sec².

These maximum values for the torques YL and YR, and the tendency of change of the torques YL and YR in correspondence to the sideways acceleration value DG, are determined by, for each type of vehicle, the comfort of the ride and the controllability being evaluated by a plurality of testers, and based upon numerical values or the like which are selected from the data resulting from this testing.

Next, the procedure whose flow chart is shown in FIG. 37 will be explained. In this flow chart, a calculation is performed in order to obtain the torques TL and TR which are to be generated by the actuators 1L and 1R, based upon the sideways acceleration value DG outputted from the sideways acceleration sensor SG.

This sideways acceleration sensor SG outputs a positive (+) numerical value as the sideways acceleration value DG when the sideways acceleration is in the rightwards direction, and outputs a negative (−) numerical value as the sideways acceleration value DG when the sideways acceleration is in the leftwards direction.

First, in a step S41, the control circuit reads in the sideways acceleration value DG which has been detected by the sideways acceleration sensor SG. Next, in a step S42, the control circuit makes a decision as to whether or not this sideways acceleration value DG is greater than a standard acceleration value, for example 1.5 m/sec², which is set in advance. If at this time the control circuit determines that in fact the sideways acceleration value DG is not greater than 1.5 m/sec², then the flow of control is transferred to the step S43, while on the other hand, if the control circuit determines that the sideways acceleration value DG is indeed greater than 1.5 m/sec², then the flow of control is transferred to the step S44.

Next, in this step S44, since the sideways acceleration value DG is greater than 1.5 m/sec², the control circuit determines that sideways acceleration in the rightwards direction has been detected, and decides based thereupon that cornering in the leftwards direction is being performed, and accordingly sets the vehicle operational state value to "right down".

Furthermore, in the step S43, the control circuit makes a decision as to whether or not this sideways acceleration value DG is less than a standard acceleration value, for example −1.5 m/sec², which is set in advance. If at this time the control circuit determines that in fact the sideways acceleration value DG is not less than −1.5 m/sec², then the flow of control is transferred to the step S46, while on the other hand, if the control circuit determines that the sideways acceleration value DG is indeed less than −1.5 m/sec², then the flow of control is transferred to the step S45.

Next, in a step S45, since the sideways acceleration value DG is less than −1.5 m/sec², the control circuit determines that sideways acceleration in the leftwards direction has been detected, and decides based thereupon that cornering in the rightwards direction is being performed, and accordingly sets the vehicle operational state value to "left down". Furthermore, in a step S46, the control circuit sets the vehicle operational state value to "straight ahead", since the numerical value of the sideways acceleration value DG is in the range from −1.5 m/sec² to 1.5 m/sec².

This range from −1.5 m/sec² to 1.5 m/sec² is the range for preventing increase of the stiffness of the suspension as a hypersensitive reaction to minute changes of the steering angle, when the vehicle is being driven in a straight line, or is being driven steadily around a curve, or the like.

In other words, for quite minute changes of the sideways acceleration value DG, no torque is generated by the actuators 1L and 1R, so that, while the vehicle is being driven straight ahead, the suspension operates according to the basic spring rates of the springs 7L and 7R, and accordingly priority is given to the comfort of the ride.

Furthermore, the maximum values for the torques YL and YR which are obtained based upon the sideways acceleration value DG are, for example, determined by, for each type of vehicle, the comfort of the ride and the controllability being evaluated by a plurality of testers, and based upon numerical values or the like which are selected from the data resulting from this testing.

Next, in a step S47, the control circuit calculates the torques TL and TR to be generated by the actuators 1L and 1R, based upon the sideways acceleration value DG. In other words, the control circuit selects the values for the torques YL and YR which correspond to the sideways acceleration value DG from respective graphs, stored in the storage section and shown in FIG. 38, of the relationship of said sideways acceleration value DG, and the torques to be generated by the actuators 1L and 1R, and outputs them as the results of this calculation.

Next, in a step S48, the control circuit sets the torques YL and YR to be generated by the actuators 1L and 1R in each fixed time period.

For example, based upon the fact that the steering angle direction flag is set to "right" because the driver is steering to the right, the control circuit sets the direction for the torque to be generated by the actuator 1L to the direction "extend left spring 6L" and sets the direction for the torque to be generated by the actuator 1R to the direction "extend right spring 6R"; and, supposing that the vehicle body B is rolling in the leftwards direction, in other words, referring to FIG. 27, that the left side of the vehicle body B is depressed in the direction ⑥ and the right side of the vehicle body B is elevated in the direction ⑦ (so that the vehicle operational state value is "left down"), then the control circuit calculates a torque TL for rotating the actuator 1L in the direction ② so as to extend the spring 6L, and calculates a torque TL for rotating the actuator 1R in the direction ④ so as to compress the spring 6R.

Figure 39:
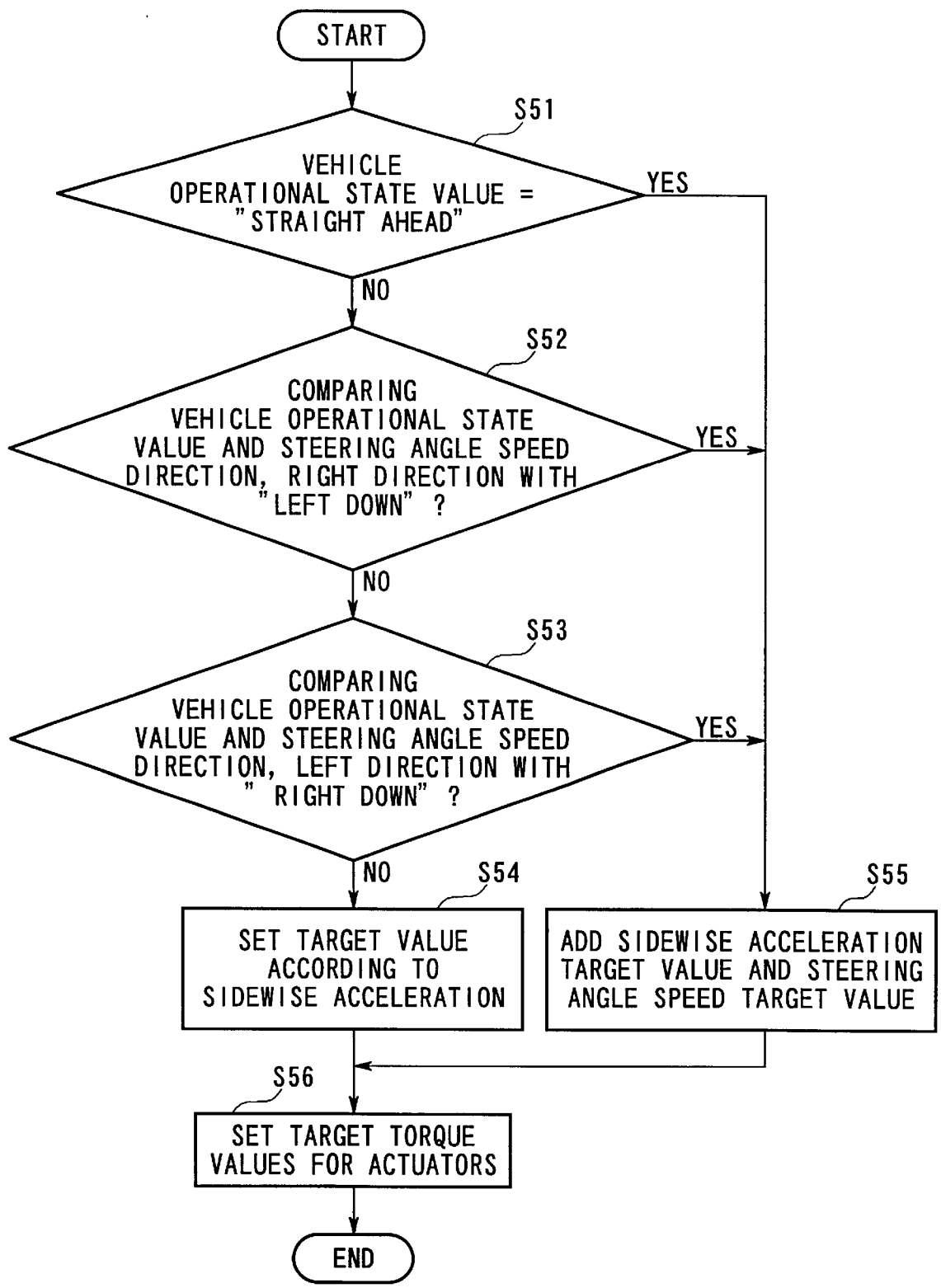
FIG. 39 is a flow chart showing the control flow of a calculation routine for obtaining the torques TTL and TTR which are actually generated by the actuators 1L and 1R, based upon the torques YL and YR and the torques TL and TR which have been obtained by the procedures whose flow charts are shown in FIGS. 31 and 37.

Next, in the flow chart of FIG. 39, the actual torques TTL and TTR which are to be generated by the actuators 1L and 1R are obtained, based upon the torques YL and YR and the torques TL and TR which have been obtained according to the procedures whose flow charts are shown in FIGS. 31 and 37.

First, in a step S51, the control circuit makes a decision as to whether or not the vehicle operational state value is "straight ahead", and if the result of this decision is in fact not "straight ahead" then the flow of control is transferred to a step S52, while on the other hand, if the result of this decision is indeed "straight ahead", then the flow of control is transferred to a step S55.

Next, in the step S52, the control circuit compares the vehicle operational state value and the rate of change of steering angle direction, in other words makes a decision as to whether or not the rolling direction is in correspondence to the rate of change of steering angle direction; the details of this first decision variant are that the control circuit decides whether or not the vehicle operational state value is "left down" and also the steering speed direction is "right".

If at this time the control circuit determines that the vehicle operational state value is "left down" and also the rate of change of steering angle direction is "right", then the flow of control is transferred to a step S55, while in any other combination of circumstances the flow of control is transferred to a step S53.

Next, in this step S53, the control circuit again compares the vehicle operational state value and the rate of change of steering angle direction, in other words makes a decision as to whether or not the rolling direction is in correspondence to the rate of change of steering angle direction; the details of this other decision variant are that the control circuit decides whether or not the vehicle operational state value is "right down" and also the steering speed direction is "left".

If at this time the control circuit determines that the vehicle operational state value is "right down" and also the rate of change of steering angle direction is "left", then the flow of control is transferred to the step S55, while in any other combination of circumstances the flow of control is transferred to a step S54.

Next, in this step S54, the control circuit stores the torques TL and TR which have been obtained from the sideways acceleration value DG in the storage section as the respective torques TTL and TTR.

Further, in the step S55, the control circuit calculates the torque TTL to be generated by the actuator 1L based upon the expression YL+TL, and calculates the torque TTR to be generated by the actuator 1R based upon the expression YR+TR, and stores the calculated values for the torques TTL and TTR in the storage section.

Next, in a step S56, the control circuit calculates the electrical current values which are required to be supplied to the actuators 1L and 1R in order for them to output the respective torques TTL and TTR.

For example, if pulse width modulation is being used, the control circuit calculates the duty ratios, i.e. the widths at H level and at L level, for continuous pulses at a fixed period, in order to adjust the electrical currents for the actuators. The combinations of calculations performed by the control circuit during the above described flow chart of FIG. 39, based upon the conditions of the vehicle operational state value and the rate of change of steering angle direction flag, are shown in Table 2. In this table, for the item where the vehicle operational state is shown as "straight ahead", the term "compulsory addition" is defined as meaning, during the operation of the program, special addition processing without any dependence upon the operational state of the vehicle.

TABLE 2

| VEHICLE OPERATIONAL STATE VALUE | RATE OF CHANGE OF STEERING ANGLE DIRECTION FLAG | ENTITIES TO BE ADDED |
| --- | --- | --- |
| LEFT DOWN | RIGHT DIRECTION | ADD STEERING ANGLE SPEED AND TARGET VALUE OF SIDEWISE ACCELERATION |
| RIGHT DOWN | LEFT DIRECTION | ADD STEERING ANGLE SPEED AND TARGET VALUE OF SIDEWISE ACCELERATION |
| STRAIGHT AHEAD | NO DIRECTIONAL RELATIONSHIP | VEHICLE OPERATIONAL STATE VALUE = STRAIGHT AHEAD→ TARGET VALUE COMPULSORY ADDITION |
| LEFT DOWN | LEFT DIRECTION | ONLY TARGET VALUE OF SIDEWISE ACCELERATION |
| RIGHT DOWN | RIGHT DIRECTION | ONLY TARGET VALUE OF SIDEWISE ACCELERATION |

Furthermore, as will be understood from Table 2, with regard to the behavior of the vehicle body B, when the rate of change of steering angle direction flag and the vehicle operational state value agree with one another, the final target torques TTL, TTR which are to be outputted by the actuators 1L and 1R are respectively determined upon by adding the torques YL, YR which are obtained from the rate of change of steering angle, to the torques TL, TR which are obtained from the sideways acceleration value DG.

On the other hand, if the torques TTL and TTR were calculated in the above manner when the rate of change of steering angle direction flag and the vehicle operational state value do not agree with one another, then their values would undesirably vary abruptly, since the torques YL, YR are of opposite polarities to the torques TL, TR.

Due to this, when the rate of change of steering angle direction flag and the vehicle operational state value do not agree with one another, and moreover the rolling direction is clearly defined, and only the torques TL and TR which are obtained from the sideways acceleration value DG are used for controlling the actuators 1L and 1R.

On the other hand, when the vehicle body operational state value is "straight ahead", then as described above, if the rate of change of steering angle direction flag and the vehicle operational state value do not agree with one another, then the torques TTL and TTR for control are set to zero, so that no control is performed during the transient operational state at the start of cornering (when the sideways acceleration DG is between $-1.5$ m/sec$^2$ and $+1.5$ m/sec$^2$), and, during anti-rolling control, lag in the control of the vehicle body B is undesirably generated based upon the delay in the control system for the actuators or the like, and upon the amount of vehicle compliance.

In order to cope with this problem, in this seventh preferred embodiment of the present invention, in the same manner as with the fifth preferred embodiment described above, if the vehicle body operational state value is "straight ahead", the torques YL and YR based upon the rate of change of steering angle which is the differential coefficient of the steering angle amount are compulsorily added to the values zero of the torques TL and TR, so that the lag in control of the vehicle body B is supplemented, and the response speed is improved during initial cornering when the vehicle is turning around a curve.

Accordingly, in order to do this, when it is desired to make the electrical currents supplied to the actuators large in order to make the torques generated by said actuators correspondingly large, the control circuit calculates the duty ratios for the torques TTL and TTR by increasing the width of the H level in the duty ratios and decreasing the width of the L level therein; while conversely, when it is desired to make the electrical currents supplied to the actuators small in order to make the torques generated by said actuators correspondingly small, the control circuit calculates these duty ratios by decreasing the width of the H level in the duty ratios and increasing the width of the L level therein.

At this time, the directions in which these torques are generated are controlled so as to reverse the directions of the electrical currents which flow through the motors ML and MR, in the same manner as already described above in connection with the fifth preferred embodiment.

Figure 40:
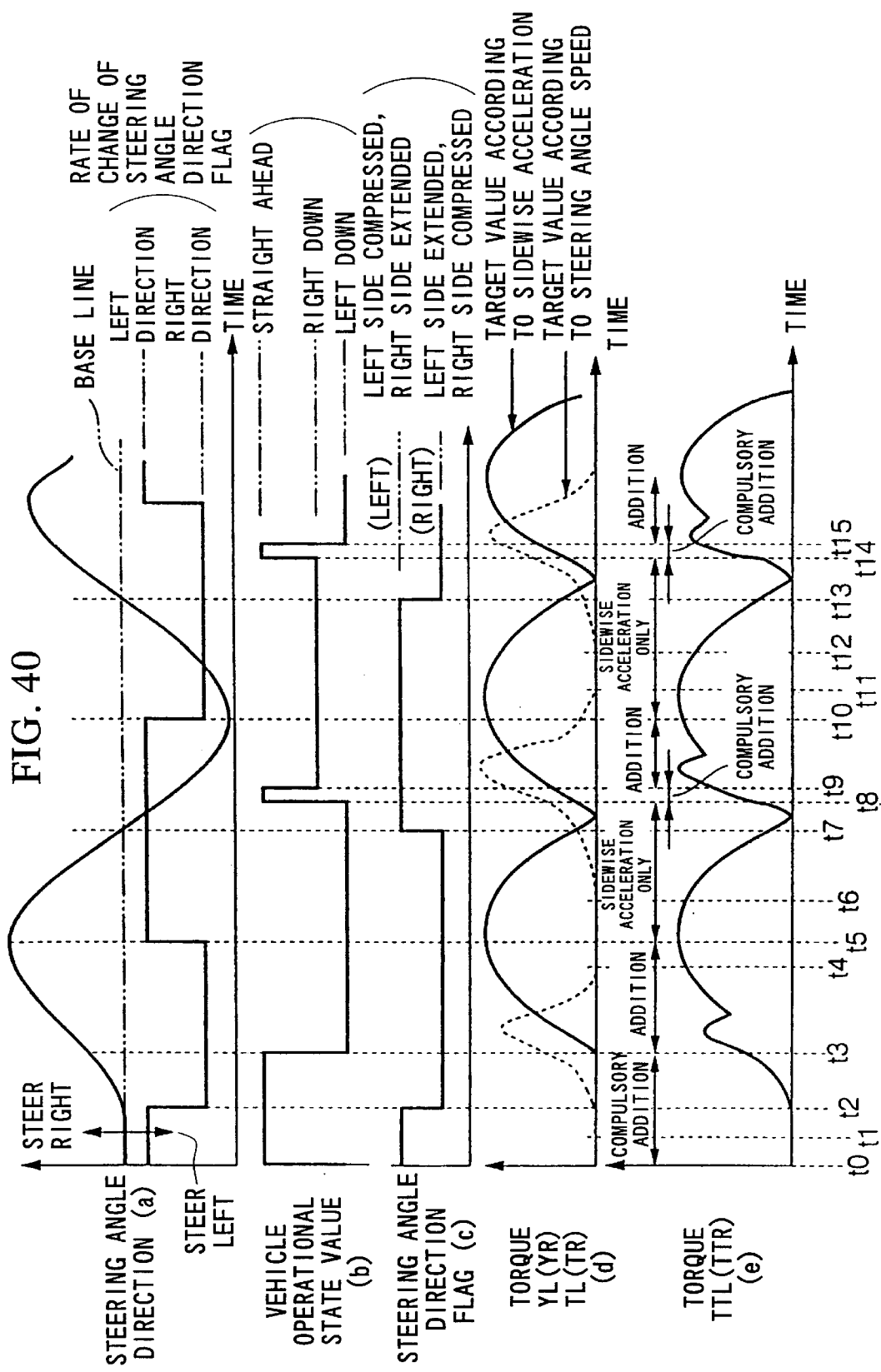
FIG. 40 is a timing chart showing the change of various parameters for calculation of the torque amounts which are generated by the actuators 1L and 1R, according to the direction in which the driver of the vehicle is steering.

Next, although the actual flow of control is shown in FIG. 40, the explanation of this timing chart will be curtailed, since the procedures which are performed at each time point are the same as in the case of the fifth preferred embodiment described above, with the sole exception that, in the procedure for detecting the vehicle operational state value, the torques TL and TR based upon the sideways acceleration value DG are substituted for the torques TL and TR based upon the stroke difference ΔLR.

Furthermore, with regard to the various views shown in FIG. 40, only the portions which differ from the case of the fifth preferred embodiment, i.e. FIGS. 40(d) and 40(e), will be explained.

FIG. 40(d) shows the absolute values of the torques YL and YR which have been calculated based upon the rate of change of steering angle, and of the torques TL and TR which have been calculated based upon the sideways acceleration DG. Although the absolute values of the torques YL and YR are the same, the directions in which they apply torque are opposite; and, similarly, although the absolute values of the torques TL and TR are the same, the directions in which they apply torque are likewise opposite.

FIG. 40(e) shows the absolute value of the torque TTL which is the final target value and which is obtained by adding together the torques YL and TL of FIG. 40(d), and also the absolute value of the torque TTR which is the final target value and which is obtained by adding together the torques YR and TR. Again, although the absolute values of the torques TTL and TTR are the same, the directions of the forces which they generate are opposite.

Furthermore, with regard to the maximum values of these torques TTL and TTR the torque TTL is obtained by adding together the maximum values for the torque YL and for the torque TL, and is determined at a strength for the actuator 1L capable of corresponding to a torque in the opposite direction to this torque TTL, when controlling the actuator 1L to generate this torque TTL. FIGS. 40(d) and 40(e) show absolute values, and the directions in which the actuators 1L and 1R are controlled to generate this torque is determined according to the steering angle direction flag.

As compared with the fifth preferred embodiment described above, this seventh preferred embodiment of the present invention provides the additional benefit that, since the sideways acceleration sensor SG is used instead of the stroke sensors SL and SR, therefore, as compared with the case in which the stroke sensors SL and SR are used, since no links or rods from the drive arms 4L and 4R to the stroke sensors SL and SR are required to be used, accordingly the two stroke sensors which are of relatively high cost are dispensed with, and also the structure of the detection mechanism for detecting the vehicle body operational state value becomes simple, so that it is possible to simplify the system as a whole, and it is also possible to reduce the cost of its manufacture.

Furthermore, with this seventh preferred embodiment of the present invention, since the rolling direction and the required torque values are obtained only based upon the sideways acceleration value DG, without using any stroke sensors, and control to improve the state of the vehicle body is performed by the actuators, thereby it is possible to prevent the problems that arise with control if stroke sensors are used, such as undesirable over-control in which minute concavities and convexities in the road surface are picked out.

Yet further, in the relationship between the sideways acceleration value DG and the torques TL and TR shown in the graph of FIG. 38 which is used in the flow chart of FIG. 39, it is possible to use an inferred sideways acceleration value DG' which is obtained from the vehicle speed and the steering angle, instead of the sideways acceleration value DG which is obtained from the sideways acceleration sensor SG.

By doing this, it becomes possible further to simplify the structure and the system of this seventh preferred embodiment, since the sideways acceleration sensor SG is no longer required, and it is possible further to reduce the cost of its construction.

With regard to this inferred sideways acceleration DG' which can thus be used, although the actual amount of body tilting with respect to change of sideways acceleration varies according to the actual body size of the vehicle and the like, it may be checked by a process of experiment that, between vehicle speeds of 0 kph and 60 kph for example, it has an approximately linear characteristic.

Due to this, if the relationship between the rate of change of steering angle and the vehicle speed is determined from test data for actual vehicles and is expressed as a graph, then the inferred sideways acceleration DG' can be determined from this graph.

In addition, with this seventh preferred embodiment of the present invention, just as with the sixth embodiment, when detecting the vehicle operational state based upon the numerical value of the sideways acceleration value DG, it would also be acceptable to set the threshold value for detecting that the vehicle body B has transited from either the "left down" or the "right down" operational state to the "straight ahead" operational state, and the threshold value for detecting that the vehicle body B has transited from the "straight ahead" operational state to either the "left down" or the "right down" operational state, as different numerical values, and to set a hysteresis width as shown in FIG. 35. As a result, the benefits of the sixth preferred embodiment of the present invention would also be available with this seventh preferred embodiment as well.

Just as in the sixth preferred embodiment, the above described hysteresis width can be adjusted and set as desired, according to the response speed of control of the vehicle body B, or the characteristics of the sensors, or some similar performance characteristic.

Although the present invention has been described in detail with reference to a plurality of preferred embodiments thereof, and with reference to the drawings, the concrete structure of the present invention is not to be considered as being limited by any of the preferred embodiments described above, or by any of the features of the drawings; various changes or modifications to the details of the present invention could be contemplated without departing from its proper scope, provided that the gist of the present invention, as defined by the Claims, is adhered to.

For example, in the above described fifth and sixth preferred embodiments of the present invention, although the actuators were described as being disposed in the suspension for the rear wheels of the vehicle, it would also be possible to provide them to the front wheels, or indeed to all four of the vehicle wheels.

What is claimed is:

1. A suspension control method for controlling a suspension which comprises respective actuators for left and right wheels of a vehicle, and which can apply forces in the upwards and downwards direction to said left and right vehicle wheels via these actuators, said method comprising:

if an absolute value of steering angle of the vehicle is not more than a predetermined steering angle, an absolute value of a rate of change of the steering angle is not more than a predetermined rate of change of steering angle, and an absolute value of acceleration of the vehicle in forwards and rearwards direction is not more than a predetermined value of the acceleration, then skyhook control is performed for giving priority to ride comfort;

if an absolute value of the steering angle is not more than the predetermined steering angle, and an absolute value of the acceleration in forwards and rearwards direction is greater than the predetermined value of the acceleration, then pitching suppression control is performed so as to suppress pitching of the vehicle; and if an absolute value of the steering angle is greater than the predetermined steering angle, or an absolute value of the rate of change of the steering angle is greater than the predetermined rate of change of steering angle, then rolling suppression control is performed so as to suppress rolling of the vehicle;

when the skyhook control or the rolling suppression control is performed, the control is performed by multiplying target values by a gain which is determined based upon a vehicle speed; and when the pitching suppression control is performed, the control is performed based on target values which are not multiplied by the gain.

2. A suspension control method according to claim 1, wherein the acceleration of said vehicle in the upwards and downwards direction is detected, and, if the value of this upwards and downwards acceleration falls outside a predetermined range of values, and has continued to be outside said predetermined value range for longer than a predetermined time period, then control is performed to suppress vibration of said vehicle based upon the value of said upwards and downwards acceleration which is detected.

3. A suspension control method according to claim 1, wherein the acceleration of said vehicle in the upwards and downwards direction is detected, and, if the value of this upwards and downwards acceleration falls within a predetermined range of values, and has continued to be within said predetermined value range for longer than a predetermined time period, then control is not performed to suppress vibration of said vehicle based upon the value of said upwards and downwards acceleration which is detected.

4. A suspension control method according to claim 1, wherein the acceleration in forwards and rearwards direction is detected by an accelerator pedal sensor.

5. A suspension control method according to claim 1, wherein the acceleration in forwards and rearwards direction is detected by a brake pedal sensor.

6. A suspension control method according to claim 1, wherein
when the skyhook control is performed, the acceleration of said vehicle in the upwards and downwards direction is detected, and, if the value of this upwards and downwards acceleration falls outside a predetermined range of values, and has continued to be outside said predetermined value range for longer than a predetermined time period, then control is performed to suppress vibration of said vehicle based upon the value of said upwards and downwards acceleration which is detected, and if the value of the upwards and downwards acceleration falls within a predetermined range of values, and has continued to be within said predetermined value range for longer than a predetermined time period, then control is not performed to suppress vibration of said vehicle based upon the value of said upwards and downwards acceleration which is detected.

7. A suspension control method according to claim 1, wherein
the actuators are electromagnetic actuators, and the method further comprising:
a step of, when supplying electrical current to said electromagnetic actuator to generate a desired output, calculating a first duty ratio for said electrical current to be supplied to said electromagnetic actuator corresponding to a target electrical current value for said electrical current;
a step of calculating a second duty ratio for said electrical current to converge the actual electrical current value which flows through said electromagnetic actuator to said target electrical current value by proportional integral and differential control; and
a step of supplying electrical current to said electromagnetic actuator according to a third duty ratio which is obtained by adding together said first duty ratio and said second duty ratio.

8. A suspension control method according to claim 1, wherein
in the rolling suppression control, a difference between amounts of movement of left and right wheels of said vehicle in the upwards and downwards direction is detected, and rate of change of steering angle is detected, and actuators are controlled based upon said vehicle wheel movement amount difference and upon said rate of change of steering angle.

9. A suspension control method according to claim 8, wherein
in the rolling suppression control, a stabilizer is provided which mechanically links together said left and right vehicle wheels, and which generates torque according to the difference between the movement amounts of said left and right vehicle wheels in the upwards and downwards direction with respect to said vehicle body; and wherein deficiency of force to suppress rolling of said vehicle body is, as required, supplemented by said actuators.

10. A suspension control method according to claim 8, wherein
in the rolling suppression control,
when the roll direction of said vehicle and the steering speed direction are the same, control is performed based upon said vehicle wheel movement amount difference with respect to said vehicle body, and upon said rate of change of steering angle;
when the roll direction of said vehicle and the steering speed direction are not the same, control is performed based upon said vehicle wheel movement amount difference with respect to said vehicle body; and
in the central state when the amount of rolling of said vehicle body is small, without any dependence upon whether or not the roll direction of said vehicle and the steering speed direction are the same, control is performed based upon said vehicle wheel movement amount difference with respect to said vehicle body, and upon said rate of change of steering angle.

11. A suspension control method according to claim 10, wherein when determining said central state, the decision is made utilizing hysteresis.

12. A suspension control method according to claim 1, wherein in the rolling suppression control, sidewise acceleration of said vehicle body is detected, and said actuator is controlled according to the sidewise acceleration and upon rate of change of steering angle.

13. A suspension control method according to claim 12, wherein in the rolling suppression control, when the roll direction of said vehicle and the steering speed direction are the same, control is performed based upon said sidewise acceleration and upon said rate of change of steering angle; and when the roll direction of said vehicle and the steering speed direction are not the same, control is performed based upon said sidewise acceleration, while, in the central state when the amount of rolling of said vehicle body is small, without any dependence upon whether or not the roll direction of said vehicle and the steering direction are the same, control is performed based upon the sidewise acceleration of said vehicle wheels with respect to said vehicle body, and upon said rate of change of steering angle.

14. A suspension control method according to claim 13, wherein when determining said central state, the decision is made utilizing hysteresis.

15. A suspension control method according to claim 1, wherein the predetermined steering angle is 5 degrees, the predetermined rate of change of steering angle is 0.5 radians/sec, and the predetermined acceleration in the forwards and rearwards direction is 2 m/s$^2$.

* * * * *